US010812084B2

(12) United States Patent
Strukov et al.

(10) Patent No.: US 10,812,084 B2
(45) Date of Patent: Oct. 20, 2020

(54) RECONFIGURABLE PHYSICALLY UNCLONABLE FUNCTIONS BASED ON ANALOG NON-VOLATILE MEMORIES

(71) Applicant: The Regents of the University of California, Oakland, CA (US)

(72) Inventors: Dmitri Strukov, Goleta, CA (US); Hussein Nili Ahmadabadi, Santa Barbara, CA (US); Mohammad Reza Mahmoodi, Isla Vista, CA (US); Zahra Fahimi, Isla Vista, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/676,101

(22) Filed: Nov. 6, 2019

(65) Prior Publication Data

US 2020/0145008 A1    May 7, 2020

Related U.S. Application Data

(60) Provisional application No. 62/756,388, filed on Nov. 6, 2018.

(51) Int. Cl.
*H03K 19/177* (2020.01)
*G11C 11/40* (2006.01)
(Continued)

(52) U.S. Cl.
CPC ....... *H03K 19/17768* (2013.01); *G11C 7/222* (2013.01); *G11C 11/4085* (2013.01);
(Continued)

(58) Field of Classification Search
CPC ... H04L 9/3278; H04L 9/3236; H04L 9/3026; G06F 2212/1052; G11C 13/0069; G11C 16/0483; G11C 13/0011; G11C 13/0026; G11C 13/004; G11C 16/0416; G11C 2213/71; G11C 5/06; G11C 7/00; G11C 16/0425; G11C 16/0441; G11C 11/5628;
(Continued)

(56) References Cited

U.S. PATENT DOCUMENTS 7,269,046 B2 *    9/2007   Graham ............. G11C 16/0416
                                                                        365/100
8,446,250 B2 *    5/2013   Kursawe ............... G06F 21/602
                                                                         340/10.1

(Continued)

OTHER PUBLICATIONS

M. Rostami et al., "Quo vadis, PUF?: Trends and challenges of emerging physical-disorder based security," in: Proc. DATE'14, Dresden, Germany, Mar. 2014, pp. 1-6.

(Continued)

*Primary Examiner* — Vibol Tan
(74) *Attorney, Agent, or Firm* — Greer, Burns & Crain, Ltd.; Steven P. Fallon

(57) ABSTRACT

A security primitive for an integrated circuit comprises an array of floating-gate transistors monolithically integrated into the integrated circuit and coupled to one another in a crossbar configuration. The floating-gate transistors have instance-specific process-induced variations in analog behavior to provide one or more reconfigurable physically unclonable functions (PUFs).

20 Claims, 64 Drawing Sheets

(51) Int. Cl.
| | |
|---|---|
| H03K 19/17768 | (2020.01) |
| H03K 19/17756 | (2020.01) |
| G11C 11/408 | (2006.01) |
| H04L 9/32 | (2006.01) |
| G11C 11/56 | (2006.01) |
| G11C 7/22 | (2006.01) |

(52) U.S. Cl.
CPC ...... *G11C 11/5628* (2013.01); *G11C 11/5642* (2013.01); *H03K 19/17756* (2013.01); *H04L 9/3278* (2013.01)

(58) Field of Classification Search
CPC . G11C 11/5642; G11C 16/0408; G11C 16/26; G11C 17/12; G11C 13/0059; G11C 15/046; G11C 7/24; H01L 29/42324; H03K 19/00315; H03K 19/177; H03K 19/17748; H03K 19/17768
See application file for complete search history.

(56) References Cited

U.S. PATENT DOCUMENTS

| | | | | |
|---|---|---|---|---|
| 8,873,302 | B2* | 10/2014 | Fisch | G11C 16/00 257/321 |
| 8,891,276 | B2* | 11/2014 | Siau | G11C 5/06 365/148 |
| 9,117,495 | B2* | 8/2015 | Siau | G11C 7/04 |
| 9,171,144 | B2* | 10/2015 | Lewis | G06F 21/70 |
| 9,218,477 | B2* | 12/2015 | Lewis | G06F 21/70 |
| 9,461,826 | B2* | 10/2016 | Kreft | G06F 21/71 |
| 9,536,581 | B2* | 1/2017 | Katoh | G11C 13/0059 |
| 9,647,847 | B2* | 5/2017 | Lange | H04W 12/08 |
| 9,653,161 | B2* | 5/2017 | Yoshimoto | G11C 13/004 |
| 9,946,551 | B2* | 4/2018 | Sato | H03K 19/17748 |
| 9,966,954 | B1* | 5/2018 | Yang | H03K 19/00315 |
| 9,997,253 | B1* | 6/2018 | Chen | H01L 27/11568 |
| 10,396,991 | B2* | 8/2019 | Arasu | G06F 21/78 |
| 10,402,342 | B2* | 9/2019 | Luo | G06F 3/0679 |
| 10,425,235 | B2* | 9/2019 | Wallrabenstein | H04L 9/002 |
| 10,528,488 | B1* | 1/2020 | Lee | G06F 16/90344 |
| 10,536,281 | B2* | 1/2020 | Das | H01L 43/08 |
| 10,566,056 | B2* | 2/2020 | Siau | G11C 13/0011 |

OTHER PUBLICATIONS

M. R. Mahmoodi and D. B. Strukov, "An ultra-low energy internally analog, externally digital vector-matrix multiplier based on NOR flash memory technology," in: Proc. DAC'18, San Francisco, CA, Jun. 2018.

X. Guo et al., "Fast, energy-efficient, robust, and reproducible mixed-signal neuromorphic classifier based on embedded NOR flash memory technology," in: Proc. IEDM'17, San Francisco, CA, Dec. 2017, pp. 6.5.1-6.5.4.

M. R. Mahmoodi and D. B. Strukov, "Breaking POp/J barrier with analog multiplier circuits based on nonvolatile memories", in: Proc. ISLPED'18, Bellevue, WA, Jul. 2018.

Alibart, Fabien, et al. "High precision tuning of state for memristive devices by adaptable variation-tolerant algorithm." Nanotechnology 23.7 (2012): 075201.

H. Nili et al., "Hardware-intrinsic security primitives enabled by analogue state and nonlinear conductance variations in integrated memristors," Nature Electronics, vol. 3, pp. 197-202, 2018.

M. R. Mahmoodi, H. Nili and D. B. Strukov, "RX-PUF: Low power, dense, reliable, and resilient physically unclonable functions based on analog passive RRAM crossbar arrays," in: Proc. VLSI-Symp'18, Honolulu, HI, Jan. 2018, pp. 99-100.

X. Guo et al., "Temperature-insensitive analog vector-by-matrix multiplier based on 55 nm NOR flash memory cells," in: Proc. CICC'17, Austin, TX, Apr. 2017, pp. 1-4.

A. Bendali, and Y. Audet, "A 1-V CMOS current reference with temperature and process compensation," IEEE TCAS-I, vol. 54, pp. 1424-1429, 2007.

S. Mathew et al., "A 0.19 pJ/b PVT-variation-tolerant hybrid physically unclonable function circuit for 100% stable secure key generation in 22nm CMOS," in: Proc. ISSCC'14, San Francisco, CA, 2014, pp. 278-279.

S. Jeloka et al., "A sequence dependent challenge-response PUF using 28 nm SRAM 6T bit cell," in Proc. VLSI-Symp, 17, Kyoto, Japan, Jun. 2017, pp. 270-281.

H. Nili et al, "Programmable and Cryptographic Hardware Enabled by Analog State and Nonlinear Conductance Variations in Integrated Memristors," pp. 1-21, Jun. 2017.

H. Nili et al., Highly-Secure Physically Unclonable Cryptographic Primitives Using Nonlinear Conductance and Analog State Tuning in Memristive Crossbar Arrays, Arxiv pre-publication, pp. 1-25, Nov. 2016.

* cited by examiner

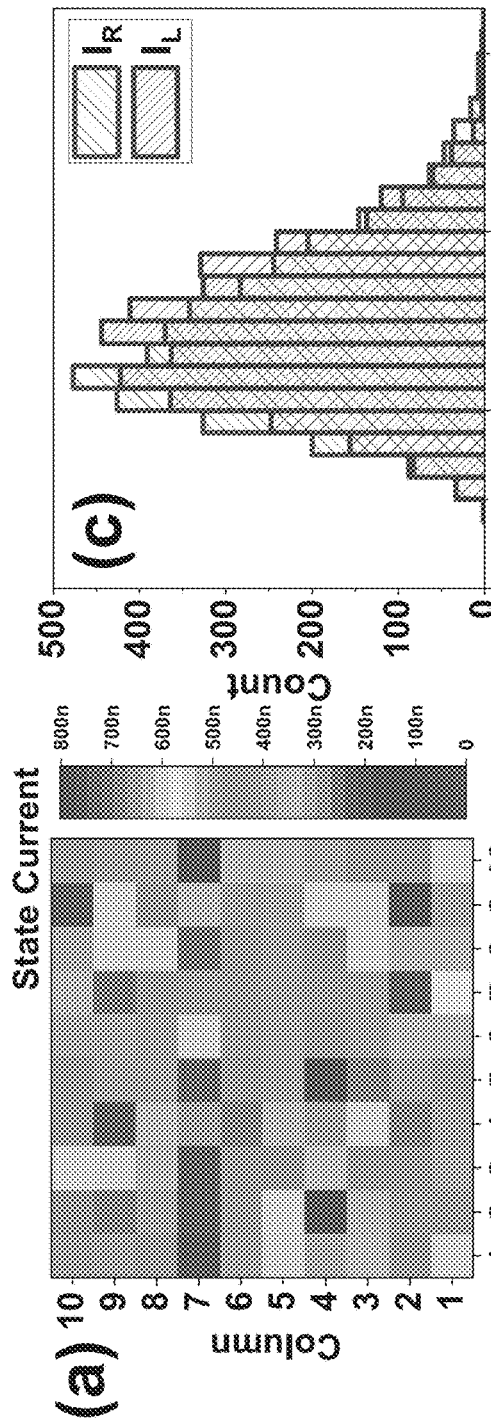
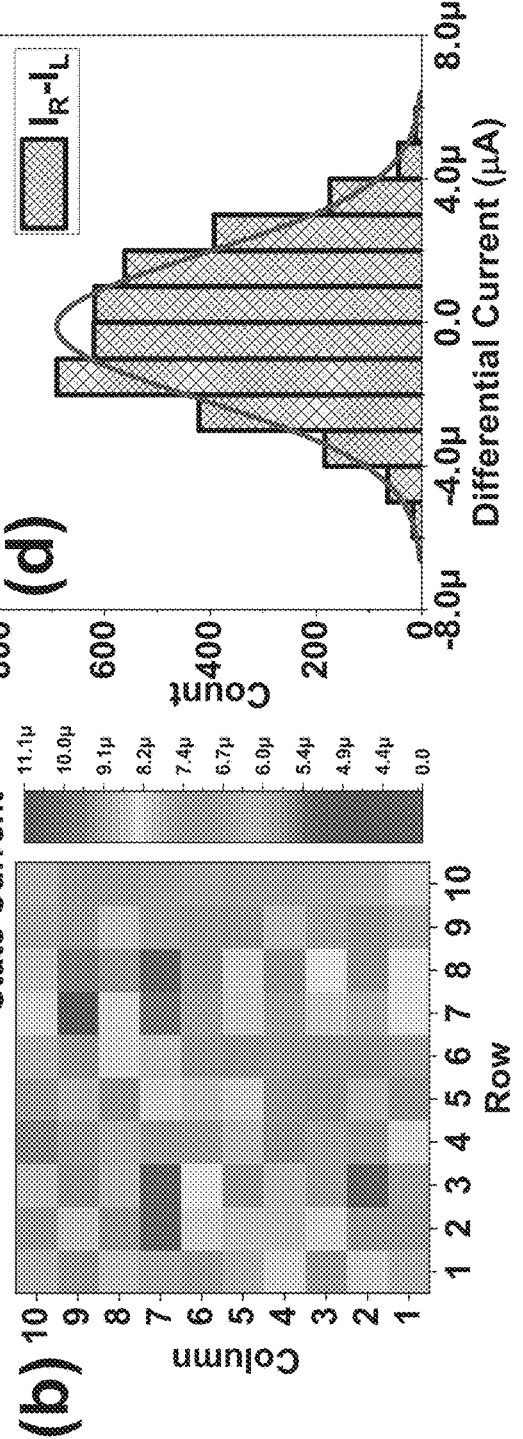
FIG. 12A
FIG. 12B
FIG. 12C
FIG. 12D

|  | Layer #1 | Layer #2 | Total |
|---|---|---|---|
| Inputs* | 1112 | - | 1112 |
| Inputs** | 35,595 | 13 | 35,608 |
| Outputs* | 8 | 16 | - |
| # TDM Steps | 32 | - | 32 |
| Primitive Blocks | 8 | 1 | 9 |
| # Main Array Blocks | 8 (256*256) | 32 (4*128) | 40 |
| # Aux Array Blocks | 8 (256*256) | 1 (128*1024) | 9 |
| # Flash Cell*** | 1,048,576 | 147,456 | 1,196,032 |
| FFs | 2,304 | 42 | 2346 |
| DAC | 8 | 1 | 9 |
| Analog Peripheries | 8 | 16 | 24 |

\* Per TDM step
\*\* Per challenge
\*\*\* Active flash cells excluding dummies

FIG. 31

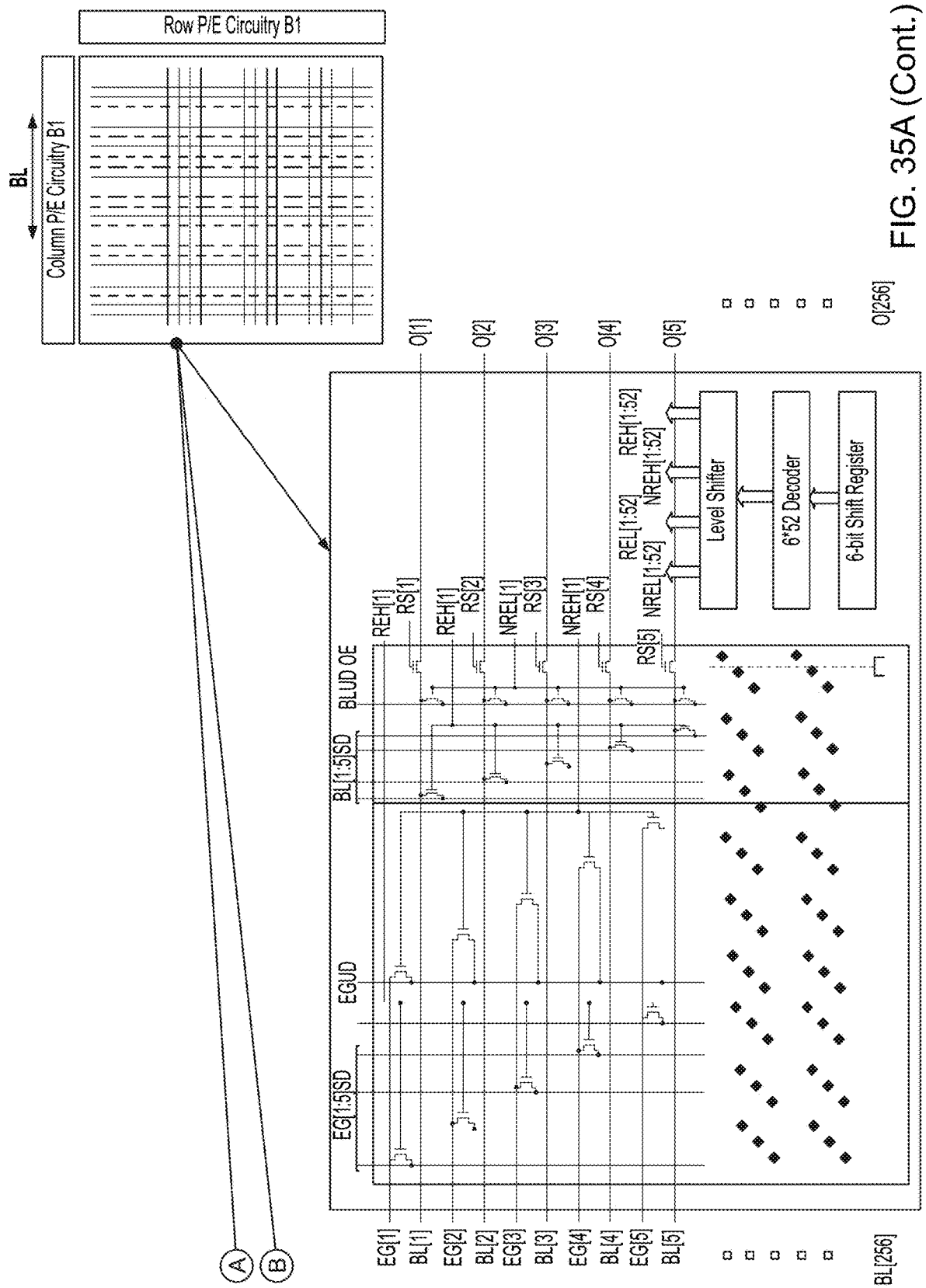

$Mpx, Mnx: \dfrac{0.4}{1} \times 100$ $Mrp, Mrn: \dfrac{0.4}{1}$ $C_{int}: 20f$ $C_{dif}: 105f$ $R_{dif}: 30k$ $b_0$ and $b_1$ select $R_{int}$ (and compensation circuitry for amplifier "A") which is determined by $I_{in,max}$

| $b_0$ | $b_1$ | $R_{int}$ | $I_{in,max}(nA)$ | $T_s(ns)$ |
|---|---|---|---|---|
| 0 | 0 | 500k | 0.3 | 52.3 |
| 0 | 1 | 200k | 0.6 | 24.1 |
| 1 | 0 | 40k | 2.5 | 8.5 |
| 1 | 1 | 2.24k | 29 | 1.2 |

Voltage Domain: MVDD

FIG. 44

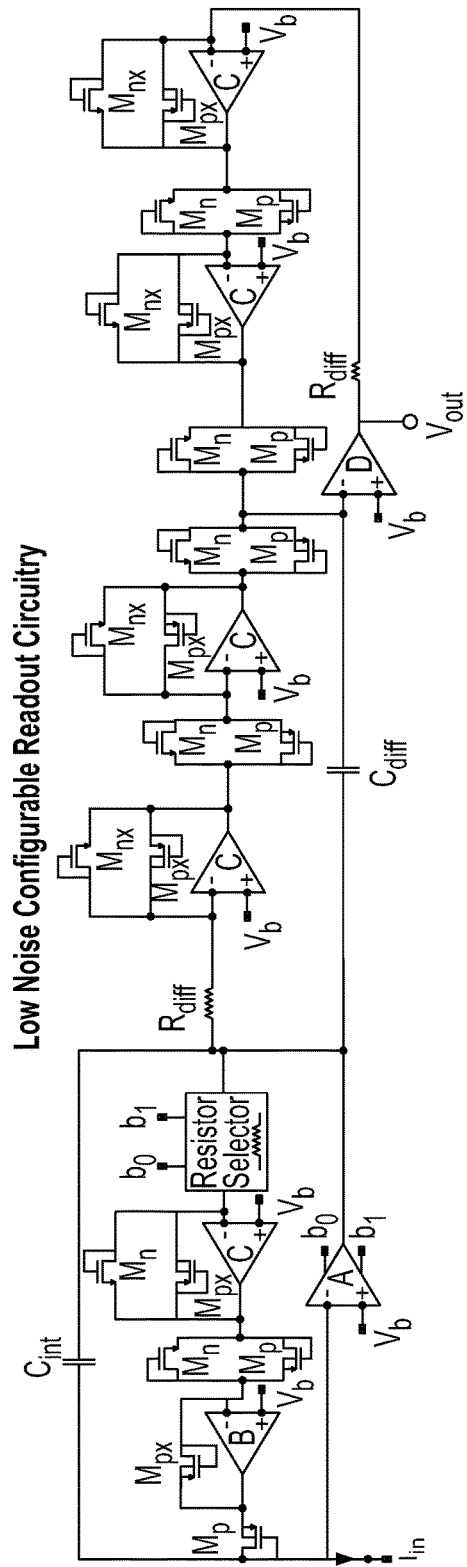
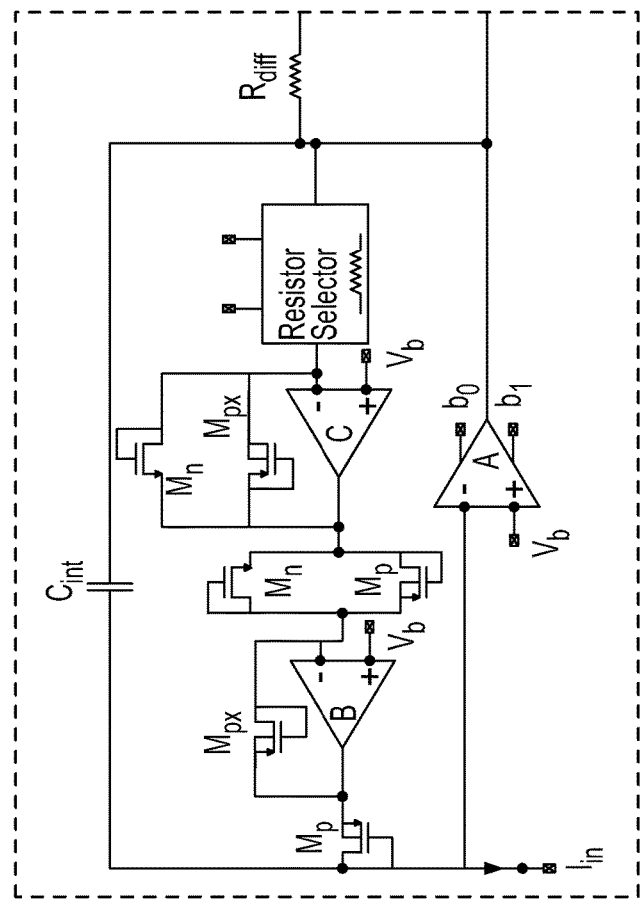
FIG. 45A
FIG. 45B

|  | Length #1 | Length #2 |
|---|---|---|
| $C_{BL,MA}$ | 29.44 f | 14.72 f |
| $C_{G,AA}$ | 51.60 f | 206.4 f |
| $C_{BL,AA}$ | 117.76 f | 58.88 f |
| Delay 1 (From Sim) | 39 ns | 45 ns |
| Delay 2 (From Sim) | 80.5 ns | 86.5 ns |

FIG. 50

RECONFIGURABLE PHYSICALLY UNCLONABLE FUNCTIONS BASED ON ANALOG NON-VOLATILE MEMORIES

PRIORITY CLAIM

This application claims priority under 35 U.S.C. 119 from U.S. Provisional Patent Application No. 62/756,388, filed Nov. 6, 2018, which application is incorporated by reference herein.

STATEMENT OF GOVERNMENT INTEREST

This invention was made with Government support under Grant/Contract No. N00014-14-1-0580 awarded by the U.S. Office of Naval Research, and Grant/Contract No. 1528205 awarded by the National Science Foundation. The Government has certain rights in the invention.

FIELD

A field of the invention is secure devices and systems. Embodiments of the invention particularly concern hardware security primitives that can be used in devices (e.g., integrated circuits) and interconnected networks of devices, and methods for making and using such hardware security primitives.

BACKGROUND

The advent of the information technology era has stimulated an unprecedented expansion of interconnected networks and devices. Demand for localized hardware security is continuously growing due to the rapid expansion of online distribution of interconnected networks and devices carrying critical/sensitive and personal information on shared networks. The sheer volume of personal and sensitive information continuously carried over shared and remotely accessible networks poses significant security challenges that are not adequately addressed using conventional cryptographic approaches.

For instance, FIG. 1 shows an example security method for data encryption. A key 100 is used as an input (e.g., a seed) for a pseudo-random number generator (PRNG) 102, which generates a pseudo-random number, such as for use in an encryption algorithm 104. The encryption algorithm is used to encrypt input data, e.g., plaintext 106, and generate ciphertext 108. The ciphertext 108 can be output via a suitable communication channel 110.

Useful key generation typically requires, among other things, a randomness source to generate unpredictable keys, a protected memory to store key information, and suitable (e.g., high bandwidth) key retrieval. Most conventional cryptographic approaches have relied on "secret keys" stored in nonvolatile memories for data encryption and access authentication. However, these approaches are vulnerable to physical and side-channeling attacks, including direct probing and power analysis. Other solutions, such as secure modules, have been used or proposed, but such modules are typically expensive and bulky, making them impractical for many uses.

As a result, security approaches based on physical hardware roots-of-trust have attracted significant attention. Somewhat analogous to biometric identifiers such as retinal and fingerprint imprints, hardware roots-of-trust are physically embedded with their cryptographic processes through unique, individual structural properties that are virtually unpredictable and practically inimitable. Cryptographic data, including those provided by physical hardware roots of trust, should be immediately and reliably available upon interrogation and effectively impossible to learn or extrapolate even when challenged by aggressive model-building and machine learning attacks.

One example security approach based on physical hardware roots-of-trust uses hardware-intrinsic security primitives such as physically unclonable functions (PUFs) to generate output bits. A physically unclonable function (also referred to as a physical unclonable function) (PUF) is a recently developed family of security primitives based on physical hardware roots of trust. PUFs utilize underlying unique and random process-induced variation properties of a semiconductor device (e.g., a chip) that are unpredictable, inimitable, and practically impossible given currently available technologies to learn, extrapolate, or reproduce.

For instance, silicon PUFs may be physically identical at design time, but, after fabrication, produce distinct, die-specific responses to input requests. PUFs can exploit certain variations in chip hardware, such as intra-die and inter-die variations, wafer-to-wafer variations, and/or run-to-run variations as entropy sources to provide a security signature or "fingerprint" for such hardware.

Security primitives based on unique process-induced variations have been utilized in authentication and key generation applications. For authentication, a unique and unclonable "fingerprint" is needed, while for key generation, an unpredictable reproducible random number generation are needed.

For typical use, PUFs require unpredictability of such variations. If the variations are not sufficiently unpredictable (that is, there is not enough entropy), the PUFs are vulnerable to attacks such as modeling attacks.

Particular PUF designs can be evaluated and classified based on such factors as uniqueness, reliability, diffuseness, chip size, energy consumption per bit, and others. Uniqueness, for example, can be evaluated (e.g., quantified) using a Fractional Hamming Distance calculated among bit outputs for multiple PUFs produced using a particular design given a particular bit input. Diffuseness can be evaluated using a Fractional Hamming Distance calculated among multiple bit outputs for a single PUF given multiple bit inputs. Uniformity can be evaluated using a Hamming Weight calculated for multiple bit output instances of a single PUF given a particular bit input. Reliability can be evaluated, for instance, using a Fractional Hamming Distance calculated for bit outputs of a single PUF based on multiple instances of the same bit input while varying one or more parameters, such as temperature, current, etc. A bit error rate (BER) can also be used to evaluate reliability of PUFs, as large BER requires error correction to improve reliability.

A variety of PUFs have been proposed, most relying on complementary-metal-oxide-semiconductor (CMOS) circuits. Examples of generally proposed PUF techniques include current mirrors, static random-access memory (SRAM) and pre-charged cross-coupled inverters, ring oscillators, and metal-oxide-semiconductor field-effect transistors (MOSFETs). More recently emerging technologies such as resistive random-access memories and spin-torque transfer magnetic random-access memories have also offered excellent functional and physical performance prospects for the next generation of hardware security primitives.

However, most existing PUFs utilize a linear mapping function and/or a single-layer architecture, which make them vulnerable to machine learning attacks. In addition, many proposed approaches, e.g., SRAM-based PUFs, exhibit a large BER, requiring extensive post-processing and error correction.

A number of more advanced designs have been recently proposed to address these issues. A general idea behind such designs has been to follow Shannon's security paradigms. See, e.g., M. Rostami et al., "Quo vadis, PUF?: Trends and challenges of emerging physical-disorder based security," in: Proc. DATE'14, Dresden, Germany, March 2014, pp. 1-6. Such designs utilize nonlinear elements to ensure better robustness and response diffuseness.

SUMMARY

Example devices and systems presented herein provide hardware-intrinsic security primitives, including physically unclonable functions (PUF) based on inherent variations in analog flash memory devices including floating-gate transistors. Example embodiments utilize fabrication process-induced variations across memory arrays, as well as device-specific stochasticity in their switching and voltage-current (I-V) behaviors as sources of on-demand cryptographic data without the need for storing specific "keys" in proprietary memory.

An example security primitive for an integrated circuit comprises an array of floating-gate transistors monolithically integrated into the integrated circuit and coupled to one another in a crossbar configuration, wherein the respective floating-gate transistors have instance-specific process-induced variations in analog behavior to provide one or more reconfigurable physically unclonable functions (PUFs). Peripheral circuitry is coupled to the array of floating-gate transistors. The peripheral circuitry is configured to apply a voltage to selected ones of the floating-gate transistors for generating an unpredictable (that is, infeasible for adversaries to predict the output for any input "x" given that the adversary has access to some evaluations on some inputs different from x) nonlinear combination of input currents through the selected floating-gate transistors. In some example embodiments, the floating-gate transistors comprise split-gate NOR flash memory cells.

In some example embodiments, the array of floating-gate transistors comprises an n×(m−n) array, where n represents one of a row or column, and m−n represents the other of the row or column; wherein the crossbar configuration comprises: n source lines, each source line connecting (m−n) floating-gate transistors; and n pairs of word lines opposing one another with respect to the source line and connecting the (m−n) floating-gate transistors. The crossbar configuration further comprises (m−n) bit lines, each bit line connecting n floating-gate transistors.

In some example embodiments, each of the floating-gate transistors comprises: a source coupled to one of the n source lines; first and second control gates disposed between the pair of word lines and opposing one another with respect to the source; and first and second floating gates disposed between the pair of word lines and respectively associated with the first and second control gates. The crossbar configuration can further comprise m erase-gate lines, each of the m erase-gate lines connecting n floating gate transistors.

In some example embodiments, the peripheral circuitry comprises: a row switching block coupled to the array of floating-gate transistors and configured to selectively switch rows of the array of floating-gate transistors in response to a first set of bits of an input challenge; a column switching block coupled to the array of floating-gate transistors and configured to selectively switch rows of the array of floating-gate transistors in response to a second set of bits of the input challenge; biasing circuitry configured to apply the voltage to selected rows and/or columns of the array of floating-gate transistors; and output circuitry configured to selectively receive input currents from rows or columns of the array of floating-gate transistors and generate an output bit based on the received input currents. The output circuitry may receive input currents from selected source lines, and/or may receive input currents selected in response to a third set of bits of the input challenge.

An integrated circuit (IC), such as a multilayer cryptographic integrated circuit, can be provided having one or more security primitives. In some example embodiments, the IC comprises: at least one security primitive configured to receive an input challenge and generate at least one output bit, each security primitive comprising: an array of floating-gate transistors monolithically integrated into the integrated circuit and coupled to one another in a crossbar configuration, wherein the respective floating-gate transistors have instance-specific process-induced variations in analog behavior to provide one or more reconfigurable physically unclonable functions (PUFs); a row switching block coupled to the array of floating-gate transistors and configured to selectively switch rows of the array of floating-gate transistors in response to a first set of bits of the input challenge; a column switching block coupled to the array of floating-gate transistors and configured to selectively switch rows of the array of floating-gate transistors in response to a second set of bits of the input challenge; biasing circuitry configured to apply a voltage to selected rows and/or columns of the array of floating-gate transistors; and output circuitry configured to selectively receive input currents from rows or columns of the array of floating-gate transistors and generate the at least one output bit based on the received input currents.

In example embodiments the integrated circuit further comprises a clock signal generator for generating at least a first clock signal for receiving bits of the input challenge and a second clock signal for generating the at least one output bit, to provide time-domain multiplexing.

In some example embodiments, the integrated circuit comprises a plurality of the security primitives arranged in at least one layer, or in a plurality of layers. The plurality of layers may comprise first and second layers of security primitives, where the integrated circuit further comprises a bit processor for receiving output bits from the first layer of security primitives, processing the received output bits, and inputting the processed bits to the second layer of security primitives. The bit processor may comprise one or more of a shift register, a bit concatenator, or an XOR bit combiner. One or more additional bit processors may be provided, which are configured to receive bits of the input challenge, process the received bits, and distribute the processed bits among at least the row switching blocks and the column switching blocks of the security primitives in the first layer.

Other embodiments of the invention provide, among other things, a method for generating one or more output bits from an input challenge applied to an integrated circuit, the integrated circuit comprising an array of floating-gate transistors monolithically integrated into the integrated circuit and coupled to one another in a crossbar configuration, wherein the respective floating-gate transistors have instance-specific process-induced variations in analog behavior to provide one or more reconfigurable physically unclonable functions (PUFs), the integrated circuit further comprising peripheral circuitry coupled to the array of floating-gate transistors, the peripheral circuitry being configured to apply a voltage to selected ones of the floating-gate transistors for generating an unpredictable nonlinear combination of input currents through the selected floating-gate transistors. An example method comprises: tuning voltage thresholds of the array of floating-gate transistors; inputting bits of the input challenge to the integrated circuit including the tuned floating-gate transistors; selecting one or more rows and columns of the array of floating-gate transistors in response to the input bits to select one or more of the floating-gate transistors; sensing currents of selected rows and/or columns of the array in response to said selecting; comparing the sensed currents; and generating the one or more output bits based on said comparing. Tuning can include, for instance, tuning crossbar conductances of the circuits to pre-calculated values using, for instance, a write-verify algorithm.

BRIEF DESCRIPTION OF THE DRAWINGS

FIG. 9A shows the results of fitting log(I) of subthreshold drain currents to $C_1 V_{CG}^2 + C_2 V_{CG} + C_3$, highlighting significant variations of leakage component ($C_3$), weak-inversion slope ($C_2$), and higher order nonlinearities ($C_1$). Box plots show 25%, 50%, and 75% quantiles. FIGS. 9B-9C show leakage current variations for the same 150 devices as a function of $V_{DS}$ for two representative states (1 µA and 5 µA @ V $V_{CG}=V_{WL}=V_{DS}=1V$), showing the nonlinear semi-exponential dependence of the leakage current on $V_{DS}$, with more prominent variations at larger biases. FIGS. 9D-9E show distribution of tuning accuracy for 100 devices programmed with (d) 5% and (e) 1% targeted accuracy to random states within representative dynamic range.

FIGS. 12a-12D show primitive block measurements at room temperature. FIGS. 12A-12B show respective examples of resultant map of conductance states in 10×10 array of cells, FIG. 12C shows the distribution of read-out currents for 3000 cases, and FIG. 12D shows the corresponding distribution of differential current.

FIG. 31 shows example design parameters for the TDM architecture shown in FIG. 30.

FIG. 44 shows example programming parameters for primitive blocks.

FIGS. 45A-45D show example low noise configurable readout circuitry, where FIGS. 45B-45D are assembled as shown in FIG. 45A.

FIG. 50 shows example delay parameters for the delay modeling circuitry of FIG. 49.

DETAILED DESCRIPTION

Figure 1:
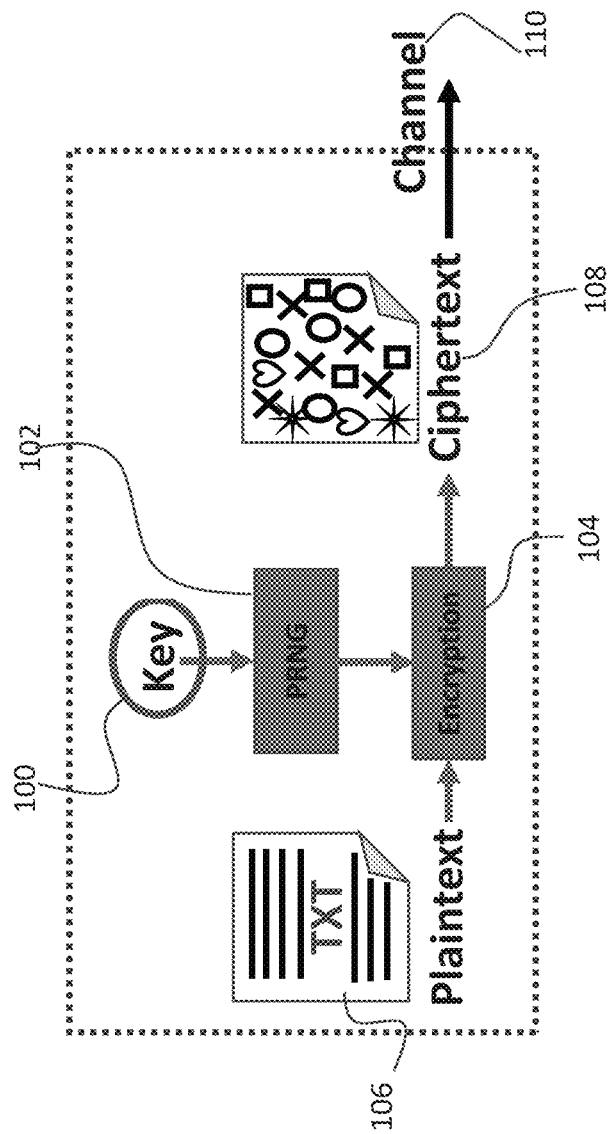
FIG. 1 shows an example security method for data encryption using keys.

Preferred embodiments herein provide, among other things, example integrated circuit or device architectures that exploit intrinsic process-induced variations in analog properties of flash memories and inevitable uncertainty at memory state tuning processes. Such architectures create an explicit randomness in their extremely nonlinear subthreshold characteristics. Furthermore, to improve diffuseness, example circuits preferably minimize correlation between input bits of challenges and responses. Additionally, programmability of flash memories in example embodiments allows implementation of different, unique PUF instances using the same hardware, which is beneficial for many applications.

Example embodiments of the invention can provide, among other benefits, a programmable hardware security primitive enabled by variations in analog non-volatile memory. Example memory elements or cells include floating gate transistors, which in some particular example embodiments are split-gate NOR flash memory cells. Process variations in the floating gate transistors provide reconfigurable physically unclonable functions (PUF). Methods for producing and operating the security primitives and integrated circuits including such security primitives, and methods for generating output bits (for instance, for key generation, for random number generation, and/or for implementing cryptographic functionality) using the security primitives are also provided.

Example integrated circuit architectures allow for integrated hardware-intrinsic security devices (e.g., PUF circuits) with fast, low power operations and low, scalable chip-area overhead. Such architectures provide, among other things, low-cost, reconfigurable (programmable) on-demand security hardware with versatile applications. Peripheral circuitry in example integrated circuits can be configured and operated to generate an unpredictable non-linear combination of input currents and/or increase the dimensions of the system to improve resiliency towards machine learning attacks. Various example integrated circuit architectures having security primitives are provided herein.

Preferred embodiment devices have many applications. Example cryptographic primitives can be used to provide CMOS-integrated and vertically scalable security solutions. Using example crossbar architectures for non-volatile memories and computation engines, embedded security with non-specific chip-area allocation (i.e., the security primitives can be incorporated as part of the memory or processing engine blocks) is particularly useful.

Flash memory-based primitives based on, for instance, matured integrated floating gate technology, such as split-gate NOR flash memory cells, can offer low-cost CMOS-compatible solutions. With the contemplation of flash-based memory arrays and their application in computational engines, a reliable, embeddable security apparatus has particular value in the field of semiconductors.

Example security primitives provided herein can be used in various applications including, but not limited to, integrated circuit (IC) identification, authentication, secure channel communication, data encoding and encryption, and designing random number generators, without the need for "key" storage in auxiliary memory. This provides great advantage by enhancing resilience against adversarial attacks. Example security primitives can be unpredictable and effectively impossible to learn or emulate, and thus provide reliable immunity from adversarial attacking methods, such as (but not limited to) emulation, side channel, fault injection, and invasive attacks.

Particular example embodiments provide designs of hardware-intrinsic security primitives, physically unclonable functions (PUFs), based on inherent variations in analog floating gate memories. A general principle is to utilize the stochastic process and operation induced variations in floating gate memory arrays to construct fast, low power, and CMOS compatible security primitives. Randomness or unpredictability of the primitives can be provided by, for instance, sub-threshold slope variations, and tuning accuracy characteristics of the floating gate array through their manifestations in spatial leakage current distribution across the memory array.

An example architecture allows for integrated hardware-intrinsic security apparatuses (particularly, PUF circuits) with fast, lower power operation (e.g., 10 ns/20 uW per bit) with low-chip area overhead (e.g., scalable to 28 nm and beyond). This allows for the realization of low-cost, reconfigurable (programmable) on-demand security hardware with versatile applications.

Example embodiments exploit randomness in static I-V characteristics and/or reconfigurability of embedded flash memories to design and provide very efficient PUFs. One or more of leakage current and subthreshold slope variations, nonlinearity, nondeterministic tuning error, or sneak path current in flash memory arrays (e.g., newly designed or modified existing flash memory arrays) can be exploited to create a unique "digital fingerprint." A time-multiplexed architecture is provided in example embodiments to enhance the security and expand the challenge-response pair space to, for instance, $10^{211}$.

Experimental results of example embodiments demonstrate good average uniformity, average diffuseness, and bit error rate. Analysis of the measured data also shows strong resilience against machine learning attacks and possibility for energy efficient operation.

Figure 2:
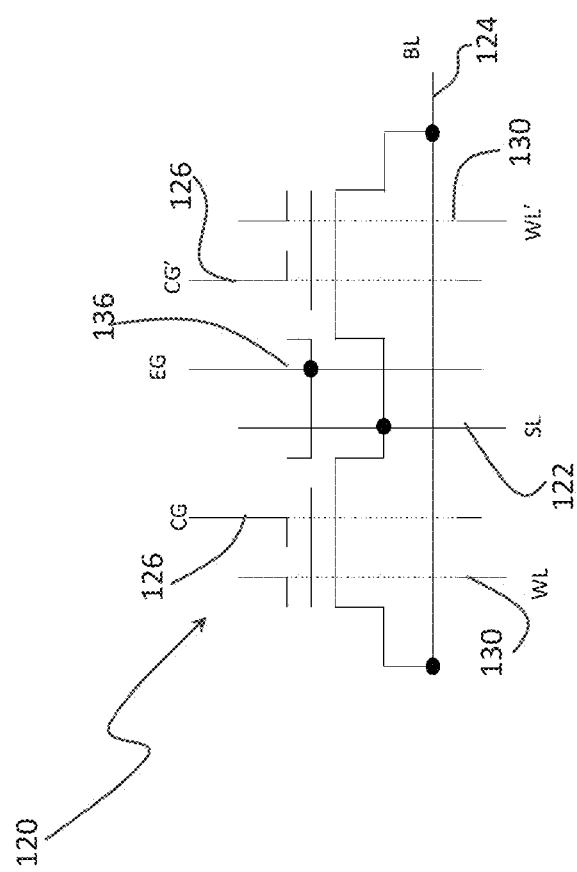
FIG. 2 shows a schematic diagram an example floating-gate transistor embodied in a split-gate NOR flash memory cell.
Figure 3:
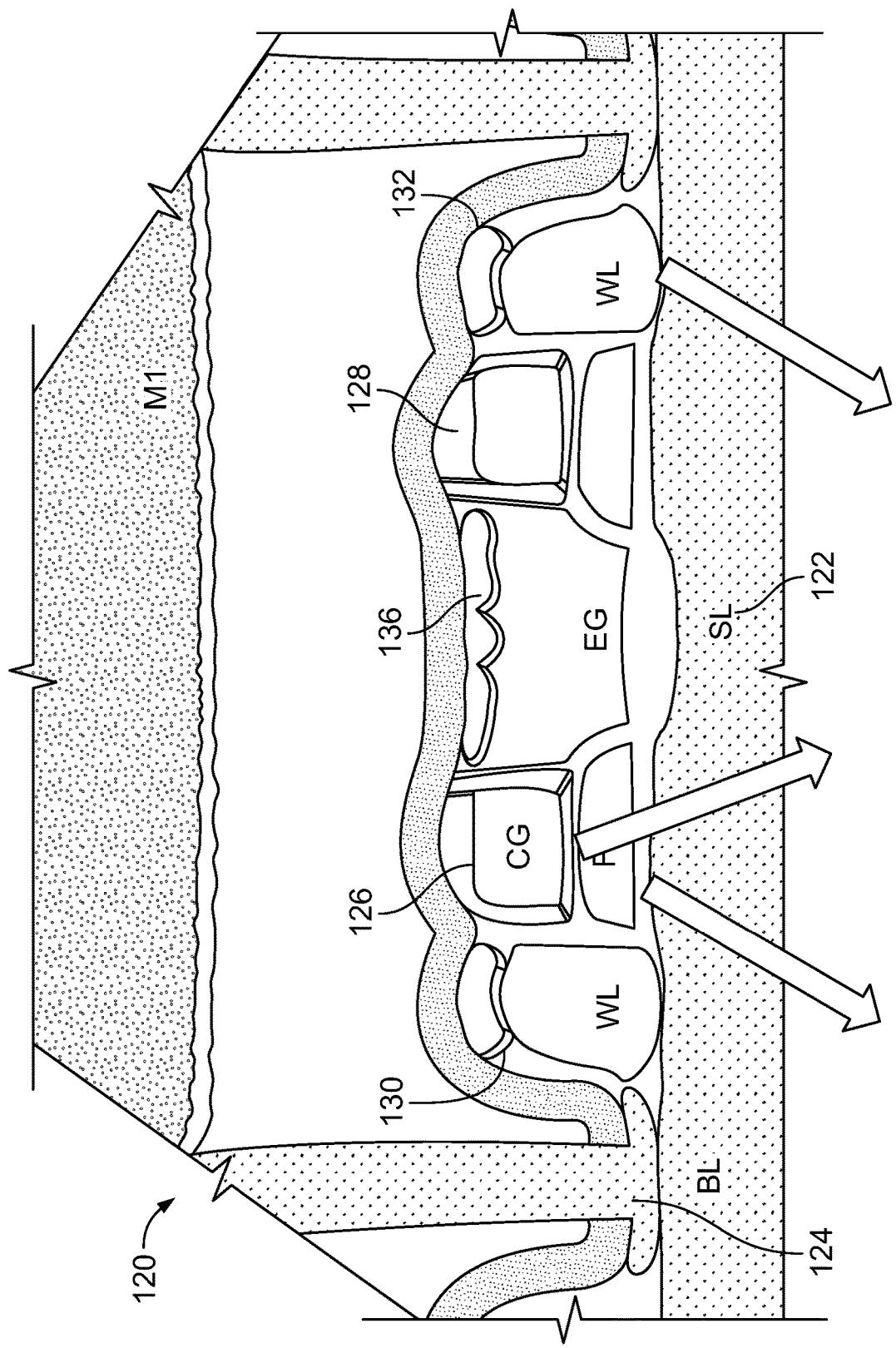
FIG. 3 shows a cross-section of the example floating-gate transistor embodied in a split-gate NOR flash memory cell of FIG. 2.

Referring now to the drawings, FIGS. 2-3 show a schematic diagram and cross-section, respectively, of an example floating-gate transistor embodied in a split-gate NOR flash memory cell 120, as disclosed for instance in M. R. Mahmoodi and D. B. Strukov, "An ultra-low energy internally analog, externally digital vector-matrix multiplier based on NOR flash memory technology," in: Proc. DAC'18, San Francisco, Calif., June 2018, art. 22; in X. Guo et al., "Fast, energy-efficient, robust, and reproducible mixed-signal neuromorphic classifier based on embedded NOR flash memory technology," in: Proc. IEDM'17, San Francisco, Calif., December 2017, pp. 6.5.1-6.5.4; and in M. R. Mahmoodi and D. B. Strukov, "Breaking POp/J barrier with analog multiplier circuits based on nonvolatile memories", in: Proc. ISLPED'18, Bellevue, Wash., July 2018, art. 39, which are incorporated herein by reference. NOR flash memory devices have usefulness in, for instance, low-power analog computing as a promising replacement for bulky synaptic transistors.

The example NOR flash memory cell 120, which preferably provides a self-aligned cell, can be used as, for instance, a "synaptic transistor" for various applications. Control of the NOR flash memory cell 120 shown in FIGS. 2-3 can be provided via multiple (in a particular example cell, five) terminals.

The NOR flash memory device (or memory cell) 120 provides a split-gate transistor cell design between a source coupled to a shared source line (SL) 122, with terminal, and a drain coupled to a bit line (BL) 124, with terminal. The split-gate design includes an inner pair of opposed first and second control gates (CG, CG') 126 and an opposed outer pair of word lines (WL, WL') 130. Terminals can be provided, for instance, for the word lines WL, WL' and for the control gates CG, CG'. Floating gates (FG) 134, disposed between the word lines, are respectively associated with the first and second control gates. The control gates CG, CG' 126, floating gates FG, and word lines WL, WL' are opposed to one another with respect to the source (and thus the source line (SL)) and with respect to a centrally disposed erase gate (EG) 136 with a corresponding terminal.

The example memory cell size is scalable, e.g., from 0.12 u to 28 nm and beyond. NOR flash memories can have a compact footprint (e.g., ~25 $F^2$) and can be highly optimized in terms of endurance and retention for digital applications.

Figure 4:
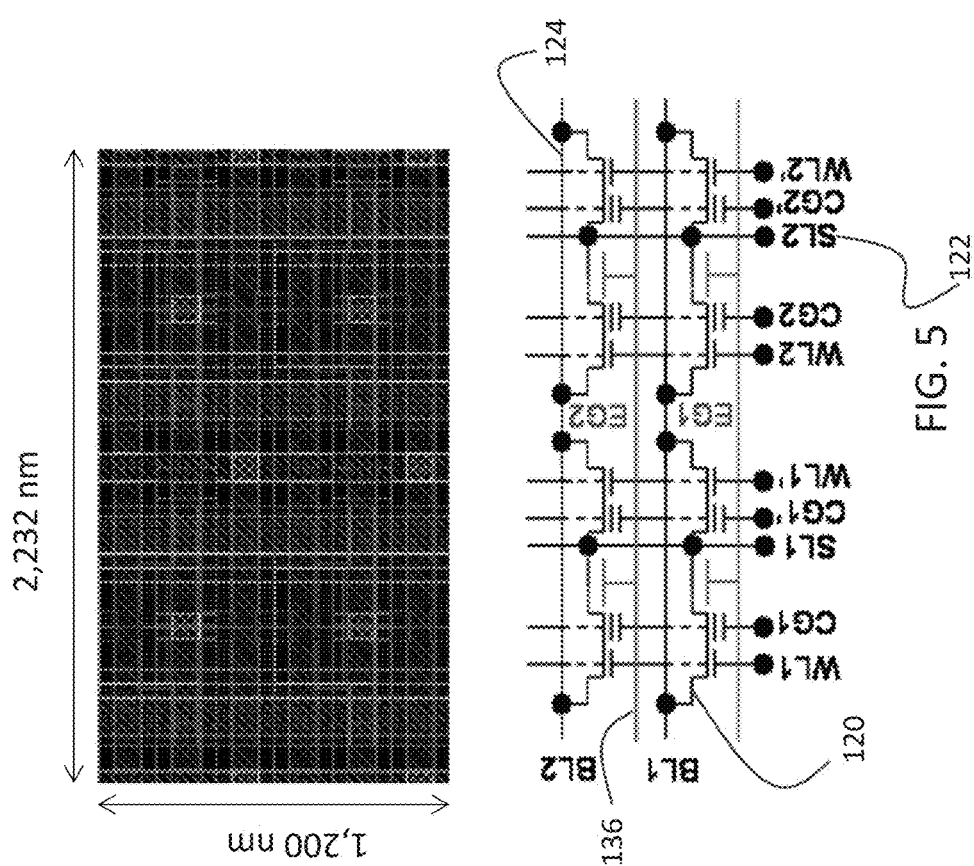
FIG. 4 shows a first example array (2×2) of the NOR flash memory cells.
Figure 5:
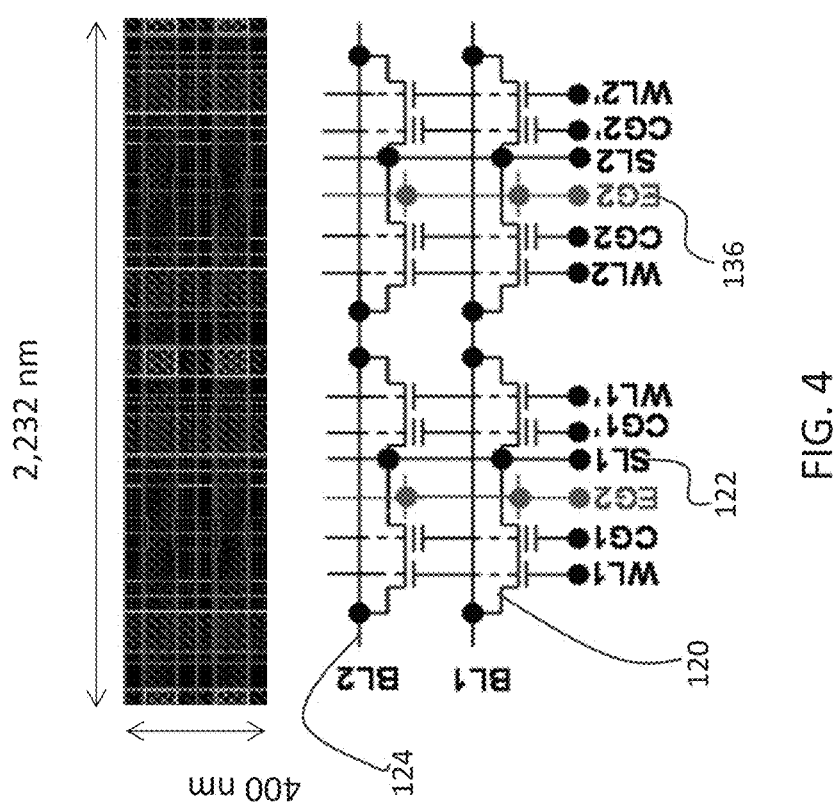
FIG. 5 shows a second example array (2×2) of the NOR flash memory cells.

FIGS. 4-5 show two example arrays (2×2) of the NOR flash memory cells 120, illustrating a crossbar wiring configuration. Each row of cells 120 of each array shares a bit line (BL1, BL2) 124, and each column of cells shares a source line (SL1, SL2) 122. To allow tuning of individual cells to pre-set values, as opposed to merely providing page-wide (multi-cell) erase), the flash array shown in FIG. 5 reroutes erase-gate lines (EG1, EG2) 136 so that the erase-gate lines are shared by rows of memory cells (FIG. 5) 120 instead of being shared by columns of memory cells (FIG. 4).

Figure 6:
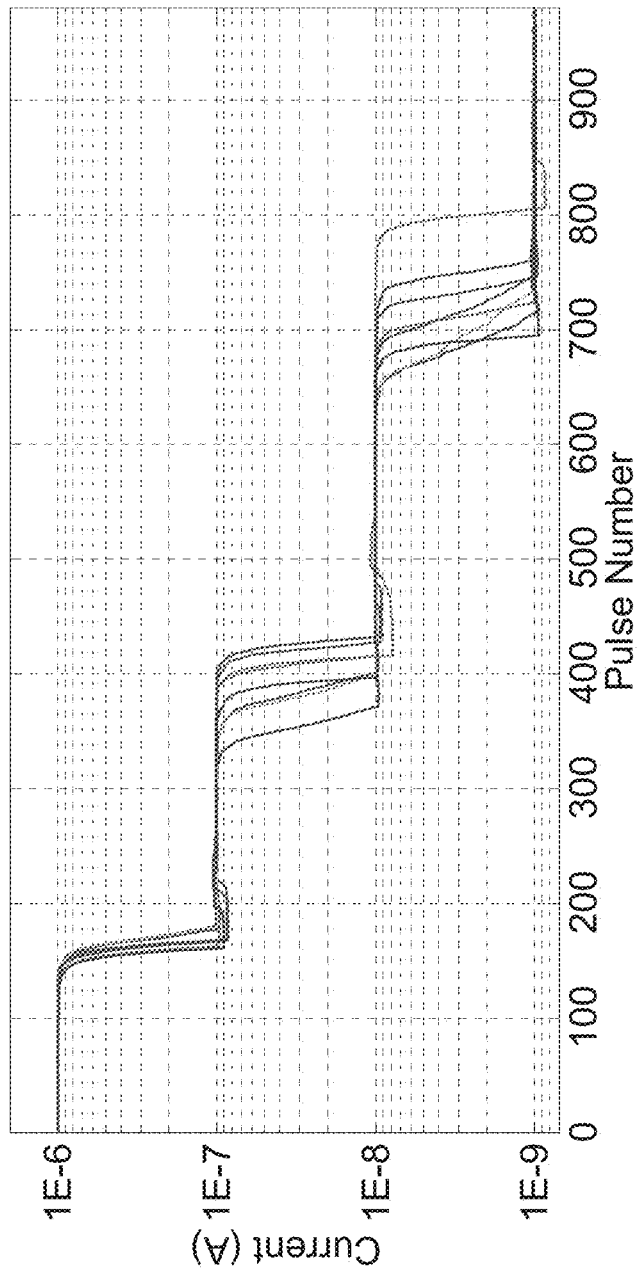
FIG. 6 shows currents for applied pulses from example individual cell programming.
Figure 7:
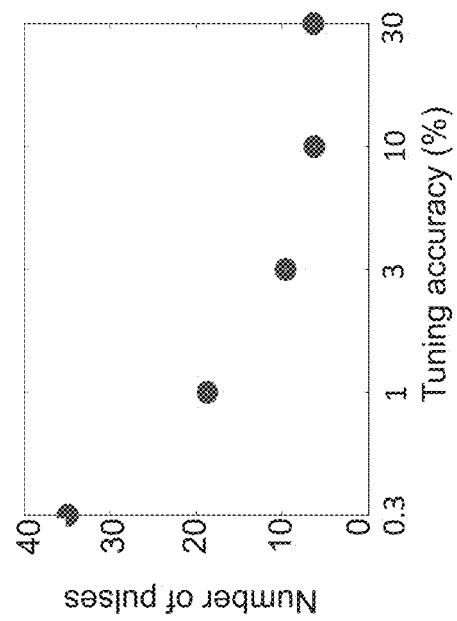
FIG. 7 shows an example tuning accuracy.
Figure 8:
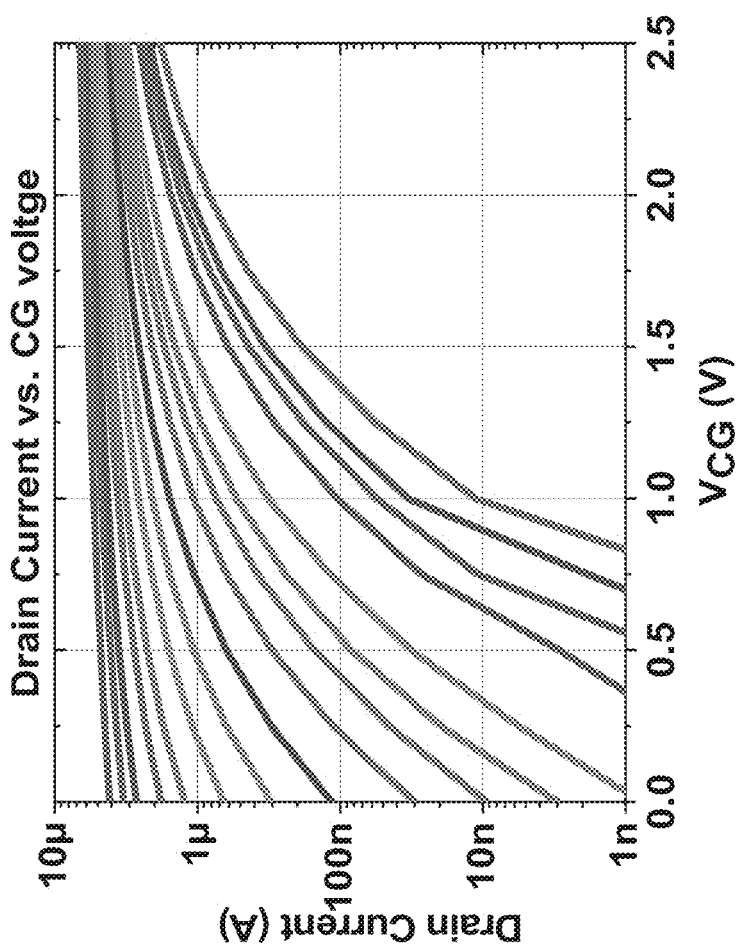
FIG. 8 shows I-V characteristics of the example device in FIG. 3, in weak inversion (at $V_{WL}$=1.2 V, $V_{BL}$=1.2 V, and $V_{SL}$=0 V) tuned with 1% accuracy at different states.

While the example crossbar configuration and wiring arrangement in FIG. 5 can result in a relatively increased area for the array of cells 120 as compared to the array design shown in FIG. 4, such arrangement improves the use of example NOR flash cell arrays in analog applications. In the example NOR flash memory cell array, this routing of erase-gate lines EG1, EG2 136 facilitates precise individual cell programming, shown by example in FIG. 6-7, and enables an extremely energy-efficient analog-domain vector-by-matrix multiplication, the most common operation in many signal processing and neuromorphic algorithms. FIG. 8, for instance, shows I-V characteristics of the device in FIG. 3, in weak inversion (at $V_{WL}$=1.2 V, $V_{BL}$=1.2 V, and $V_{SL}$=0 V) tuned with 1% accuracy at different states. However, the crossbar configuration and wiring arrangements in either FIG. 4 or FIG. 5, as particular examples, can be used for the example architectures disclosed herein. Reference herein to architectures incorporating arrangements according to FIG. 4 are applicable to arrangements according to FIG. 5 where practicable. Modifications for incorporating the arrangements in either FIG. 4 or 5 into example architectures will be apparent to those of ordinary skill in the art.

Process variations in purely complementary metal-oxide semiconductor (CMOS) analog circuits often limit computation accuracy, and can result in large performance overheads, e.g., due to over-designing and calibration techniques. On the other hand, analog circuits with integrated dense embedded NOR flash memories, such as the NOR flash memory cells 120 shown in FIGS. 2-5, allow a dramatic reduction in performance overhead and, for instance, can be used to implement very efficient analog and mixed-signal neuromorphic circuits.

Confusion and diffusion are two of Shannon's security paradigms. Embedded flash memory provides a useful type of device for providing security primitives according to such paradigms. Embedded flash devices, for example, can provide nonlinearity in midrange voltage biases, scalability and analog tunability. Example architectures disclosed herein using PUF design exploit the superior performance of analog circuits enriched with nonvolatile memories, and can directly harness memory cells' variations to provide unique "digital fingerprints." Particular example embodiments employ NOR flash memories, such as those disclosed in FIGS. 2-5, as an entropy source for security primitives.

For instance, in embedded flash technology, process variations can result in variations in subthreshold slope, leakage current, and/or stochastic tuning error. In the example NOR flash memory cell 120 shown in FIGS. 2-5, for instance, uncontrollable etching processes can lead to variations in gate oxide thicknesses and line-edge roughness, for instance at the example locations shown by solid arrows in FIG. 3. Such variations in turn result in stochastic programming efficiency and device-to-device (that is, spatial) variations in I-V characteristics, as illustrated in FIG. 8. Example variations are exhibited in subthreshold drain current with respect to gate voltage and drain voltage (due to drain-induced barrier lowering).

Figure 9A:
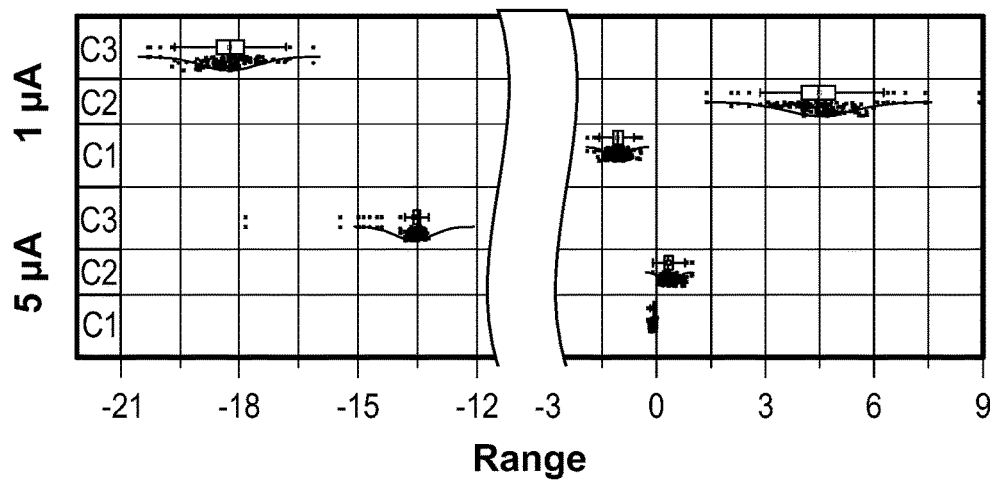
FIGS. 9A-9E show significant entropy contributors that can be exploited in example embodiments.
Figure 9B:
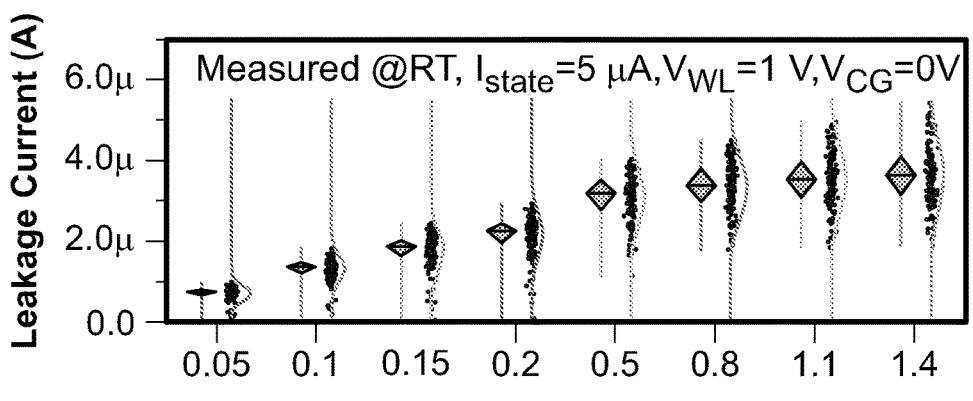
Figure 9C:
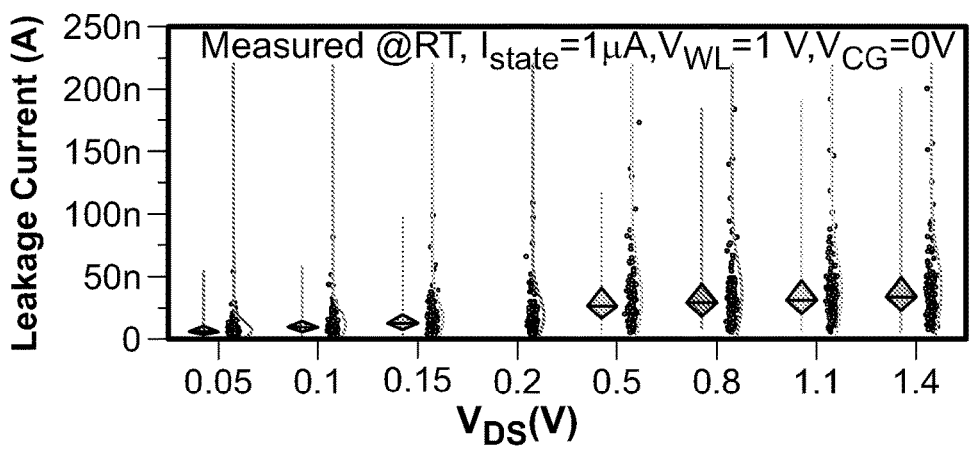

The variations in subthreshold drain current with respect to gate voltage can be conveniently decomposed into three separate currents due to gate voltage independent leakage, weak inversion, and higher order effects. For example, FIG. 9A shows results of these three components by fitting log(I) expression of measured subthreshold drain currents for 150 example devices to a quadratic function $C_1 V_{CG}^2 + C_2 V_{CG} + C_3$ of $V_{CG}$. FIGS. 9B and 9C show distributions of leakage currents (at $V_{CG}$=0 V) for different values of voltage across the source/drain $V_{DS}$, in particular highlighting a significant spread in leakage current distribution. For example experiments providing the results in FIGS. 9A-9C, memory cells were tuned with better than 1% accuracy to eliminate the impact of tuning error in the measurements.

Figures 9D, 9E:
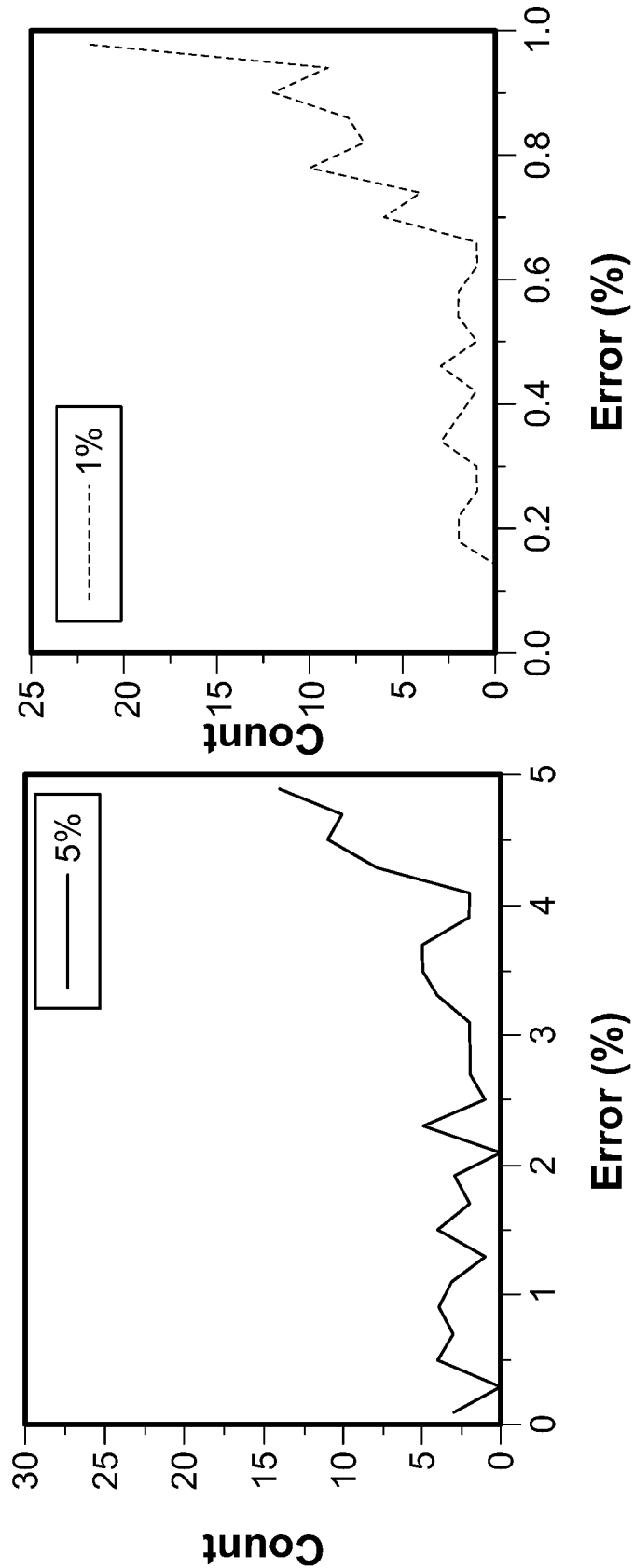

Programming the state of analog-grade nonvolatile memories is typically based on the write-verify algorithm, which has limited tuning accuracy (e.g., due to noise floor of the readout circuitry). An example write-verify algorithm is disclosed in Alibart, Fabien, et al. "High precision tuning of state for memristive devices by adaptable variation-tolerant algorithm." *Nanotechnology* 23.7 (2012): 075201, which is incorporated by reference herein. Such tuning error can be used as an additional source of randomness. FIGS. 9D and 9E, for example, show the distribution of tuning error for 100 devices programmed randomly between 30 nA and 5 μA with specified 5% and 1% targeted accuracy, respectively. The shape of the distributions could be adjusted, if needed, with a more rigorous tuning procedure.

FIGS. 9A-9E illustrate significant variations and randomness in an array of programmed analog-grade flash memories. Example architectures herein exploit one or more of such variations and/or randomness as entropy sources to provide a low-power and dense PUF instance with excellent uniformity and security. These variations provide analog tunability, intrinsic randomness, and nonlinearity, making them suitable for PUFs based on Shannon's security paradigms.

An example structure of a security primitive (primitive block) will now be described with reference to FIG. 10. The example primitive block 140 includes a monolithically integrated (e.g., in an integrated circuit) arrangement (e.g., array) 142 (a portion of which is shown in FIG. 10) of memory elements, such as cells 120 coupled to one another in a crossbar configuration.

The example primitive block 140 is configured to exploit randomness in a network of nonlinear elements. Exploiting, for instance, Shannon's security paradigms, example primitive blocks 140 can be operated at deep subthreshold current with exponential drain-source dependency so that an example network of such primitive building blocks includes nonlinear computational elements, with all of them contributing to an output response. By contrast, for instance, the device disclosed in H. Nili et al., "Hardware-intrinsic security primitives enabled by analogue state and nonlinear conductance variations in integrated memristors," Nature Electronics, vol. 3, pp. 197-202, 2018., incorporated herein by reference, discloses circulating sneak path currents in a crossbar of passively integrated memristors to build a compact security primitive. As opposed to using memristor fabrication technology, flash memories (including but not limited to commercial flash memories) are already embedded in high-end CMOS process technologies and are an excellent candidate for low-power operation.

Figure 10:
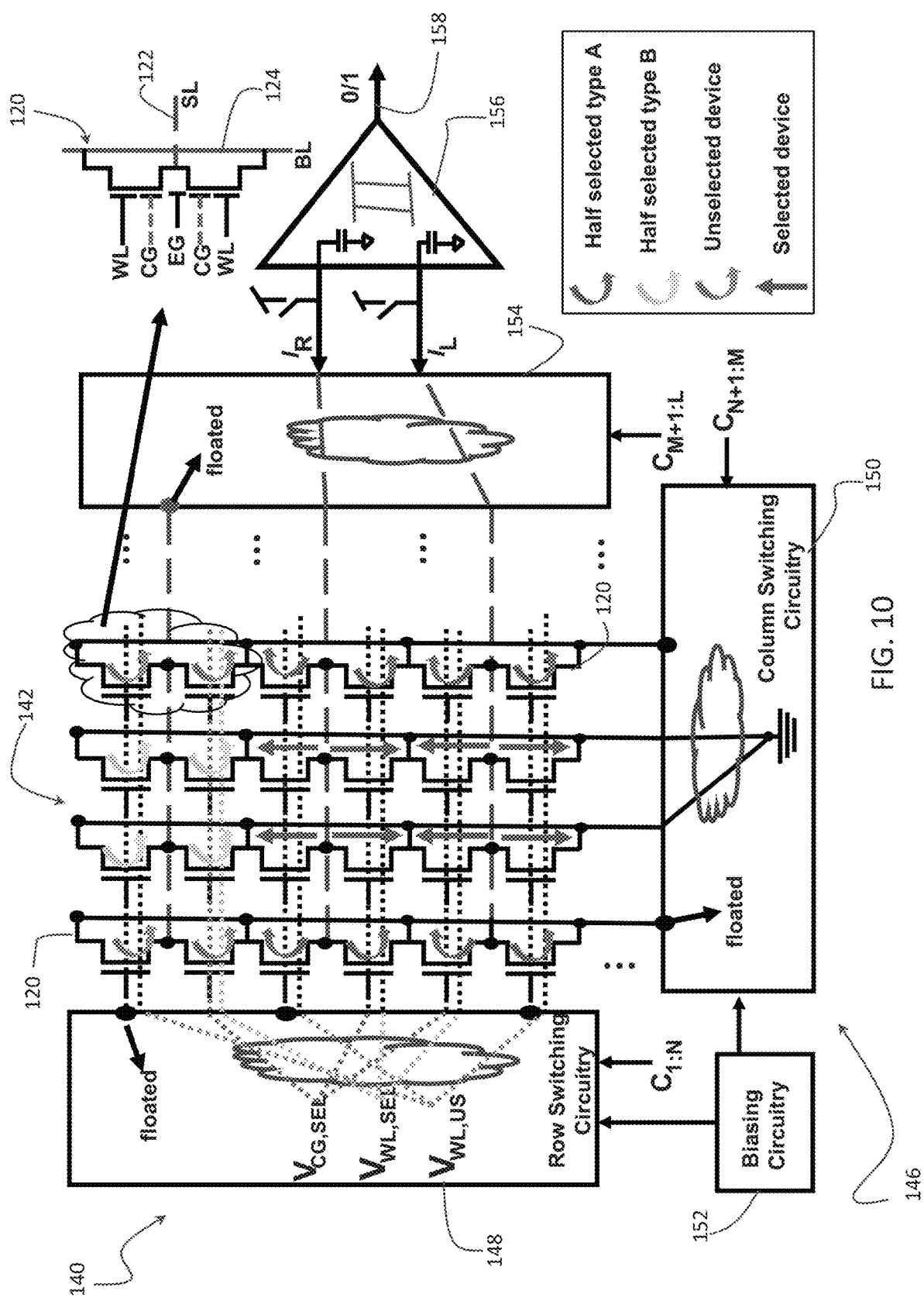
FIG. 10 shows an example structure of a security primitive (primitive block).

The example primitive block (PUF block) 140 shown in FIG. 10 includes an N×(M−N) array 142 of floating gate transistors (floating gate cells) 120 based on the array design shown in FIG. 5, and peripheral circuitry 146, including switching circuitry, coupled to the array for selecting cells and for reading differential current. M and N can respectively refer to rows or columns, depending on the particular configuration and alignment. Additional cells in rows and columns beyond the cells 120 shown in FIG. 10 can be added to the primitive block 140. The peripheral circuitry 146 generally includes a row switching circuitry block 148, a column switching circuit block 150, a biasing circuitry block 152, a source line selection block 154, a differential current reading block 156, and a bit output 158.

In an example operation, selection is based on an input challenge. Particularly, the primitive block 140 is fed with a multibit (e.g., L-bit) input challenge to generate a 1-bit (or in other embodiments a multibit) output response. The 1s/0s of an input bit-vector preferably directly specify the position of the selected/unselected lines. This simplifies an example implementation of peripheral circuitry 146 by requiring only one MOS transistor switch per line (though more than one may be used in alternative embodiments). However, it is possible that the input bits can indirectly specify such positions.

The L input bits in the example primitive block 140 shown in FIG. 10 are partitioned into three groups. The first Nbits of the input challenge ($C_{1:N}$) encode the selected word-lines (WLs) 130 and control-gate (CG) lines 126 (e.g., via the row switching circuitry 148). The next M-N bits ($C_{N+1:M}$) are used to specify the selected bit-lines (BLs) 124 (e.g., via the column-switching circuitry 150). The remaining bits ($C_{M+1:L}$) encode the selected source lines (SLs) 122 (e.g., via switches in the source line selection block 154). Each source line SL 122 is shared between two rows of cells 120.

In operation, the selected CGs, WLs, and SLs are biased, e.g., with $V_{CG,SEL}$, $V_{WL,SEL}$, and $V_{SL}$, respectively, while the selected bit-lines BLs are grounded. Additionally, unselected CGs, BLs, and SLs are floated, while the unselected (US) WLs are biased e.g., with $V_{WL,US}$.

For instance, in the example state of the primitive block portion 140 shown in FIG. 10, including a shown 6×4 array 142 of floating gate cells 120, rows 3-6 (corresponding to WLs/CGs) are selected and columns 2-3 (corresponding to BLs) are selected. Thus, for instance, the cells at rows 1-2, columns 1 and 4, are unselected, the cells at rows 1-2, columns 2-3 are half selected by column (type B), the cells at rows 3-6, columns 1 and 4, are half selected by row (type A), and the cells at rows 3-6, columns 2-3 are selected devices. Further, the source lines (SLs) 122 shared by rows 3-4 and 5-6 are selected, while the source line shared by rows 1-2 is unselected. However, it will be appreciated that the input bits can be processed in other ways, using additional switches, to select or deselect lines and cells.

Figure 11:
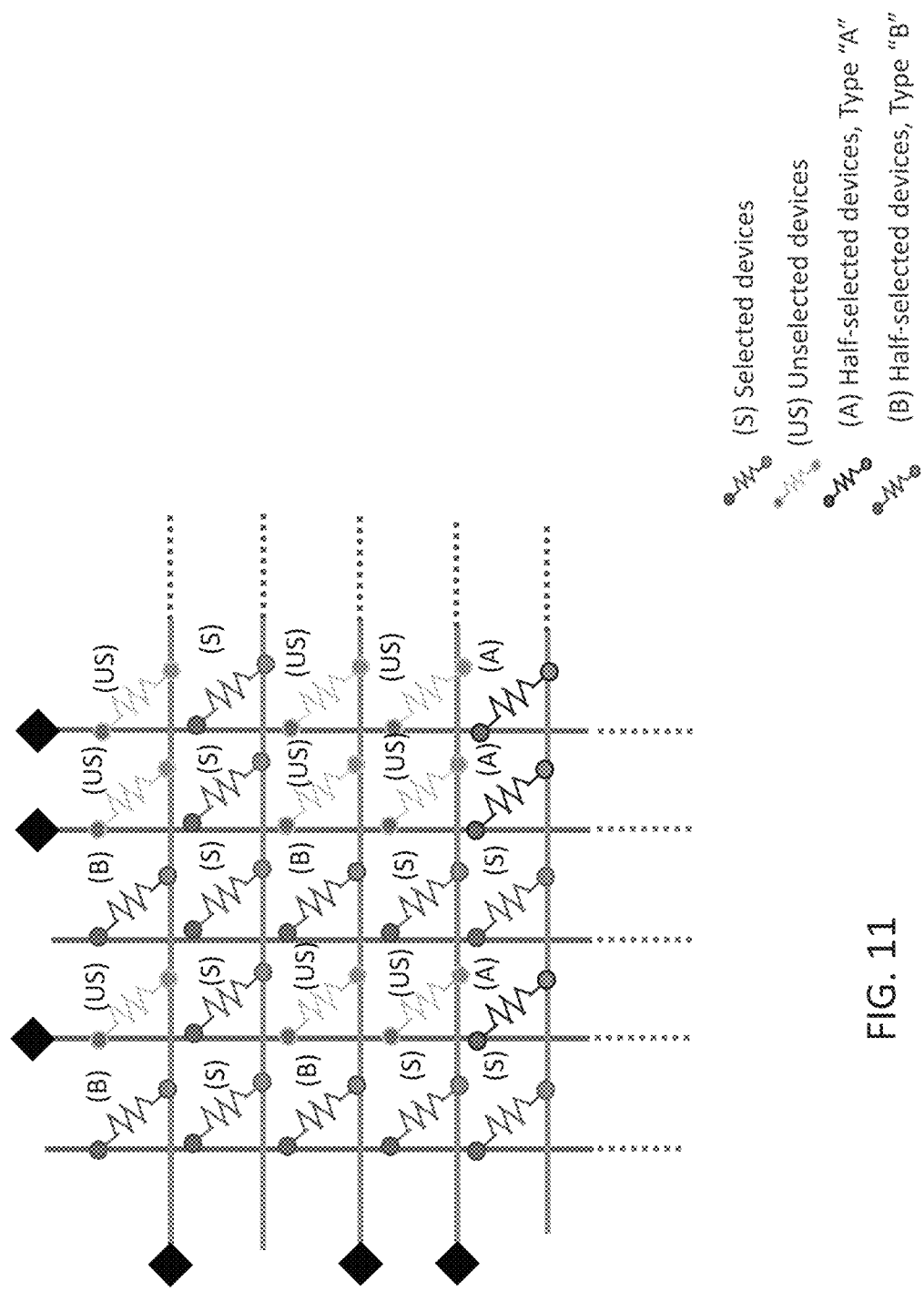
FIG. 11 shows an example array of selected, unselected, and half-selected (type A and B) devices in response to selected rows and columns.

In this example approach, cells 120 in the array 142 can be categorized into four basic groups, as illustrated in FIGS. 10-11. For selected cells (devices) and half-selected type-A devices, the source line (SL) 122 is effectively a drain, while the BL 124 is a source. For the half-selected type-B devices, the current flows from BL to SL. The unselected devices 120 can conduct current at either direction, enabling circulation of sneak-path current in the array 142. In this way, floated unselected devices 120 result in sneak path current in unselected and half selected devices, perturbing the crossbar current distribution, and balances selected and unselected currents.

The output response bit is generated by sensing and comparing input currents $I_R$, $I_L$. The sensed current, for example, is the sum of effective selected and unselected currents. Currents can be sensed from, for instance, the bitlines 124 and/or the source lines 122. Current sensing and comparison can be implemented, for instance, similar to the method disclosed in M. R. Mahmoodi, H. Nili and D. B. Strukov, "RX-PUF: Low power, dense, reliable, and resilient physically unclonable functions based on analog passive RRAM crossbar arrays," in: Proc. VLSI-Symp'18, Honolulu, Hi., January 2018, pp. 99-100, which is incorporated herein by reference. This example differential scheme allows for better noise immunity and power supply rejection ratio as compared to single-ended designs. However, it will be appreciated that other methods for current sensing and comparison may be used.

A particular fabricated experimental example primitive block 140 is a 10×10 primitive block (i.e., with N=10, M=20, and L=25). In an example operation for testing the primitive block 140, each challenge selects 5 WLs/CGs, 5 BLs, and 2 SLs. Furthermore, Gaussian-distributed states (currents) of memory cells 120 in the array 142 are considered. It will be appreciated that the distribution for cell currents during tuning and under nominal biasing conditions can vary, though one or more optimum distributions may be possible.

To characterize example embodiment performance, 10×10 memory arrays were fabricated in 55 nm embedded CMOS based on a layout such as disclosed in X. Guo et al., "Temperature-insensitive analog vector-by-matrix multiplier based on 55 nm NOR flash memory cells," in: Proc. CICC'17, Austin, Tex., April 2017, pp. 1-4, incorporated by reference herein. Keysight B1500A and B1530A tools and a custom made switch matrix were utilized for characterization, programming, and measurements.

FIG. 12A shows an example of a current map showing conductance states for cells in the example 10×10 array after tuning the array with 10% accuracy to a randomly generated distribution of readout currents for 3000 cases with $\mu$=500 nA and $\sigma$=150 nA. Further, due to the reconfigurability of an example approach, a completely different map (that is, a new "fingerprint"), is obtained after re-tuning the same physical array to a new distribution, for instance with $\mu$=7.5 $\mu$A and $\sigma$=1.5 $\mu$A, as shown by example in FIG. 12B. FIGS. 12C and 12D show, respectively, the measured read-out current distribution ($I_R$ and $I_L$) and their difference for the example PUF instance (with $V_{WL,SEL}$=1.25 V, $V_{WL,US}$=1.35 V, $V_{CG,SEL}$=0.3 V, and $V_{SL}$=0.1 V) corresponding to the distribution in FIG. 12A. The similar shapes of distributions indicate that there is no explicit bias in the output. The corresponding uniformity is 52.6%, which is very close to the ideal (50%) value.

Figure 13:
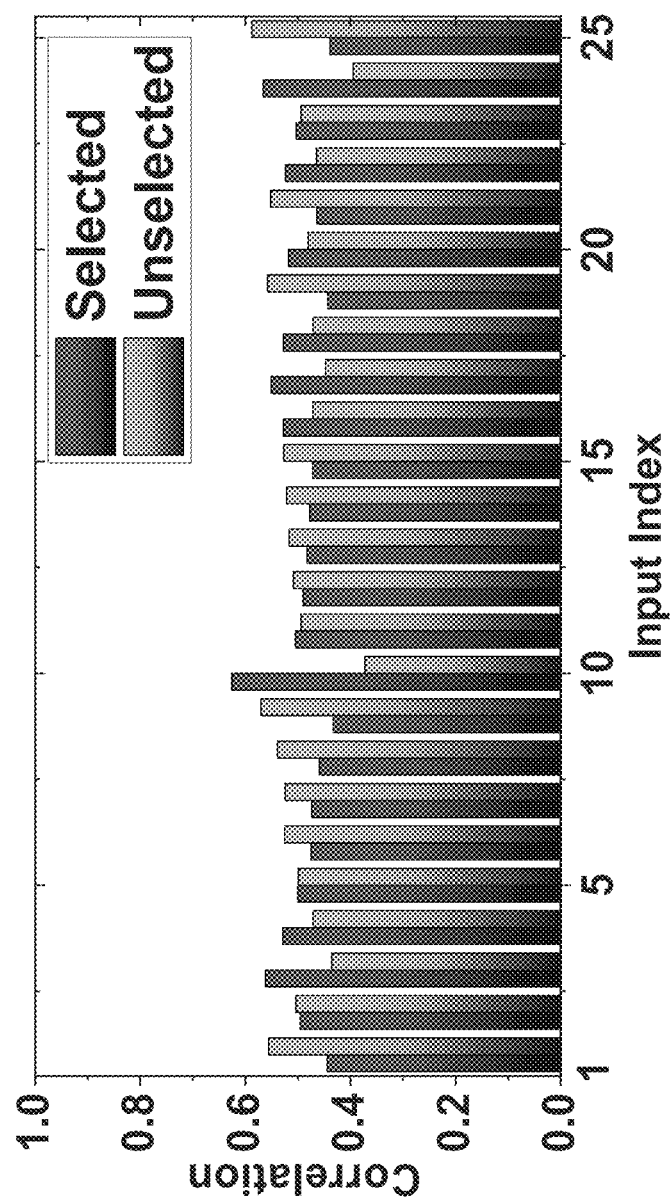
FIG. 13 shows measured correlation (fraction of 1 s in the response when particular bit at the input is selected) based on 4K random challenge-response pairs.

The lack of bias is also illustrated by the data shown in FIG. 13, showing a measured correlation based on 4000 random challenge-response pairs. The example results indicate that the output response is balanced with respect to the selected line in the example array, i.e. a value of '1' at a certain position in the challenge bit-vector.

Figure 14A:
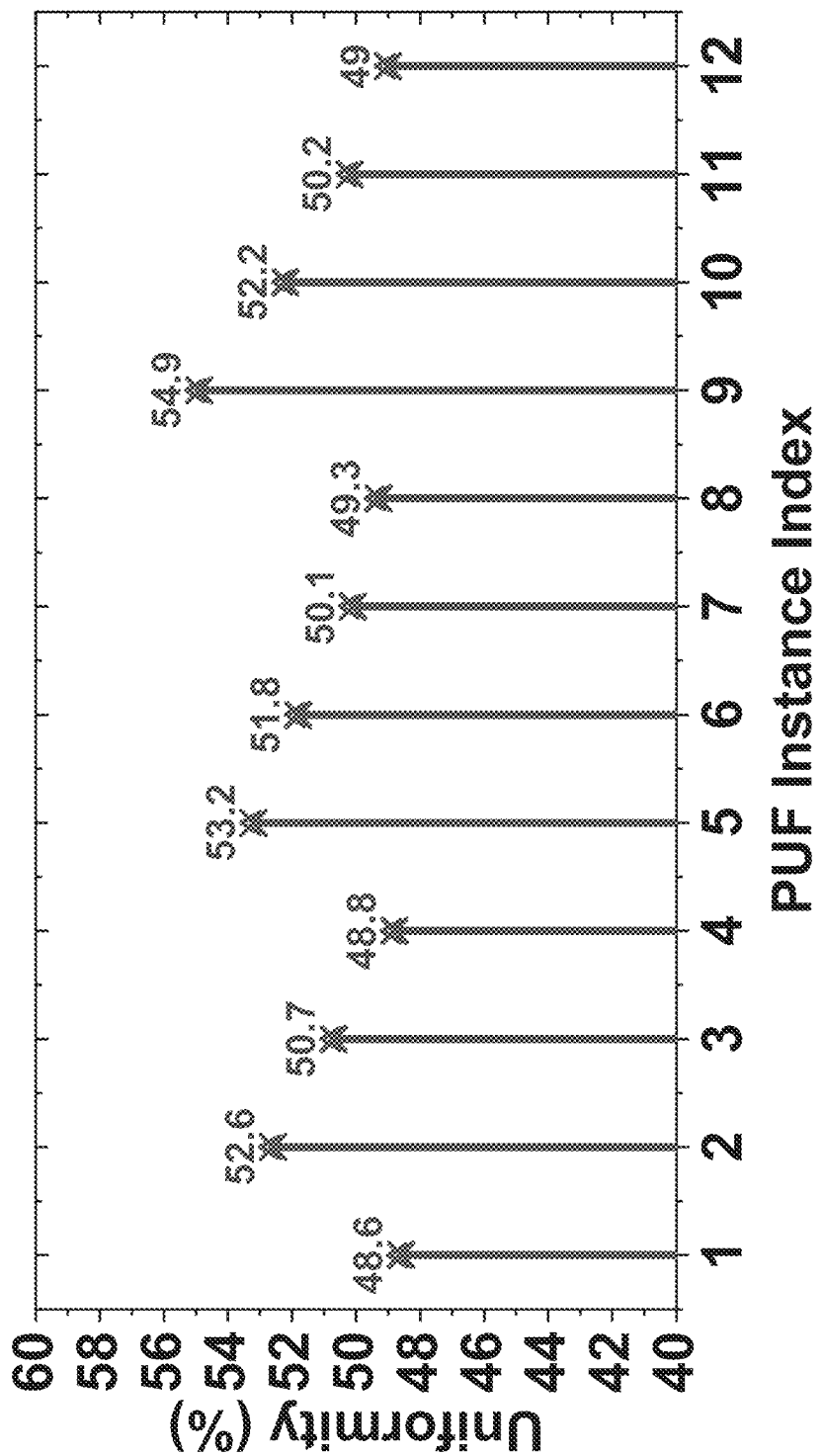
FIG. 14A shows response uniformity of 12 different primitive blocks obtained from reprogramming 4 different chips.
Figure 14C:
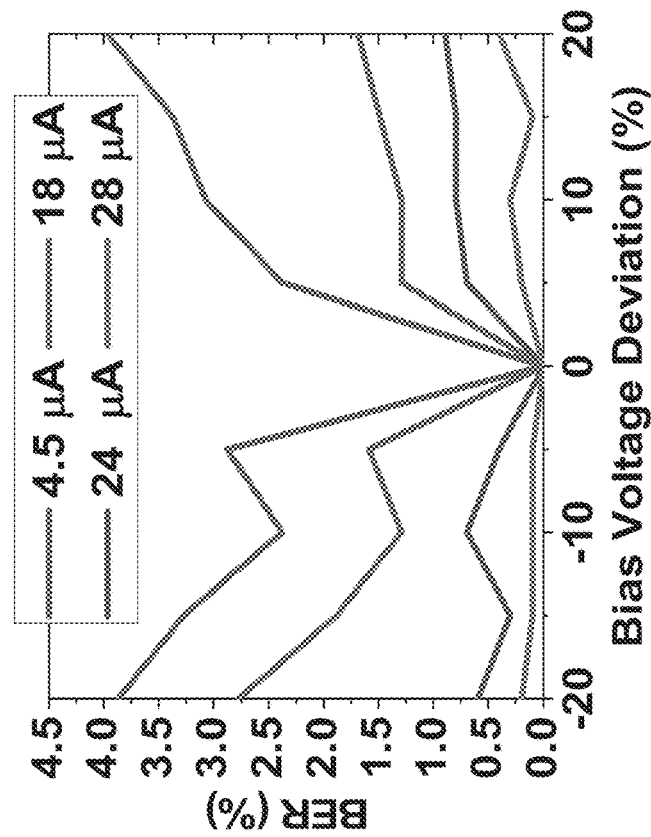
FIGS. 14B-14C show measured BER as function of (FIG. 14B) temperature at nominal SL readout voltage for several common-mode readout currents and (FIG. 14C) bias voltage deviation for different common-mode currents at room temperature.
Figure 14B:
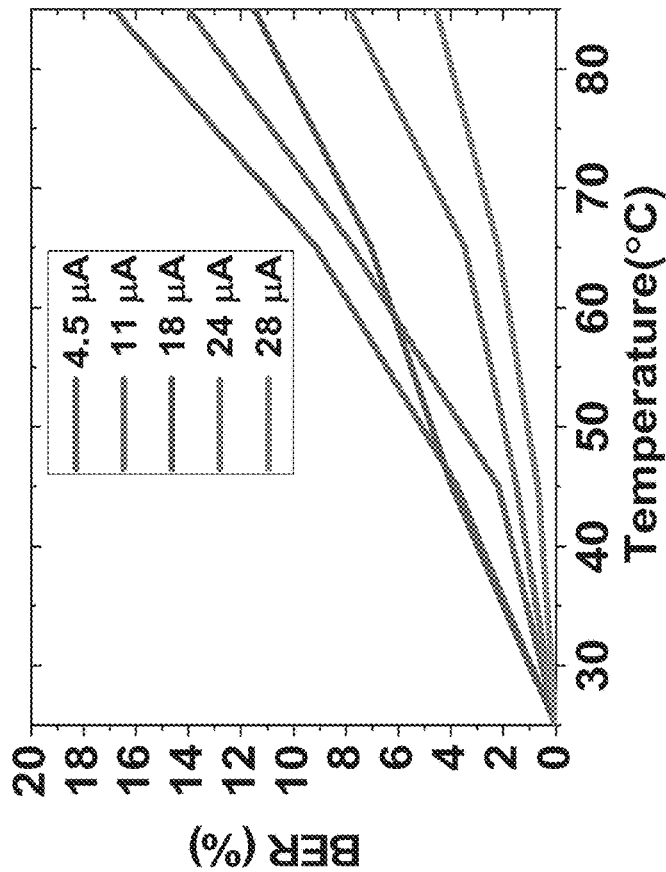

FIGS. 14A-14C show results of additional experiments measuring response uniformities of twelve different example primitive blocks (PUF instance index 1-12 in FIG. 14A) using four different silicon chips. For each example primitive block, the same tuning procedure was employed (Gaussian distribution with 10% targeted accuracy) but with different common-mode current, using mean values randomly picked from 200 nA to 5 $\mu$A range. Further, the sensitivity of the uniformity metric to the biasing condition was assessed by selecting appropriate $V_{WL}$ from 0.65 V to 1.35 V, $V_{SL}$ from 0.1 V to 0.5 V, and $V_{CG}$ from 0.1 V to 0.5 V to match the selected common-mode currents for each instance. For each primitive block, 4000 randomly selected challenge-response pairs were applied, and the response was measured at room temperature. The experimental results again show close to 50% uniformity for a majority of the considered instances.

FIGS. 14B-14C illustrate the dependence of bit error rate (BER) on the utilized common-mode current. Experiments were performed using five different example block instances with specified current-mode currents. Each example primitive block was characterized by measuring responses to 1K challenges at different ambient temperatures (with ±5° C. accuracy) (FIG. 14B) and nominal voltage deviations (bias voltage deviations) at room temperature (FIG. 14C).

FIGS. 14B-14C indicate that increasing temperature above the nominal 25° C., at which devices were tuned, resulted in a semiquadratic increase of BER, while the reliability was improved by operating at higher bias currents. This is most likely due to the weaker temperature dependency at larger subthreshold currents. Indeed, the currents are almost independent of the temperature in strong inversion, which property can be employed to build a temperature insensitive current-reference, such as that disclosed in A. Bendali, and Y. Audet, "A 1-V CMOS current reference with temperature and process compensation," IEEE TCAS-I, vol. 54, pp. 1424-1429, 2007. There is a clear trade-off between power consumption and BER, and thus a desired operating point can be determined based on power budget and BER requirements of an example PUF application. The same trend in BER is also observed with respect to the variations on the biased SL voltage (FIG. 14C), though the dependence is weaker.

Figure 15:
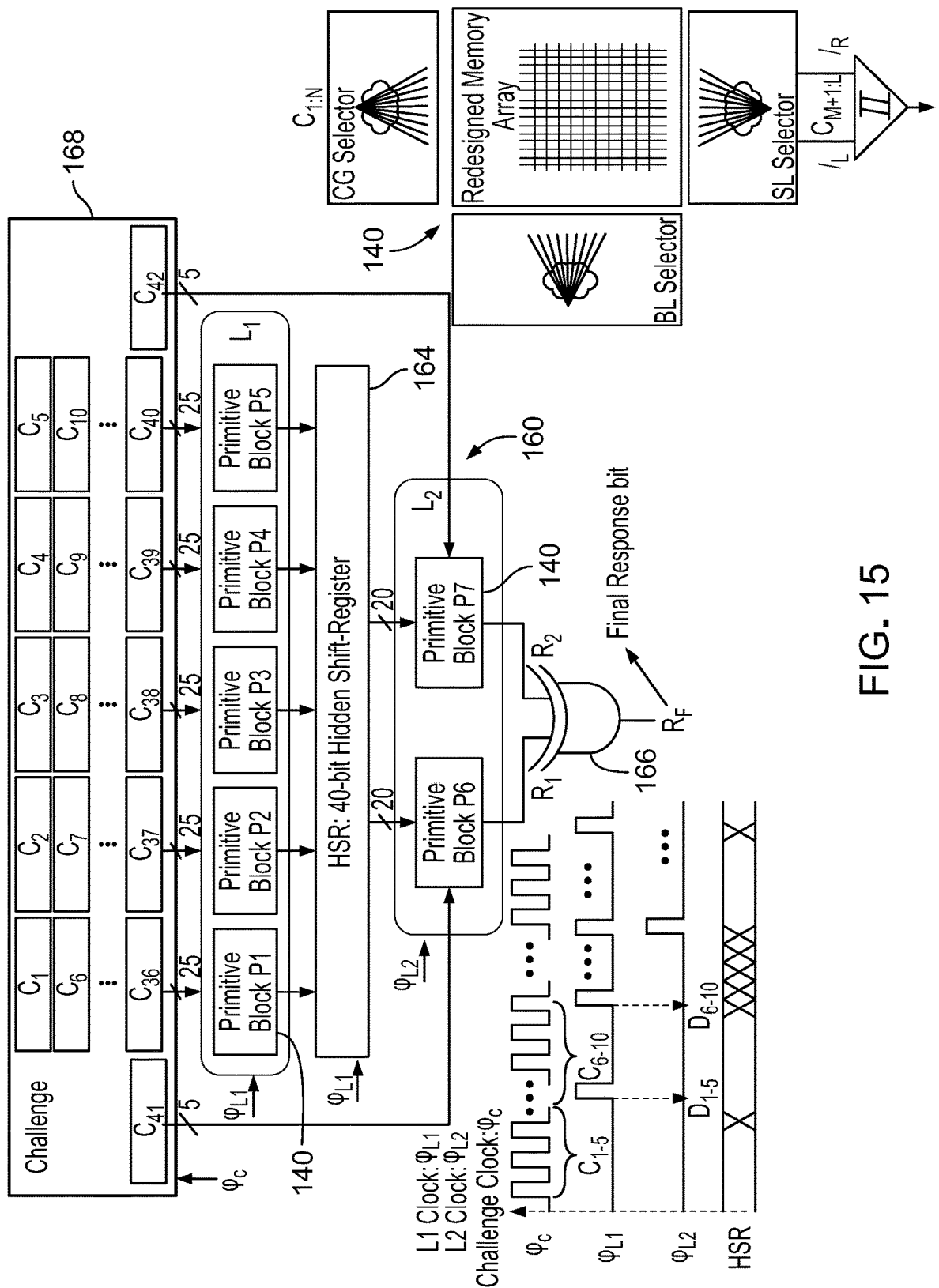
FIG. 15 shows an example integrated circuit (e.g., chip) architecture including connected primitive blocks according to FIG. 10.

FIG. 15 shows an example integrated circuit (e.g., chip) architecture 160 including connected primitive blocks (security primitives), such as the example primitive blocks 140 shown in FIG. 10. The example chip architecture 160 includes two layers L1, L2 of primitive blocks 140 connected via a hidden shift register (HSR) 164. Layer L1 includes primitive blocks P1, P2, P3, P4, and P5, while layer L2 includes primitive blocks P6, P7. Layers L1, L2, and the primitive blocks 140 within the layers, may be arranged in any suitable configuration. In a nonlimiting example embodiment, layers L1, L2 are stacked, while the primitive blocks 140 in each layer are arranged on a layer surface. Nonlimiting example layer and primitive block layouts are shown and described herein. The outputs $R_1$, $R_2$ of primitive blocks P6, P7 in Layer L2 are input to an XOR block 166, which outputs a final response bit $R_F$.

A non-limiting example input challenge C to the chip architecture 160 is a 1010-bit vector. The input challenge vector is partitioned by a partitioning block 168 into sub-vectors $C_1, C_2, \ldots, C_{42}$, such that each $C_i$ in a first group $1 \leq i \leq 40$ is 25-bit long, while each C in a second group $41 \leq i \leq 42$ includes 5 bits. The $C_i$s from the first group are used as an input to five primitive blocks (P1-P5) in the first layer L1. The remaining two sub-vectors are used to select SLs of the two primitive blocks (P6, P7) in the second layer L2.

An example operation of the chip architecture 160 is time multiplexed (e.g., time-domain multiplexing (TDM)) with the help of control signals (e.g., clock signals) $\varphi_{L1}$, $\varphi_{L2}$, and $\varphi_C$, as shown in the example timing diagram in FIG. 15. In this example operation, $\varphi_C$ provides a challenge clock signal. Control signal $\varphi_{L1}$ controls the first layer L1 to generate and fill in the HSR with 40 response bits over 8 cycles of operation, with a total of 5 bits produced in each cycle by the five corresponding primitive blocks P1-P5 (e.g., $D_{1-5}$ in the first cycle in FIG. 15). Using $\varphi_{L1}$, output HSR bits are applied to the WL/CG and the BL of primitive blocks P6-7 to generate outputs $R_1$ and $R_2$. These outputs are then XORed in the XOR block 166 to generate the final response bit ($R_F$) and reduce any undesirable bias.

Assuming the delay of each block is $t_d$, a simple pipelining of the design would result in $\frac{1}{8}t_d$ (bit per second) throughput. It has been shown that an example comparator consumes 1.625 fJ per conversion with 1 nA sensitivity in 55 nm CMOS, which is equivalent to 192.3 Mbps throughput.

The example time-multiplexing approach shown in FIG. 15 allows low area implementation with a very large number of challenge-response pairs (CRPs). Enabling a large (e.g., >$10^{200}$) number of CRPs is useful for providing a very secure PUF, though at the expense of relatively lower throughput and decreased energy-efficiency. For the example method shown in FIG. 15, the maximum number of distinct selections for P1-6 is $$S_P = \binom{10}{5}\binom{10}{5}\binom{5}{2}.$$

All of the primitive blocks P1-P5 in the first layer L1 contribute equally (4 bits) to the 20 bits needed in the second layer L2 primitive blocks P6, P7. The total number of distinct selections is given by $$\binom{S_P}{8}^5 \binom{5}{2}^2 \approx 10^{211}.$$

There are various benefits to using smaller arrays for time-multiplexed implementation of example methods. For instance, smaller arrays can be more efficient for utilizing sneak path currents, because leakage currents in larger arrays can be mostly controlled by a relatively small fraction of semi-selected cells. Second, undesired stuck-on devices in an array can bias the PUF response and potentially make the circuit vulnerable to probing attacks. Thus, it will be appreciated that such stuck-on devices can be mitigated more efficiently when using smaller arrays.

An example architecture 160 according to FIG. 15 was characterized using the primitive blocks 140 shown in FIG. 10. The measured currents were used in a post-layout simulation setup of CMOS circuits. The example fully integrated design occupied 1.3×1.0 mm². This nonlimiting example design area was dominated by low-voltage (0.3 mm²) and high-voltage (0.1 mm²) input/outputs (IOs) and unused silicon (~0.9 mm²). The example active circuits, including the example programming circuitry (4475 µm²), flash memory array (235 µm²), registers (19,250 µm²), comparators (150 µm²), and logic (110 µm²), on the other hand, were very compact (total of 24,216 µm²).

Figures 16, 17:
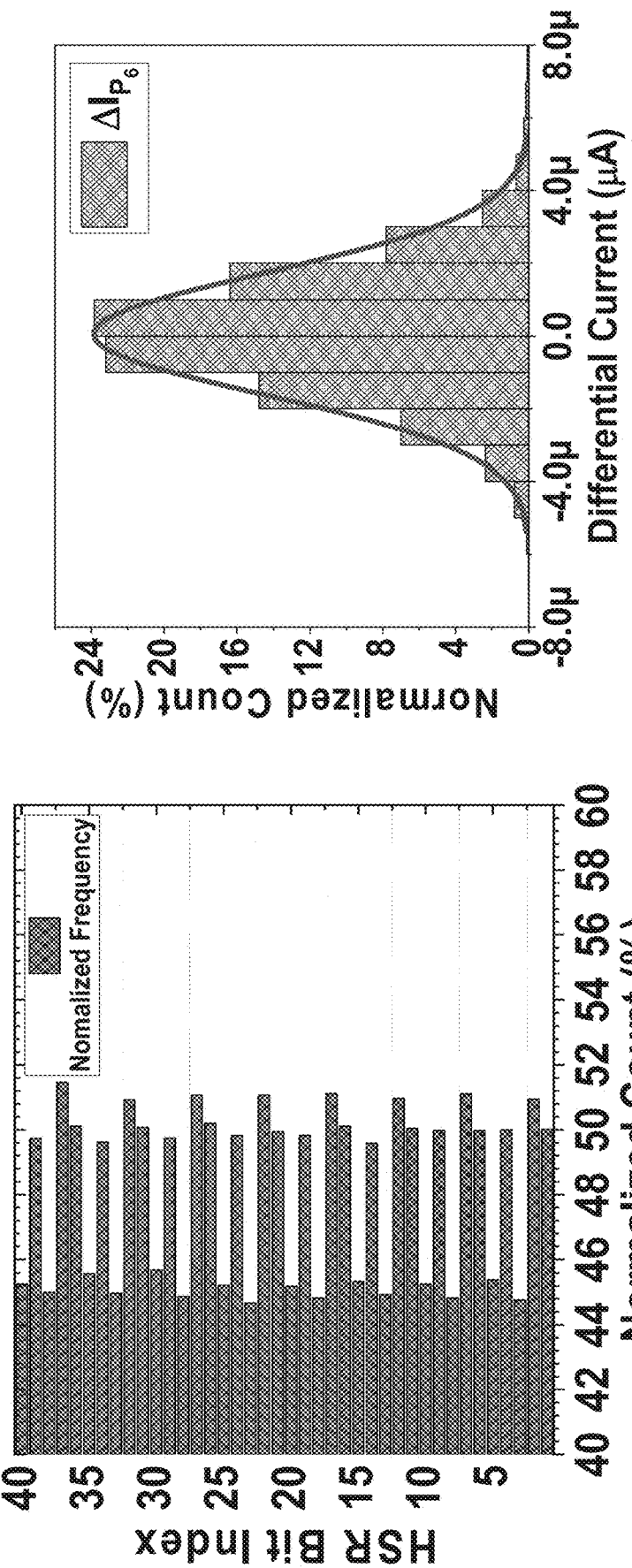
FIG. 16 shows a normalized Hamming weight of HSR bits over 100K applied challenges.
FIG. 17 shows a differential current distribution of primitive block P6 of FIG. 15, with the inset showing the corresponding CDF.

FIG. 16 shows a normalized Hamming weight of HSR bits over 100K applied challenges, while FIG. 17 shows an example differential current distribution of an example primitive block (P6). FIG. 16 indicates that the measured uniformity of HSR bits was near ideal for primitive blocks (P1, P2, P4), though there was some visible bias in responses for primitive blocks (P3, P5). Despite this, the differential current distribution of primitive blocks P6, P7 appears symmetrical, as shown by example in FIG. 17 for primitive block P6. In this example, P6 was tuned using 500 nA average state current and operated at $V_{WL,SEL}$=0.85 V, $V_{WL,US}$=0.9 V, $V_{CG,SEL}$=0.3 V, and $V_{SL}$=0.3 V.

Figure 18:
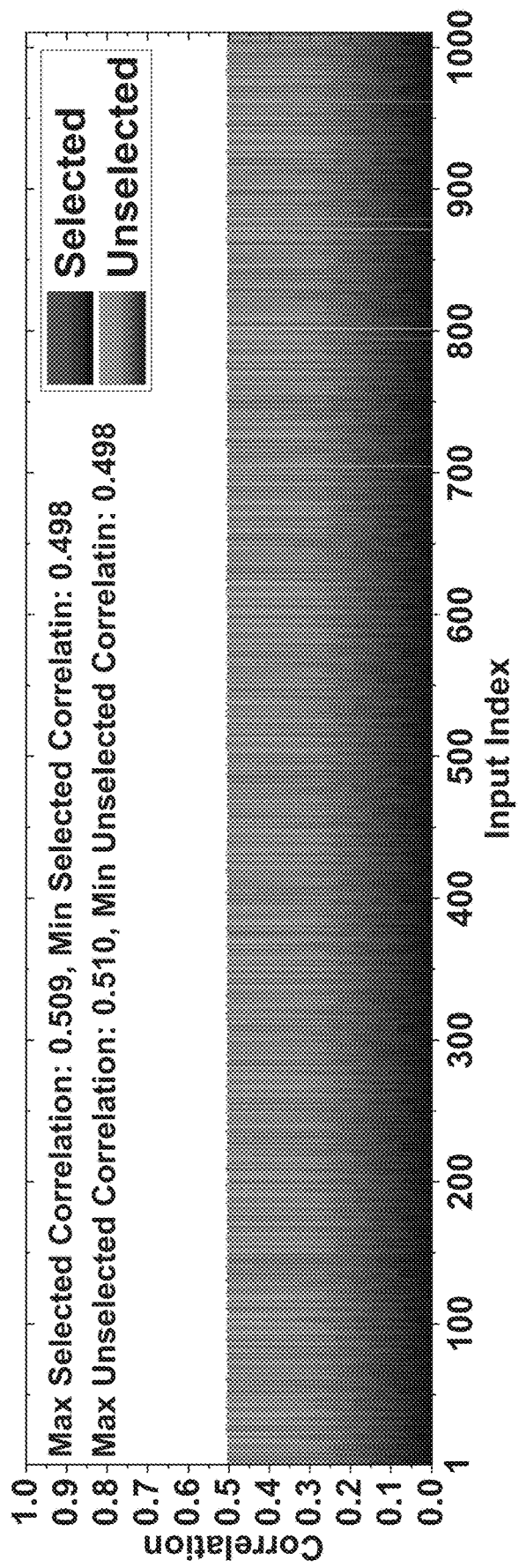
FIG. 18 shows a measured correlation based on 100K random challenge-response pairs.
Figure 19:
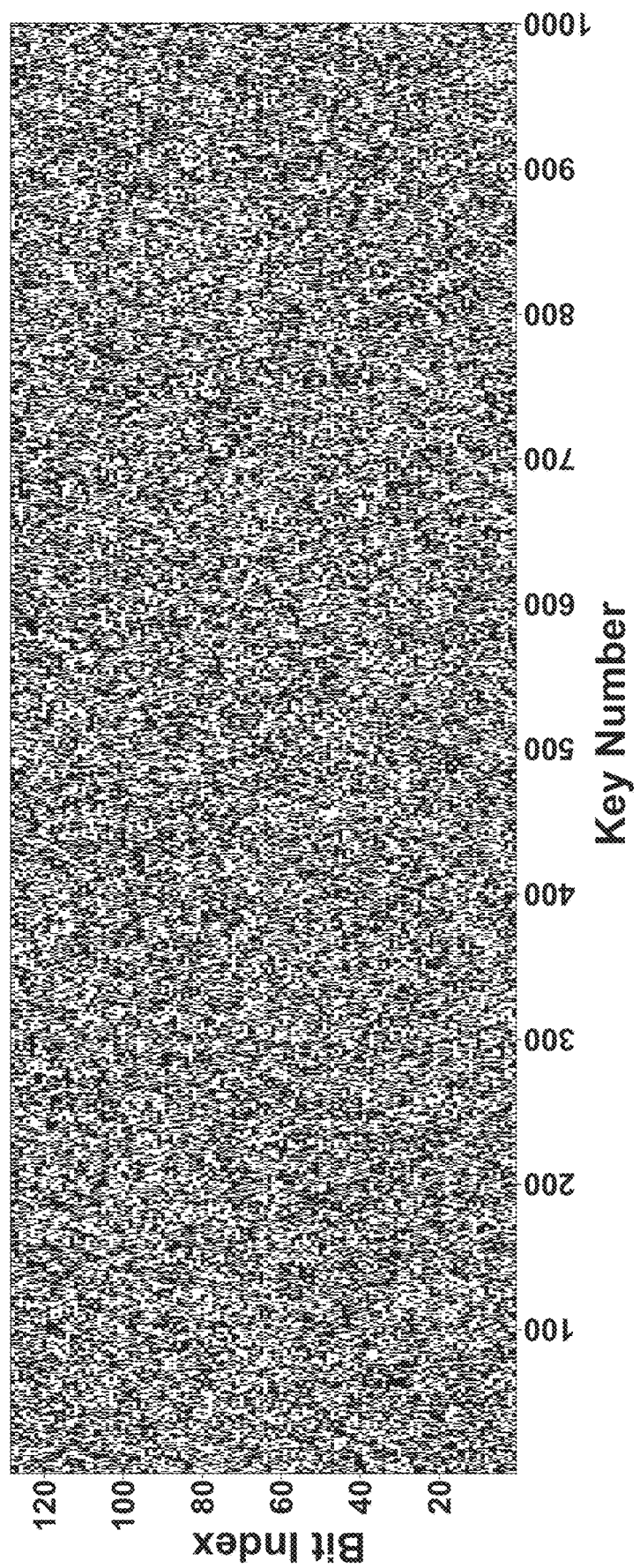
FIG. 19 is a 2D representation of 1K 128-bit keys (black='1').

As shown in FIG. 18, the measured correlations, based on 100K challenge-response pairs, were much weaker as compared to those for a single primitive block. The randomness in the output response is also highlighted by a two-dimensional visual representation of 1000 randomly selected 128-bit keys, as shown in the speckle distribution in FIG. 19 (where black='1').

Figure 20:
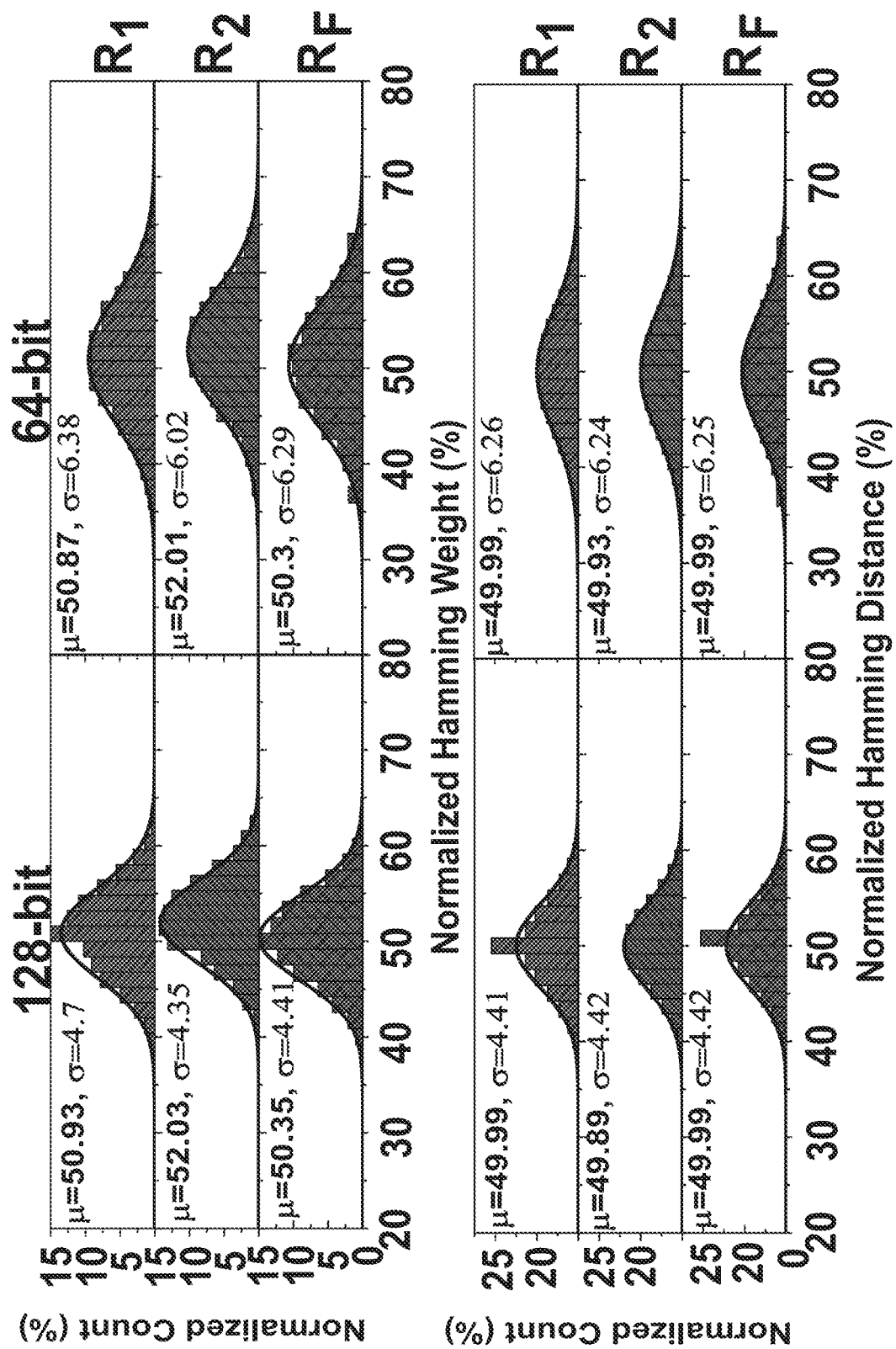
FIG. 20 shows (top) Fractional Hamming weight and (bottom) fractional Hamming distance distribution of R1, R2, and RF. The results were computed based on (a) 5K and (b) 1K randomly generated 64-bit and 128-bit keys.

FIG. 20 (top) shows a fractional Hamming weight distribution for 5000 64-bit and 128-bit keys generated based on $R_1$, $R_2$, and $R_F$ of the example architecture. Keys are generated by, for instance, concatenating the corresponding output bits. Based on these results, the example architecture provided an average uniformity of 50.3%. (The measured uniformity for a larger set with 100K responses was 50.9%, 52.0%, and 50.3% for R1, R2, and RF, respectively.) FIG. 20 (bottom) shows near optimal results for diffuseness, which is another important metric that evaluates the difference (Hamming distance) between unique keys generated by the same PUF under different challenges.

As provided herein, example devices can be tuned to achieve a particular (e.g., selected) common-mode current, and accordingly a desirable (e.g., selected) BER. Using the relationships shown in FIGS. 14A-14C, for instance, a native BER of <5%, as a nonlimiting example, can be achieved in the example device with (for instance) ~30 µA. In this example, the energy efficiency is 0.56 pJ per bit, with 88%/12% contributed by array/comparators. Additional post-processing and error correction methods, e.g., such as disclosed in S. Mathew et al., "A 0.19 pJ/b PVT-variation-tolerant hybrid physically unclonable function circuit for 100% stable secure key generation in 22 nm CMOS," in: Proc. ISSCC'14, San Francisco, Calif., 2014, pp. 278-279, incorporated by reference, can be utilized in example architectures to further improve reliability.

Figure 21:
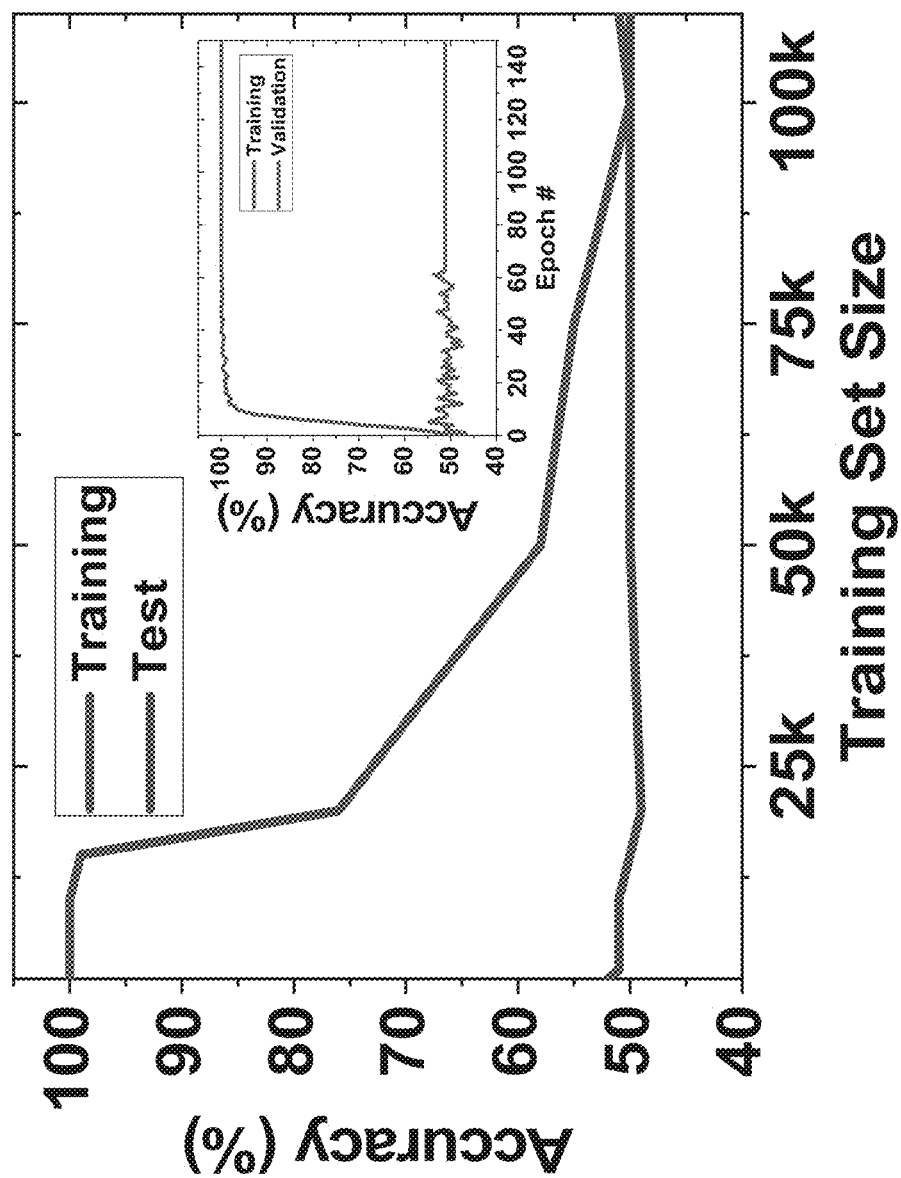
FIG. 21 shows results of a modeling attack by an MLP network as a function of training set size (shown in bits). Training is performed with RMSdrop optimizer with the learning rate of 0.001. For all data points, the validation set size is 25% of training size. The inset shows the learning curve for 2K training data over 150 epochs.

Machine learning attack resiliency of the example architecture was assessed using a multilayer perceptron network (1010×100×100×100×1) with rectified linear activation function in the hidden layers and a sigmoid activation function in the output layer. RMSprop was used as optimizer, and manually-found semi-found optimal learning rate of 0.001. 64% and 16% of challenge-response pairs (CRPs) were used for training and validating the network, respectively. The classifier was trained with a specific size subset of the observed CRPs and then tested on another mutually exclusive data. The test accuracy as a function of training set size is provided in FIG. 21, which indicates close to ideal 50% prediction accuracy.

Additionally, the networks LIBSVM and LIBLINEAR disclosed in S. Jeloka et al., "A sequence dependent challenge-response PUF using 28 nm SRAM 6T bit cell," in Proc. VLSI-Symp'17, Kyoto, Japan, June 2017, pp. 270-281, were tested for the example architecture. For both networks, the validation accuracy was also close to 50%.

Figure 22:
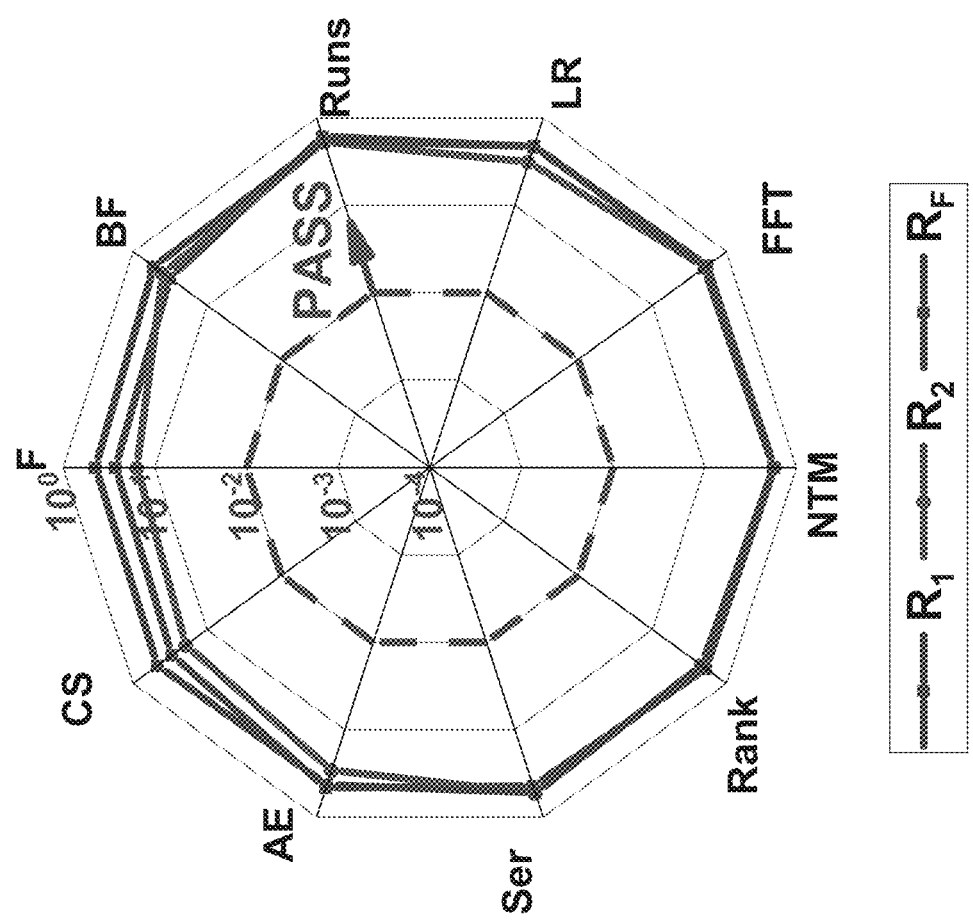
FIG. 22 shows results of an NIST randomness test using 100K measured responses based on 50 2K-length bit-streams.

FIG. 22 shows results of a National Institute of Standards and Technology (NIST) randomness test suite utilized to evaluate the statistical properties of 100K measured data. The results show that the bitstreams generated by the example architecture passed the relevant tests.

Particular example embodiments have been shown to provide, among other things, physically unclonable functions (PUFs) that can provide an average uniformity of, e.g., 50.3%, average diffusivity of 49.99% and features 0.56 pJ/b energy efficiency and <5% BER. strong resiliency toward machine learning attacks. As compared with some conventional implementations, example architectures employing PUFs disclosed herein (e.g., eFlash CMOS, 55 nm) allow for a significantly greater number of CRPs and a potentially smaller (and selectable) BER. As compared to certain known methods, example architectures can provide near-ideal prediction accuracy/error. Chip area and energy efficiency for example architectures can also be suitably provided for various applications.

Figure 23:
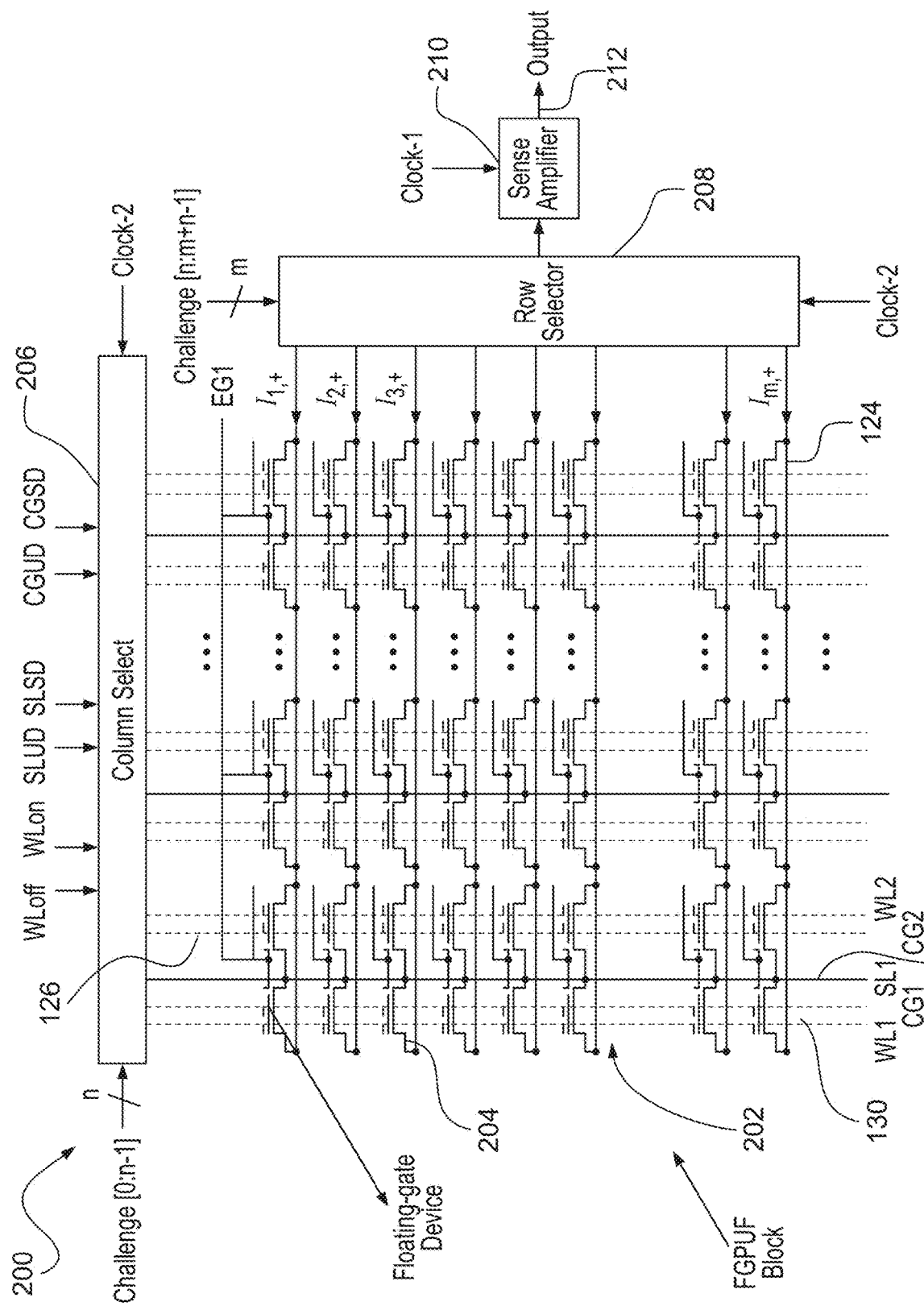
FIG. 23 shows a floating-gate primitive block (primitive block circuit) according to another example embodiment.

FIG. 23 shows a floating-gate flash cell-based primitive block (primitive block circuit, also indicated in the figure as a floating-gate physically unclonable function (FGPUF)) 200 according to another embodiment. The primitive block 200 includes an array 202 of floating-gate devices 204 as shown in FIG. 5, arranged in a crossbar configuration. A column select switching block 206 operates similarly to the row switching circuitry 148 in FIG. 10, although the column select switching block is coupled to the source lines (SL) 122 in addition to the word lines (WL) 130 and control gates (CG) 126 for switching these lines in response to an input challenge. A row selecting circuitry block 208 selects the bit lines (BL) 124. A sense amplifier 210 is coupled to the row selecting circuitry block 208 and provides an (e.g., one-bit) output 121. As with the example primitive block 140 shown in FIG. 10, random process-induced variations in subthreshold slope, leakage, and tuning accuracy of the embedded flash memory cells 120 are employed to provide a reliable PUF.

In an example operation, a challenge including m bits is input to the primitive block circuit 200, of which n bits (0:n−1) are provided to the column select switching block 206, and the remaining bits (n: m+n−1) are provided to the row select switching block 208. If a particular row is selected, the selected row is connected to the sense amplifier 210, and all unselected rows are left floating.

An example operation includes two general phases. In a programming phase, the voltage thresholds of the floating-gate devices 204 (that is, the state of the devices) are tuned. Then, in a read phase, the input challenge is applied to the primitive block circuit 200, and the output is evaluated by the sense amplifier. If a column is selected by the input challenge, the corresponding selected devices 204 are biased using $WL_{on}$, $CG_{SD}$, and $SL_{SD}$. Other, unselected devices 204 are connected to WLoff and $CG_{UD}$, and $SL_{UD}$ is floated. The sense amplifier 210 senses the currents of the selected rows and provides a proper binary output 212 (e.g., a one or zero output bit). Sensed current can be, for instance, from bitlines and/or from source lines.

Figure 24:
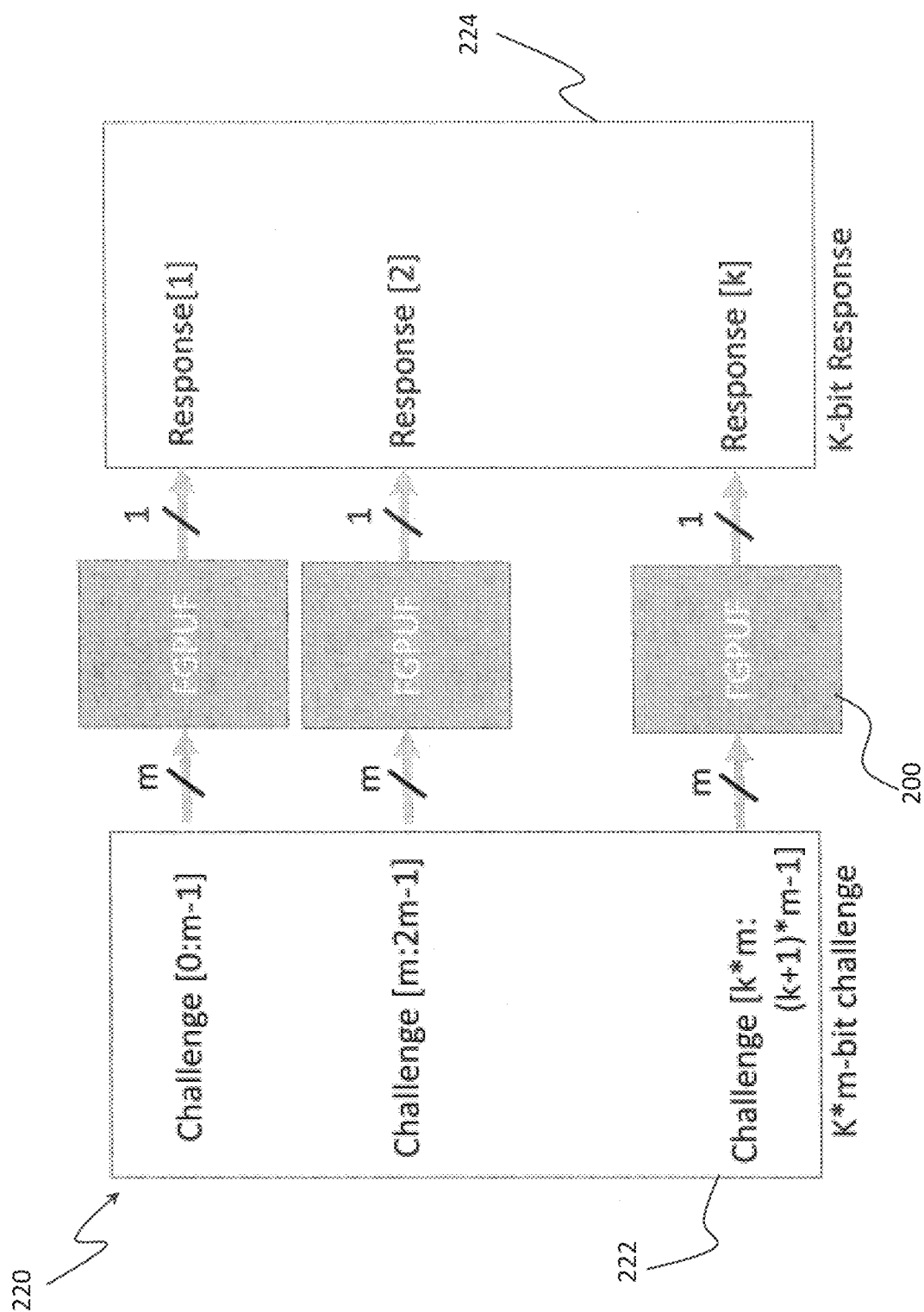
FIG. 24 shows a system including a parallel arrangement of k primitive blocks.

FIGS. 24-28 show various example architectures and operations incorporating primitive block circuits (primitive blocks), such as the primitive blocks 140, 200 shown in FIG. 10 or 23, for generating response bits given an input challenge. FIG. 24 shows a system 220 including a first parallel arrangement of k primitive blocks 200 to increase an output bit rate by generating multiple parallel outputs in the same cycle given m bits. The system receives an input challenge 222 including k*m bits. Each primitive block 200 receives an m-bit challenge, and processes the challenge to generate a response bit. A k-bit response 224 is generated by the system 220.

Figure 25:
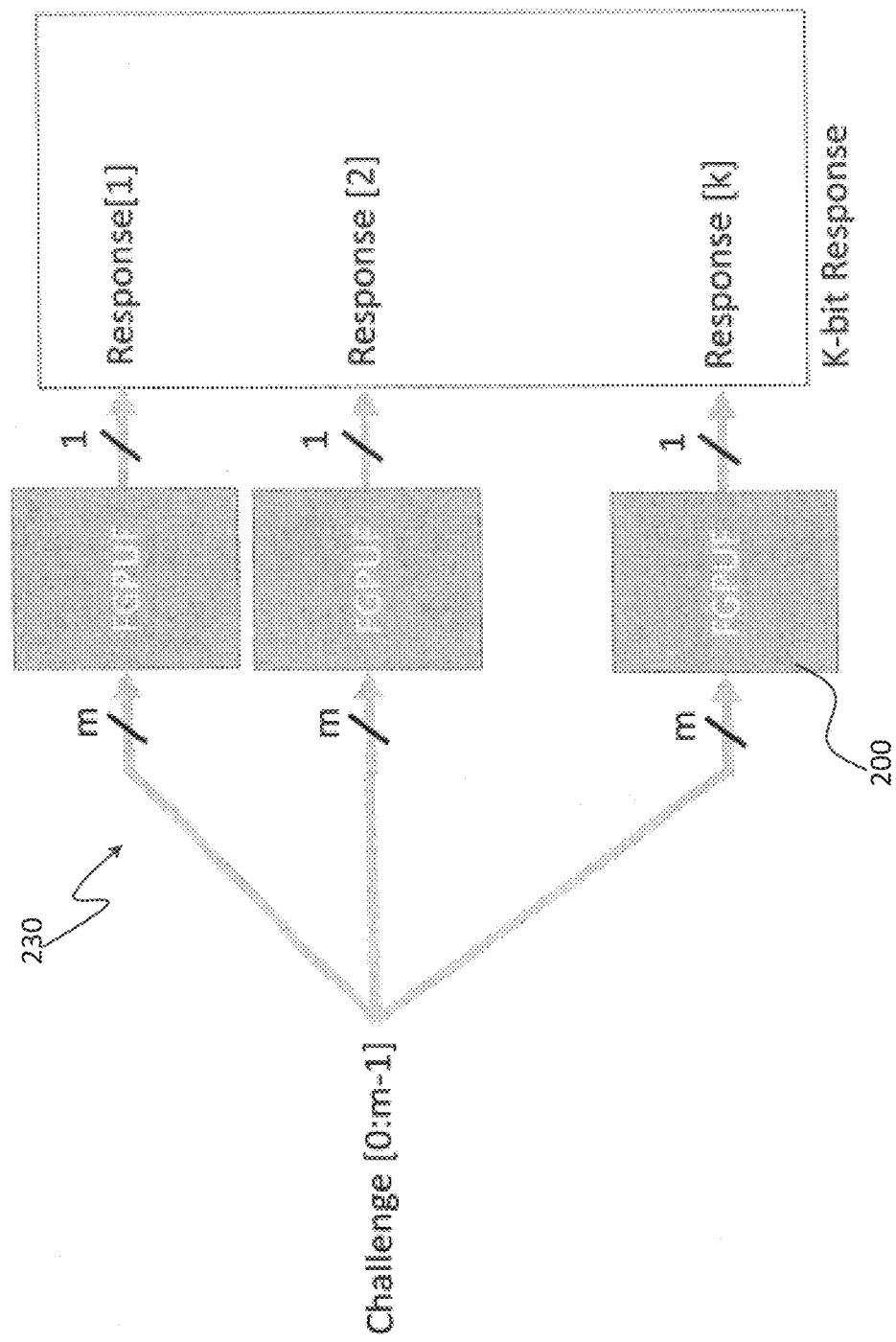
FIG. 25 shows an alternative operation for a parallel arrangement of k primitive blocks.

FIG. 25 shows an alternative operation for a parallel arrangement 230 of k primitive blocks. To reduce the input bandwidth overhead, an m-bit challenge is received by the system 230, and the same challenge (m-bit) is provided to each of the k primitive blocks 200 operating in parallel. The parallel primitive blocks 200 generate a k-bit response per cycle.

Figure 26:
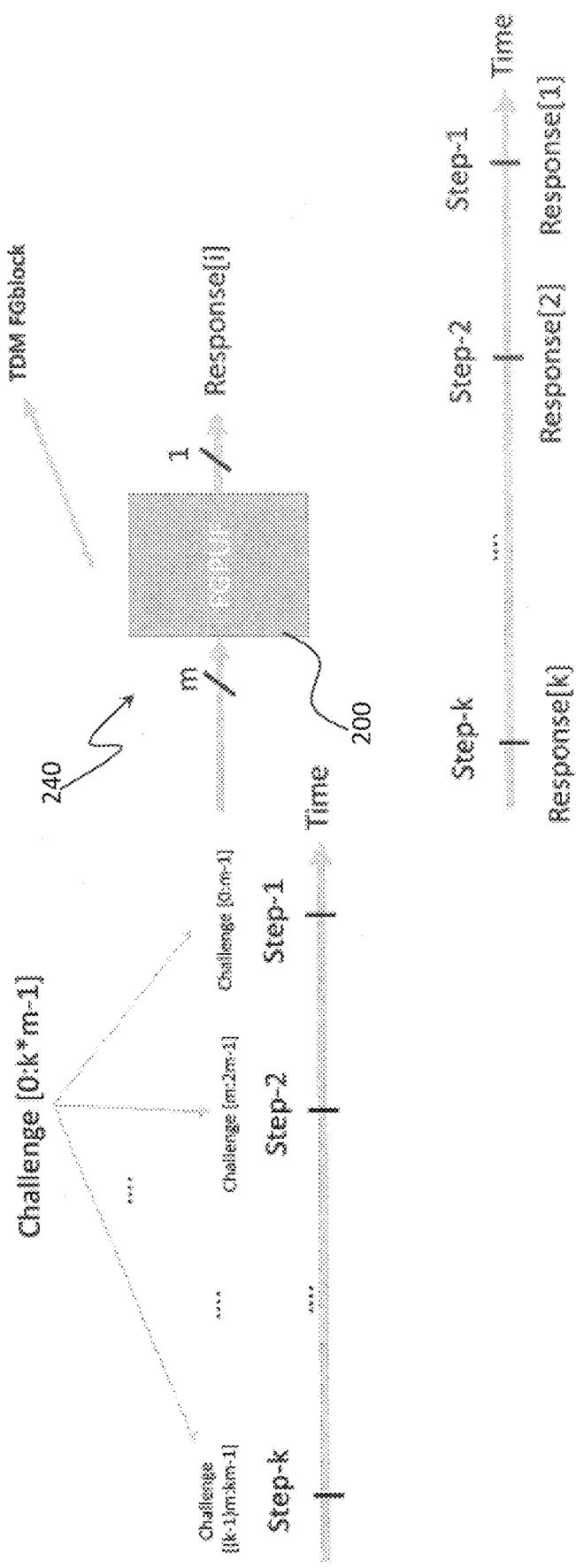
FIG. 26 shows an example time-domain multiplexing (TDM) architecture (TDMPUF) and operation using a primitive block (FGPUF).

FIG. 26 shows an example time-domain multiplexing (TDM) architecture (TDMPUF) 240 and operation using a primitive block 200. Each input string (input challenge) is divided into k bundles of m-bits. Each m-bit is provided to the primitive block 200 as one of k input challenges. The primitive block 200 generates one bit for each of the k challenges, and at the end (for example) of all TDM steps the outputs are concatenated to generate a k-bit output string; e.g., Response[1:k]={Response[1], Response[2], Response[3], . . . , Response[k]}. Alternatively or additionally, the outputs are combined (e.g., XORed) at the end of each TDM step, so that one bit is generated at the end; e.g., Response={Response[1]⊕Response[2]⊕Response[3]⊕ . . . ⊕Response[k]}.

Figure 27:
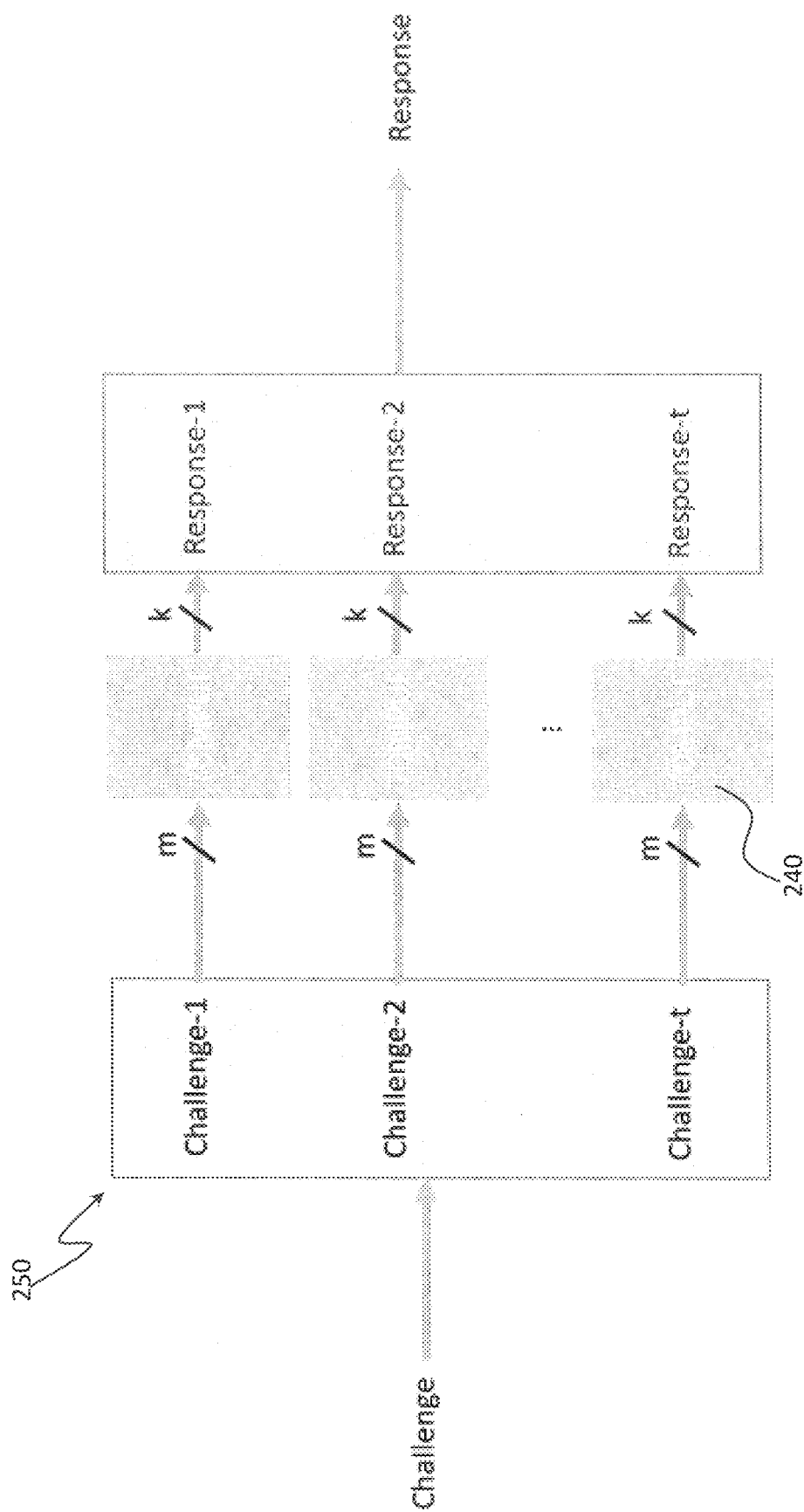
FIG. 27 shows an example parallel architecture (stacked time-domain multiplexing architecture or STTDMPUF) for TDM operation including t TDMPUF blocks in parallel.

FIG. 27 shows an example stacked parallel architecture (stacked time-domain multiplexing architecture or STTDM-PUF) 250 for TDM operation including t TDMPUF blocks 240 in parallel. All TDMPUF blocks 240 preferably operate in synchronous. An input string is provided to all TDMPUF blocks 240, and each block is assigned a certain input pattern at a certain time. The example STTDMPUF architecture 250 generates t*k bits per pattern in k cycles. After k steps, all outputs are provided. The output bit per each TDMPUF block 240, or the complete STTDMPUF block 250, can be any combination of output responses, such as but not limited to concatenation, XOR or other bit combination, etc.

Figure 28:
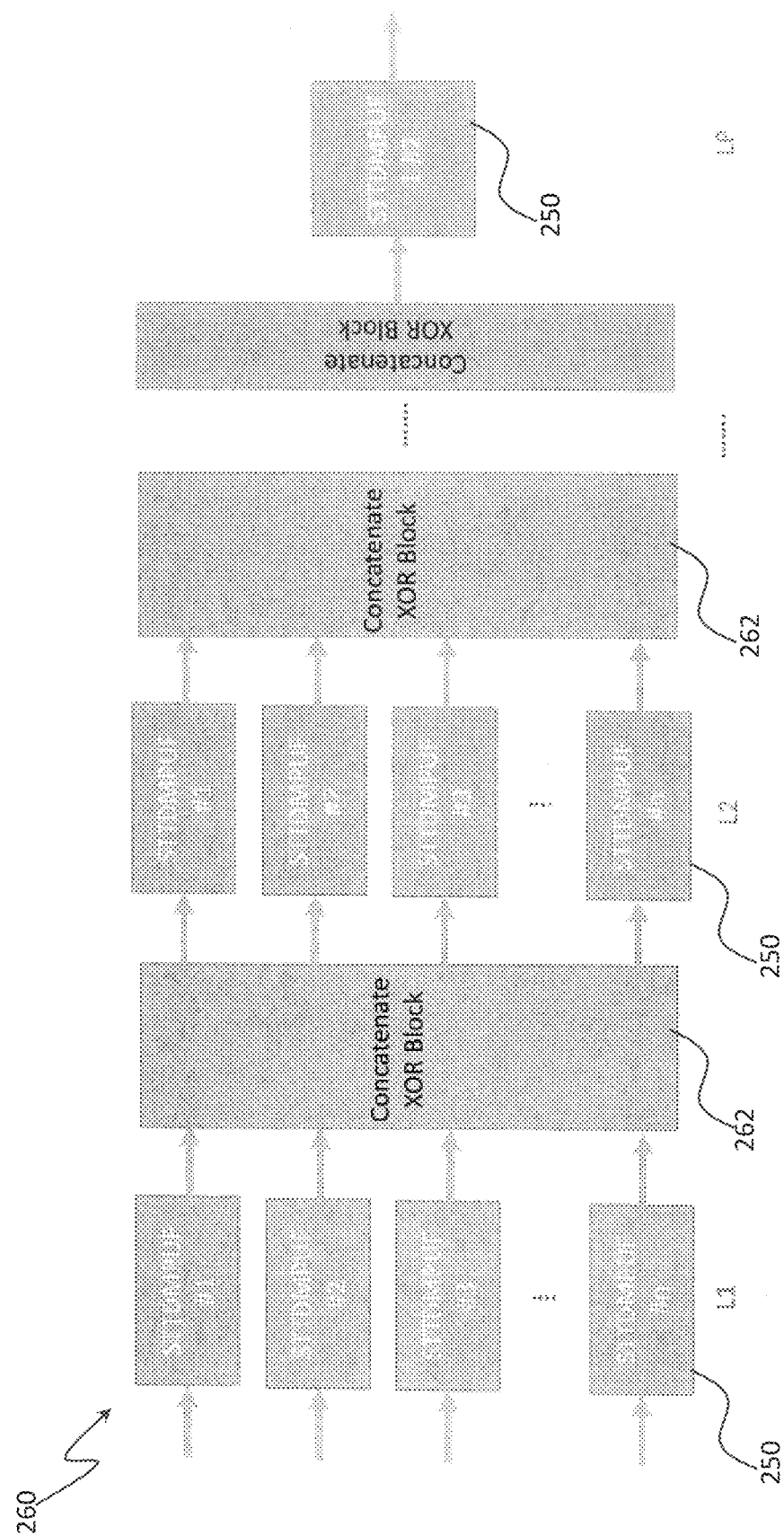
FIG. 28 shows an example multi-layer architecture (multi-layer STTDMPUF), including p layers L1 . . . Lp each including n STTDMPUF blocks arranged in parallel.

FIG. 28 shows an example multi-layer architecture (multi-layer STTDMPUF) 260, including p layers L1 . . . Lp each including n STTDMPUF blocks 250 arranged in parallel (though it will be appreciated that one or more layers could respectively have greater or fewer numbers of blocks). An input string is provided to the example architecture 260 as a set of challenges. For each of the players, an output bit processing block 262, such as a concatenation block, XOR block, etc., combines the output bits from the n parallel STTDMPUF blocks 250 for that layer as needed for a particular application. The combined output bits are then input to the n parallel STTDMPUF blocks 250 of the next layer (either the same input to each block or separate input as needed), and so on, until a final STTDMPUF block 250 for layer p processes the output bits from the last layer (e.g., p−1) to generate a final output (single or multiple bits).

Figure 29:
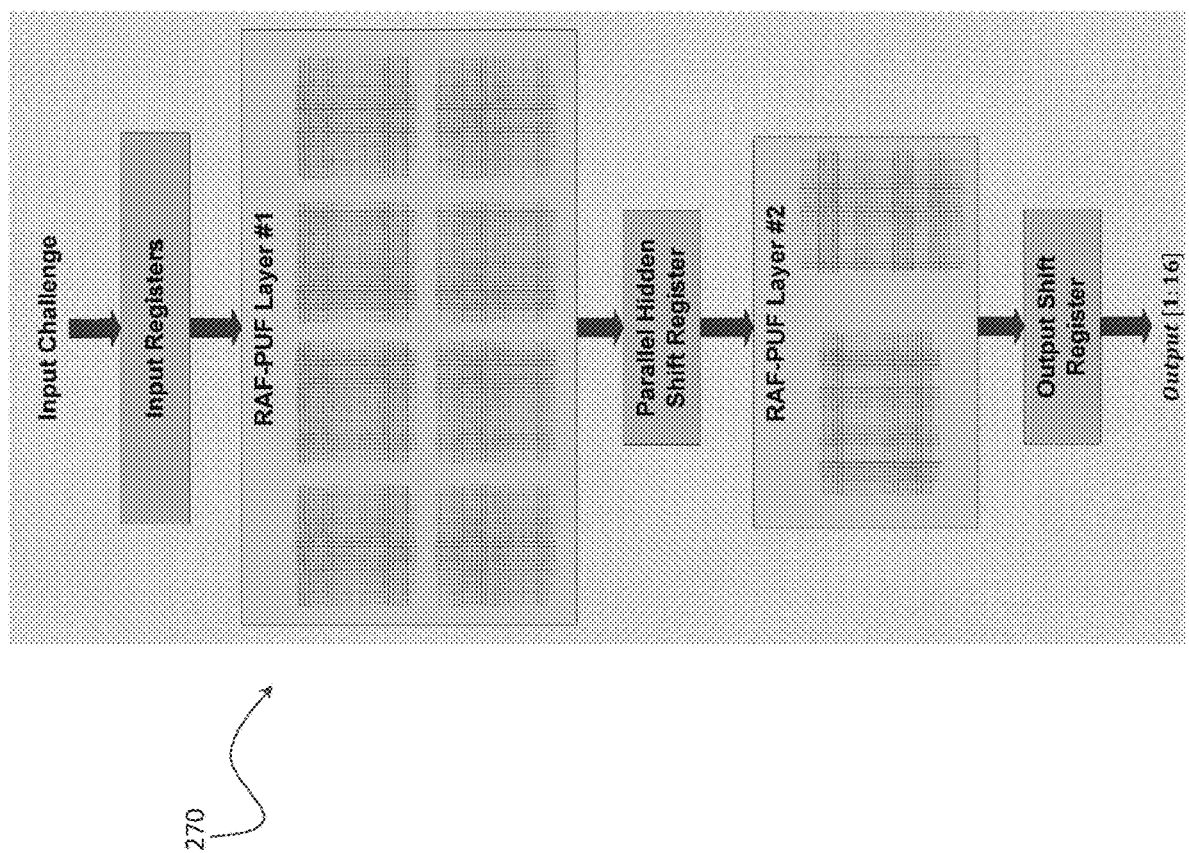
FIG. 29 shows a first conceptual level of an integrated circuit according to another example multi-level architecture.
Figure 30:
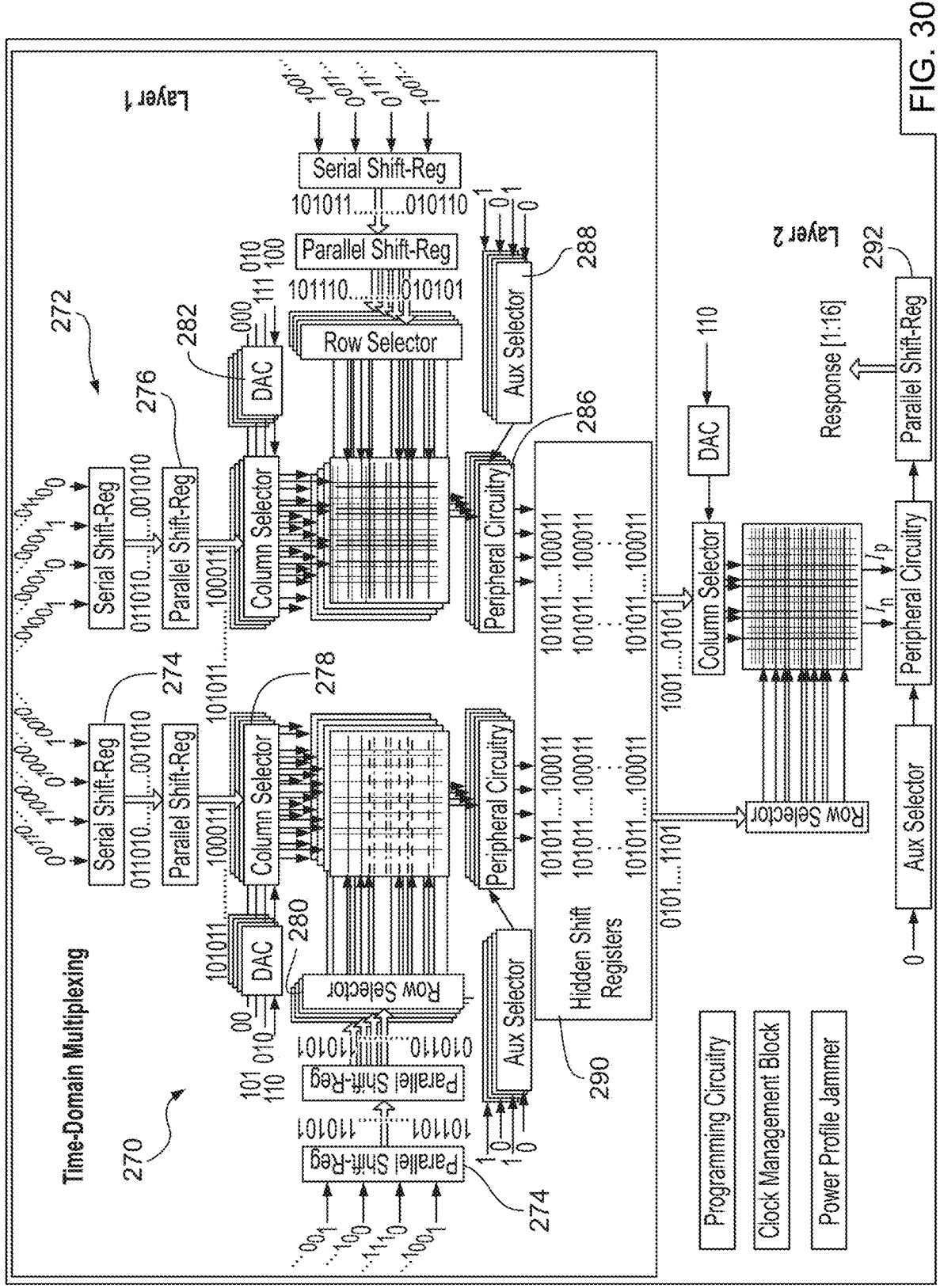
FIG. 30 shows a second conceptual level of the multi-level architecture of FIG. 29.

FIGS. 29-30 show an integrated circuit 270 according to another example multi-layer architecture. The integrated circuit 270 and others provided herein can be used for, as a nonlimiting example, cryptographic tasks such as key generation, encryption, or decryption for tasks such as, but not limited to, identification, authentication, data encoding, random number generators (PRNGs), and others. Using an array of example reconfigurable analog flash-based primitive blocks (RAF-PUFs) such as those provided in FIGS. 29 and 30, the example integrated circuit exploits random process-induced variations in analog behavior of the embedded floating-gate transistors.

The example multi-layer architecture 270 in FIGS. 29-30 is a TDM-based and pipeline architecture, including (at least) first and second (RAF-PUFs) layers. The first RAF-PUF layer (Layer #1) includes a two-dimensional array (for instance, 2×4) of primitive blocks, while the second RAF-PUF layer (Layer #2) includes a one-dimensional array of one or more primitive blocks. PUFs can be, for instance, similar to any of the primitive blocks 140, 200, 240, 250 disclosed herein, and can be arranged along a plane and/or stacked. For instance, the first RAF-PUF layer shown in FIGS. 29-30 includes two stacks of four primitive blocks, each primitive block including an array of floating-gate flash memory cells, e.g., cells 120, 204, and an associated row selector circuitry block and column selector circuitry block, such as those disclosed herein.

An input register circuitry block (input register block) 272 disposed for input to the first PUF layer includes multiple serial shift-register blocks 274 for producing multiple serial bitstreams from a received multibit input challenge. The serial shift-register blocks 274 are respectively associated with one stack (or set, more generally) of parallel columns and one stack (or set) of parallel rows for each stack (or row, or column, or single dimension) of PUFs of the first RAF-PUF layer. For instance, as shown in FIG. 30, the input register block 272 includes four serial shift-register blocks 274, each being associated with a stack of parallel rows and a stack of parallel columns for each of the two stacks of RAF-PUFs.

Each serial shift register block 274 outputs to a corresponding parallel shift register block 276 respectively associated with each column, or each row, in each stack. The parallel shift register blocks produce parallel bitstreams that are input to each of the column and row switching selector blocks 278, 280 in the respective PUFs. For instance, as shown in FIG. 30, the parallel shift register 276 associated with the serial shift register 274 for the rows in the left stack outputs four parallel bitstreams to the four row selector switching blocks 280, each receiving one of the parallel bitstreams from the shift register block for the rows in that stack. Likewise, the parallel shift register block 276 associated with the serial shift register 274 for the columns in the left stack outputs four parallel bitstreams to the four columns selector switching blocks 278, each receiving one of the parallel bitstreams from the shift register block for the columns in that stack. The parallel shift register blocks 276 associated with the serial shift register 274 for the rows and columns in the right stack are configured and associated analogously.

Each primitive block 140, 200, 240, 250 preferably includes a digital/analog circuit (DAC) 282 coupled to the column selector switching circuitry (in this example arrangement) 278 for providing a bias, as disclosed above, in response to bit input. Further, each primitive block includes peripheral circuitry 286 and an auxiliary selector 288 for, respectively, reading output currents and for selecting columns (in this example arrangement) in response to a bit input (e.g., from the input challenge). Example operation of the peripheral circuitry 286 is provided above.

The second RAF-PUF layer includes a single primitive block 140, 200, 240, 250, including one main array and one auxiliary array of floating-gate flash memory cells, and an associated row selector circuitry block 280 and column selector 278 circuitry block. A hidden shift register 290 provided between the first and second RAF-PUF layers receives the output bits from the peripheral circuitry 286 for each of the primitive blocks in the first RAF-PUF layer, and outputs a bitstream to the row selector circuitry block 280 and the column selector circuitry block 278 in the primitive block in the second RAF-PUF layer. Peripheral circuitry for the primitive block in the second RAF-PUF layer outputs a bit. The output bits are received by an output shift register, which includes a parallel shift register 292. The output shift register produces a bit output. Programming and clock management circuitry blocks, as well as a power profile jammer block, example operations of which will be explained below, are provided in the example architecture.

FIG. 31 shows example design parameters for the TDM architecture 270 shown in FIG. 30. Used as a cryptographic integrated circuit, this example architecture 270 can provide reliable immunity toward multifarious adversarial attacking methods including, for instance, emulation, side channel, fault injection, and invasive attacks. Operation of the example architecture 270 is unpredictable and effectively impossible to emulate. Such example architectures 270 are embeddable in standard CMOS silicon process integrated circuits, and have a versatile configuration. The peripheral circuitry can be used to customize or optimize performance for various applications. Example programming of the architecture 270 uses low-noise on-chip current readout circuitry and parallel programming topology. Example architectures 270 are scalable, can have a relatively low power dissipation during operation, suitable estimated processing speed, and a low footprint (as a nonlimiting example, 3.4 mm², excluding bonding pads).

Figure 32:
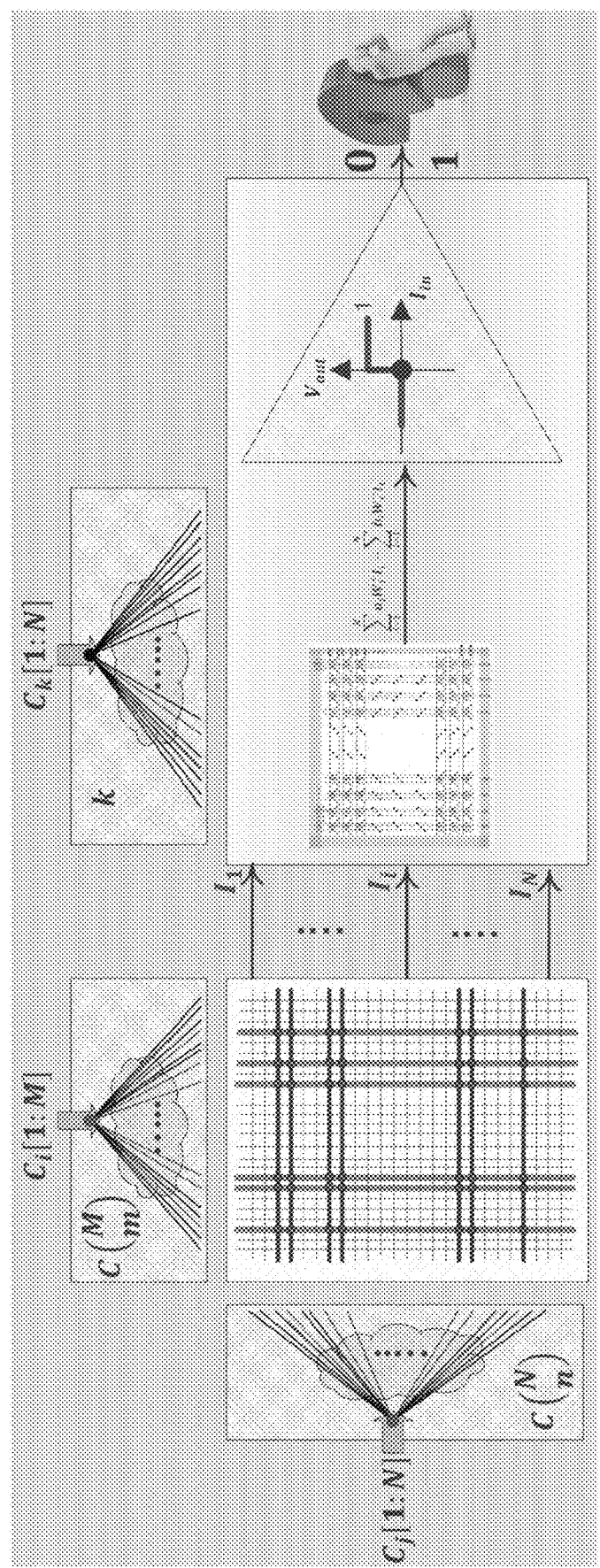
FIG. 32 shows an operating principle for an example architecture.

FIG. 32 shows an example operating principle for an example architecture. In floating gate transistors, variation sources can include layout variations (which are more apparent in page-wise fluctuations), spatial variations, general intrinsic process variations of CMOS FETs including random dopant fluctuation, and line edge roughness and stress-induced variations. Combining random process variations in analog behavior of flash memories with variations in nonlinearity, nonlinear unpredictable sophisticated unclonable structure, and a time-domain multiplexing (TDM)-based architecture, efficient, low-power, fast, and reliable cryptographic hardware system can be provided with a wide variety of applications.

As shown in FIG. 32, an example architecture includes (at least) two layers, each of which are constructed by primitive functions 140, 200, 240, 250 (e.g., RAF-PUFs). Using an example TDM architecture 270, the number of inputs can grow exponentially, while the size of the crossbar is kept relatively constant. The example architecture 270 shown in FIG. 32, for instance, responds to each input challenge after processing 32 time-domain multiplexed (TDM) inputs at layer 1, and one final step at layer 2. The example processing in layer 2 can have a timing overlap with the fetching of the next challenge (that is, for layer 1) to make the operation of the example architecture faster and more efficient.

Figure 33:
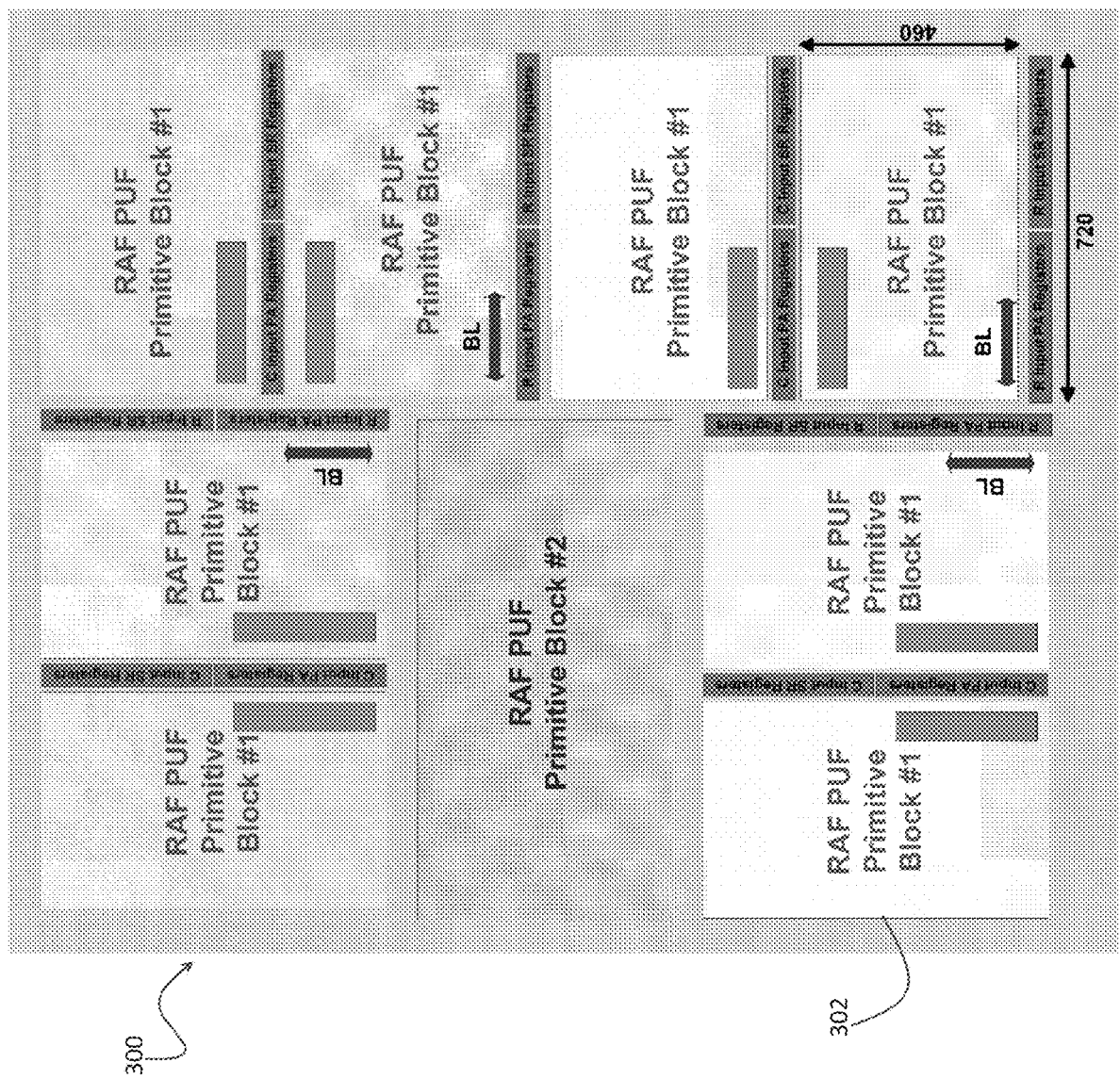
FIG. 33 shows an example top level logical layout for a two-layer architecture.
Figure 34:
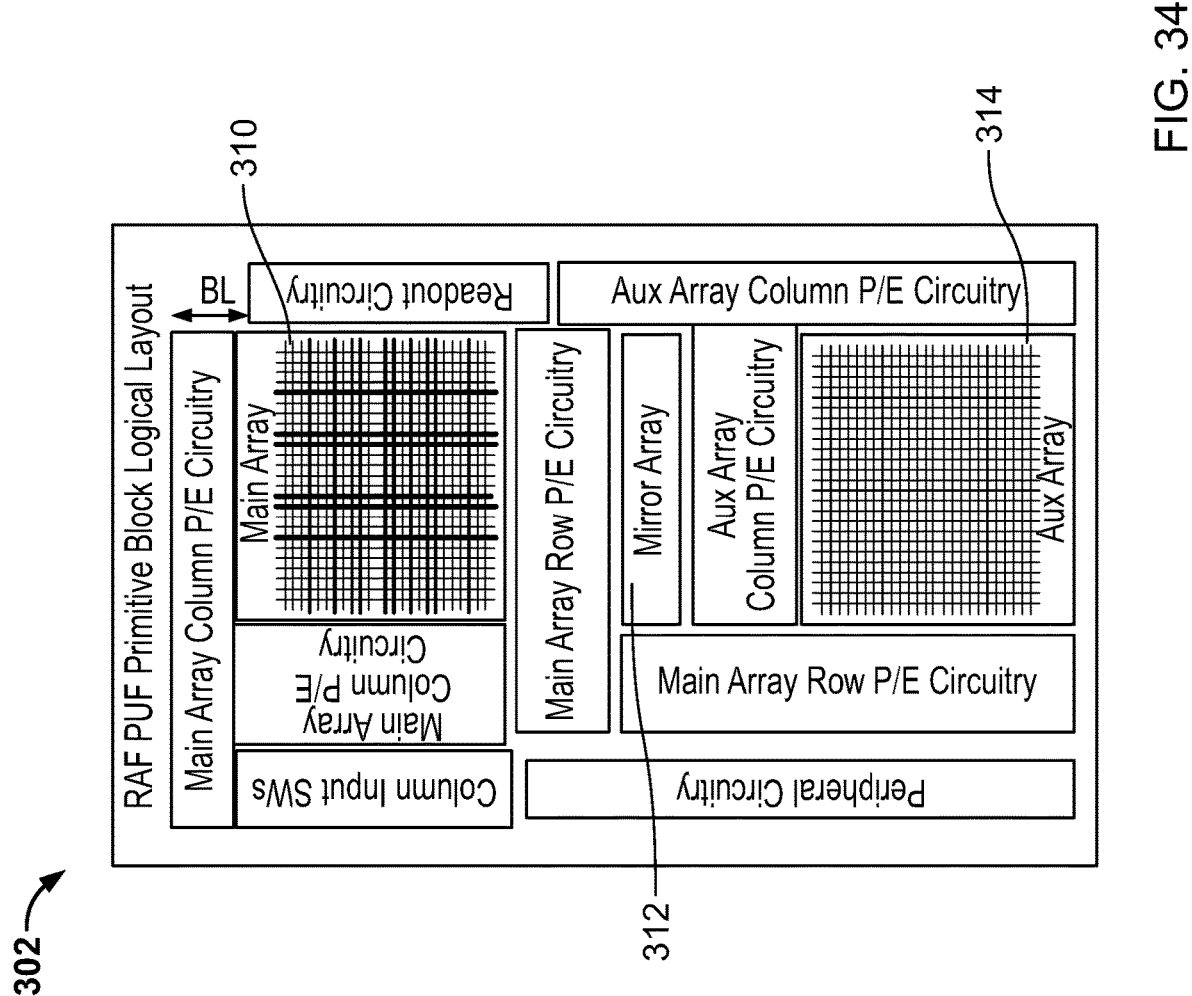
FIG. 34 illustrates an example logical layout for an individual primitive block in layer 1 of the architecture of FIG. 33.

FIG. 33 shows an example top level logical layout 300 for the example architecture 270, including an arrangement of eight primitive blocks 302 in layer 1 surrounding layer 2. Primitive blocks 302, for instance, can be similar to any of the primitive blocks 140, 200, 240, 250 disclosed herein. FIG. 34 illustrates an example logical layout for an individual primitive block 302 in layer 1, including a main array 310, a mirror array 312, and an auxiliary array 314. This example scrambled yet modular primitive block design can increase an intra-block process variation effect.

Figure 35A:
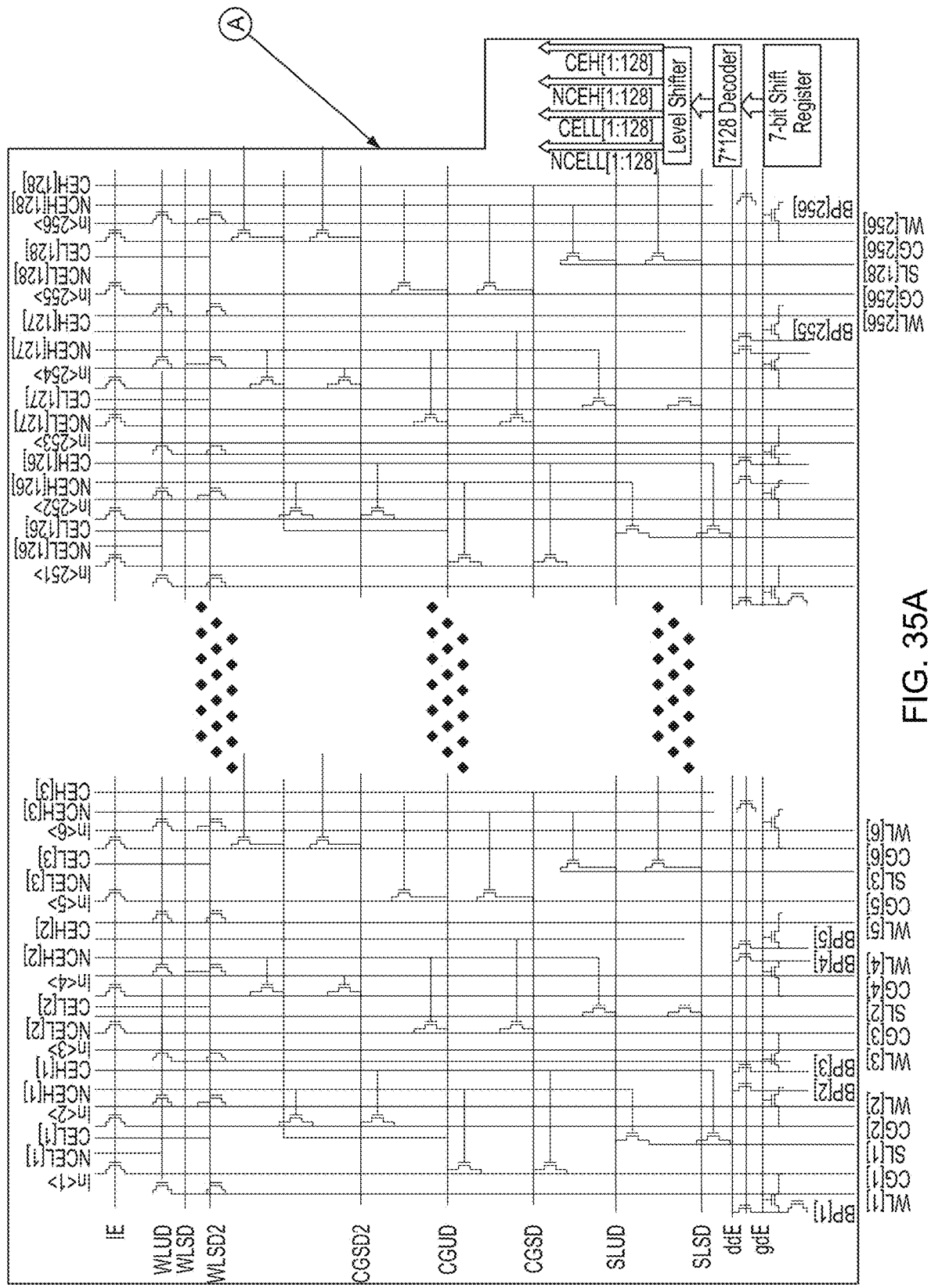
FIGS. 35A-35E shows example flash memory block and column and row programming/erasure (P/E) circuitry for a primitive block.
Figure 35A:
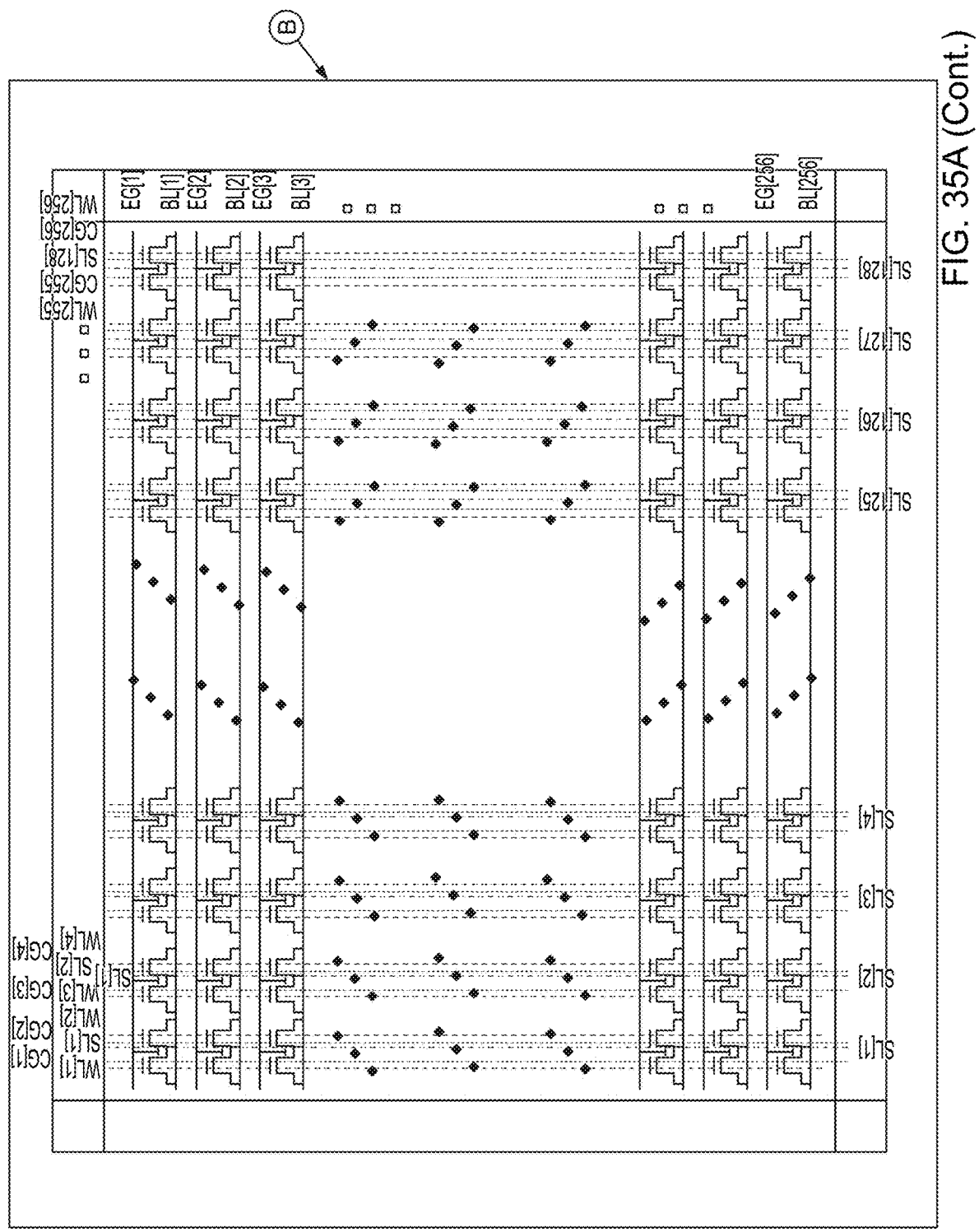
Figure 35B:
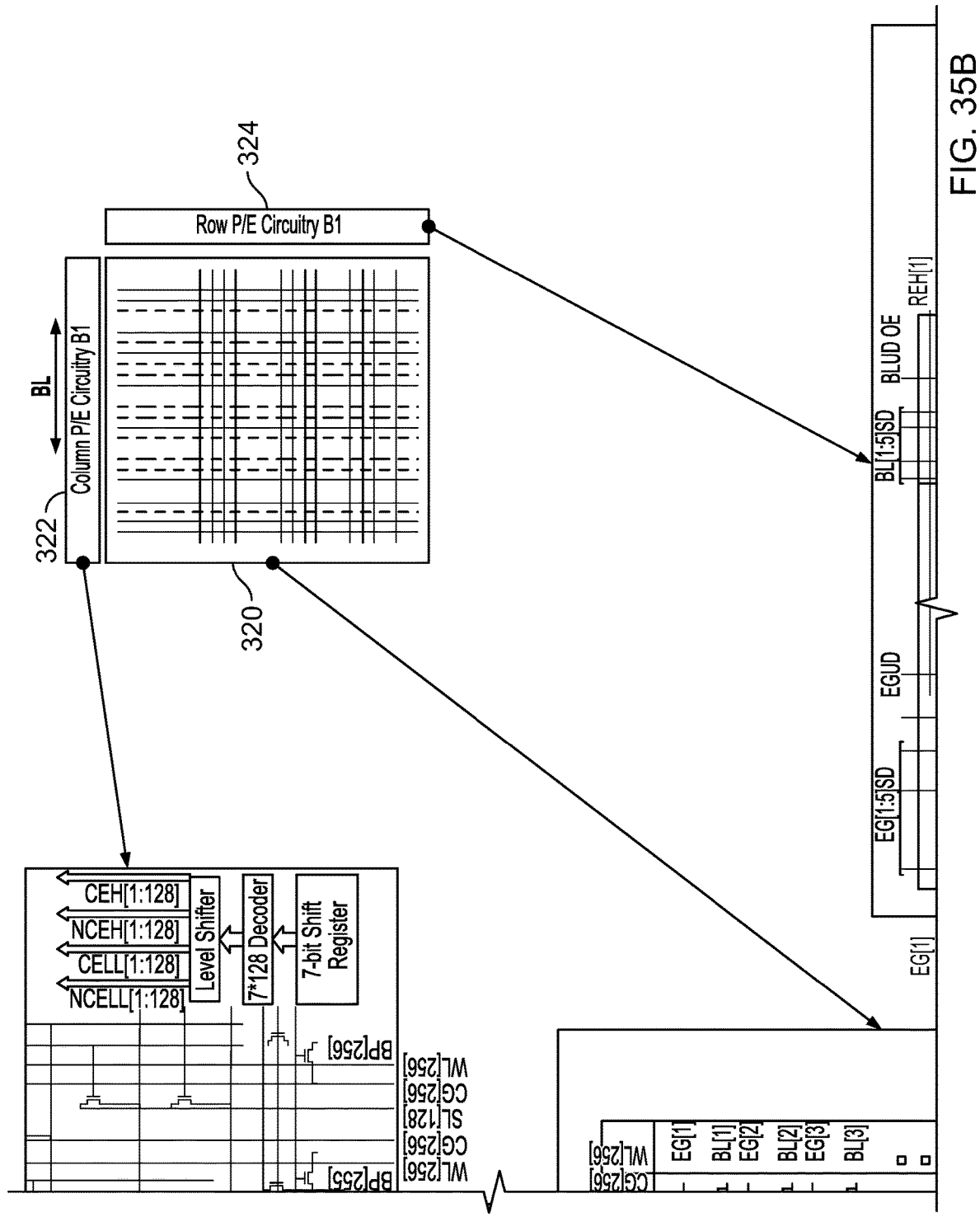
Figure 35C:
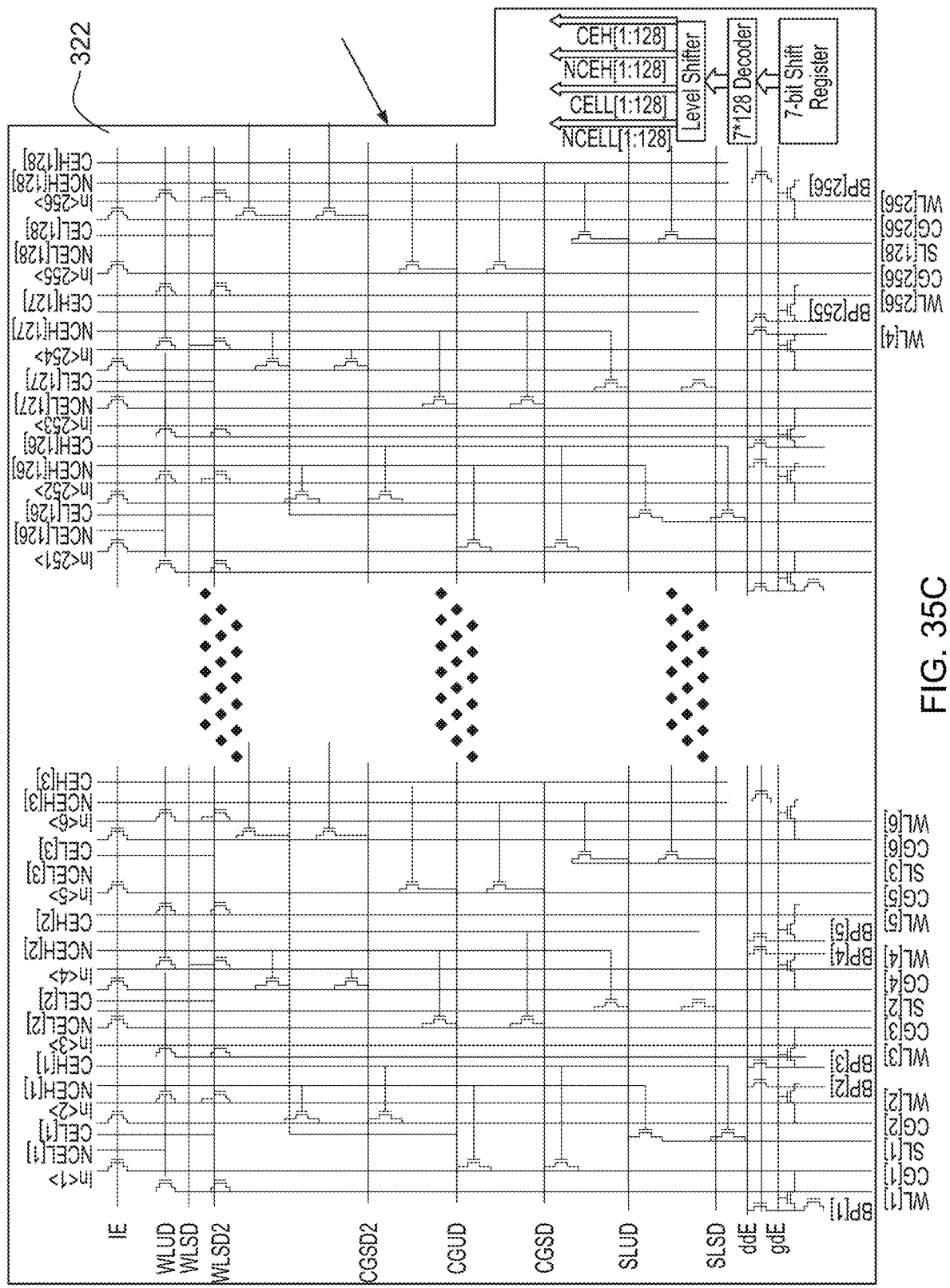
Figure 35D:
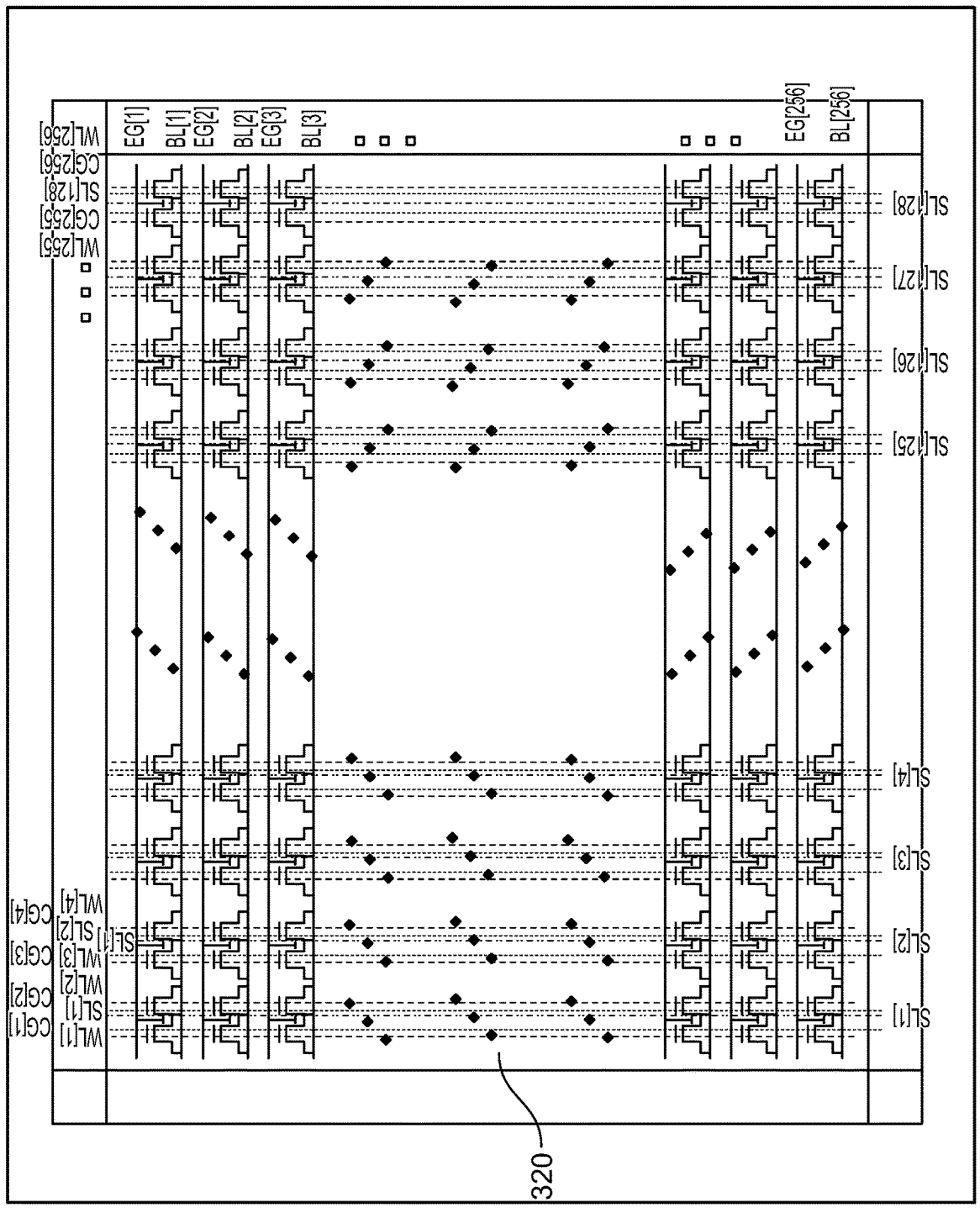
Figure 35E:
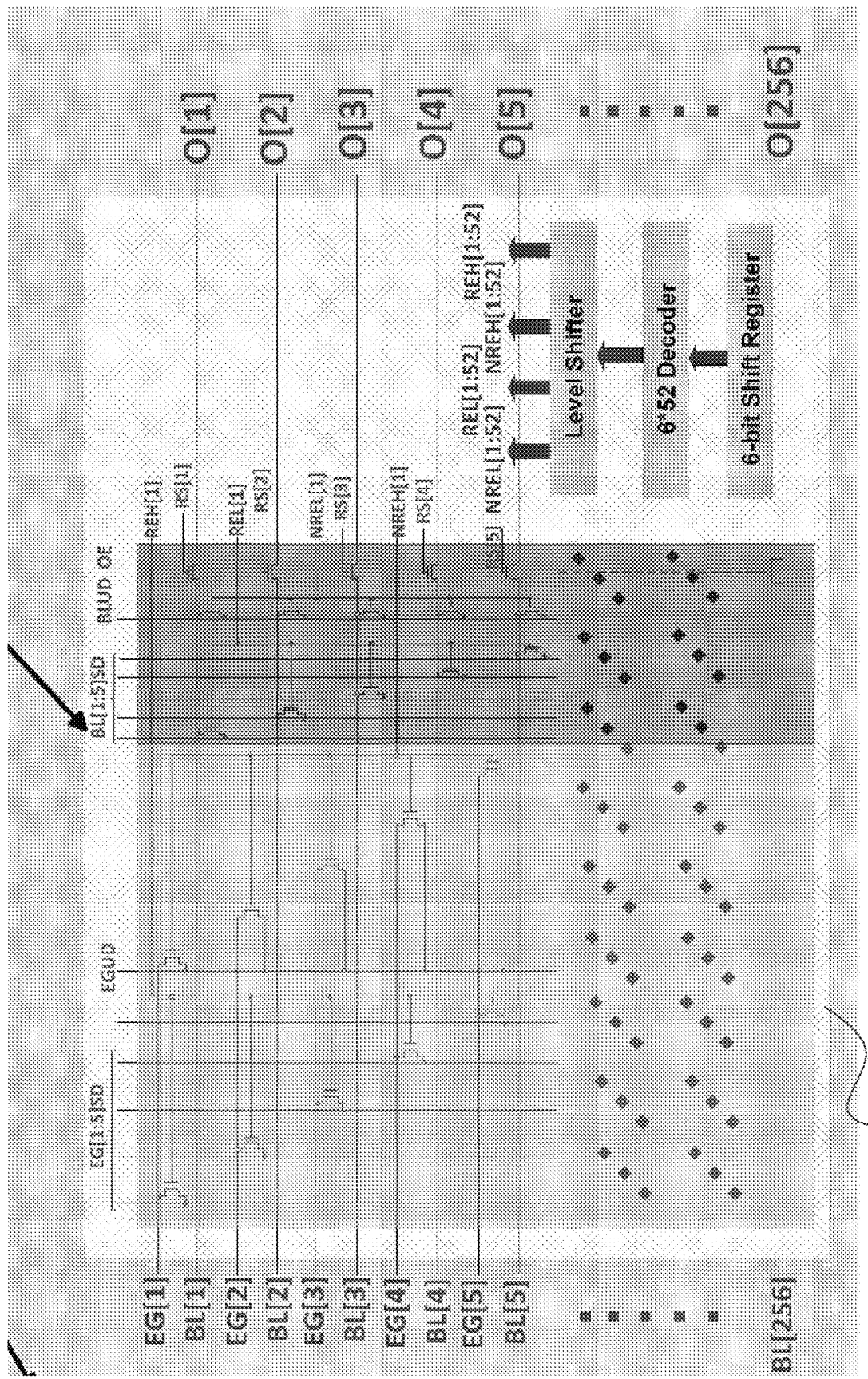
Figure 35E:
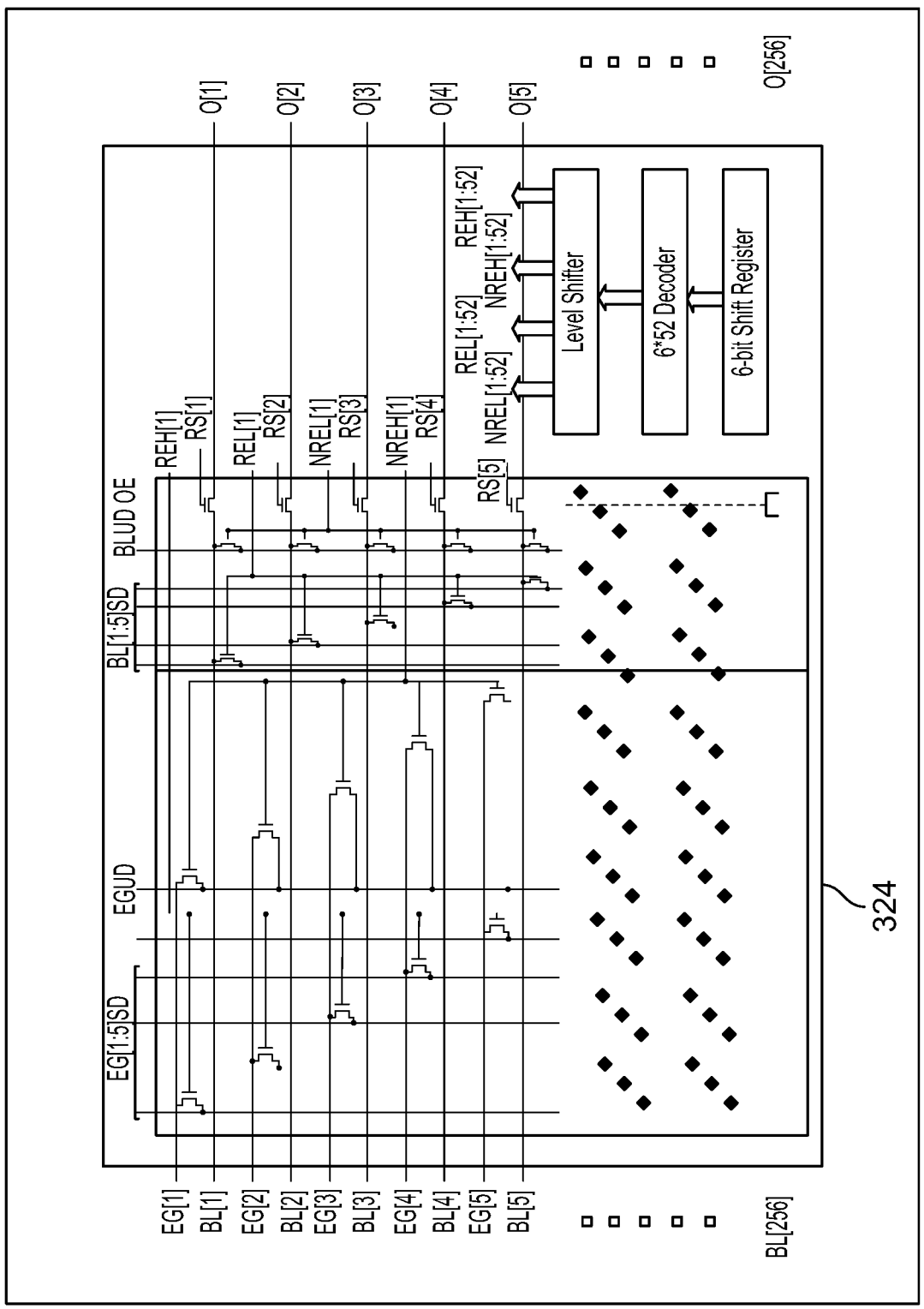
Figure 36A:
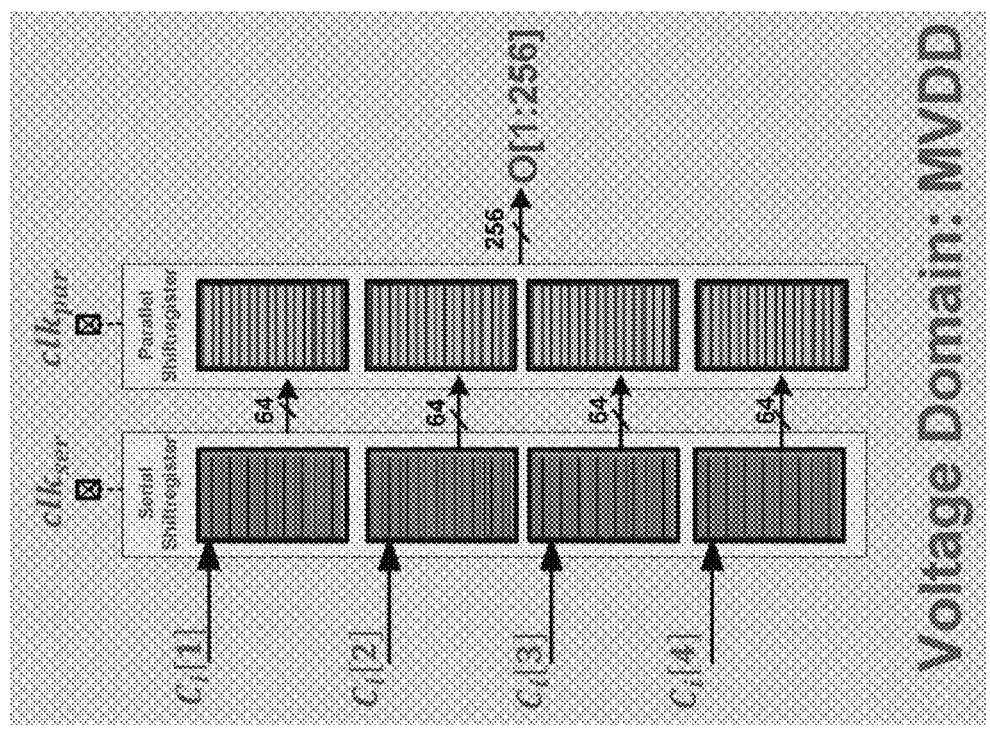
FIGS. 36A-36B show example row and column selection circuitry, respectively.
Figure 36B:
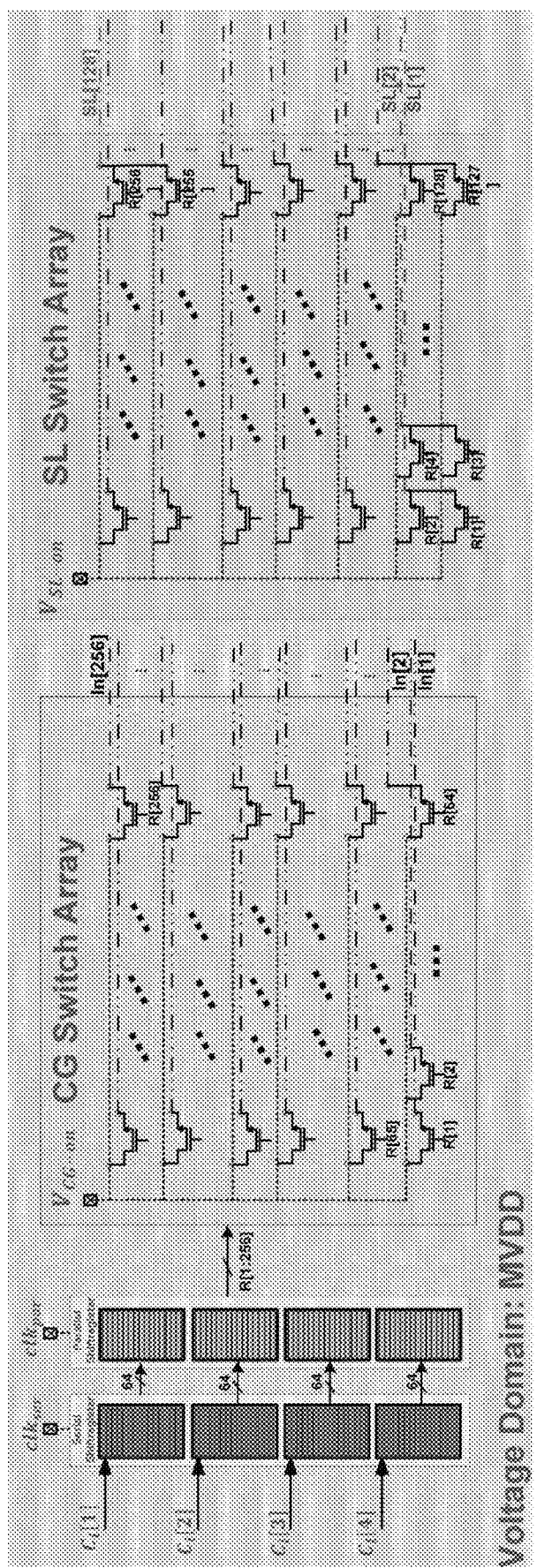

FIGS. 35A-35E show example flash memory block 320 and column 322 and row 324 programming/erasure (P/E) circuitry for a primitive block (e.g., RAF-PUF), where FIG. 35A shows the combined circuitry, and FIGS. 35B-35E show enlarged individual components. FIGS. 36A-36B, respectively, show an example operation of the row 324 and column 322 selection circuitry. In a particular example architecture and operation, in 64 clocks of clock signal $clk_{ser}$, one TDM step is performed, and the first portion of the challenge is loaded. The $clk_{ser}$ is provided, for instance, by off-chip circuitry (e.g., bounded by a maximum operating frequency of PADs), an example frequency being f>500 MHz. Clock signal $clk_{par}$ is synchronized with $clk_{ser}$, and $$f_{clk_{par}} = \frac{f_{clk_{ser}}}{64},$$

which is generated on-chip. In a particular example embodiment, all devices to target a <1 mV drop of switches at $I_{max,SL}$.

Layer 1 includes two paths, each including four column selectors and four row selectors. All column (row) selectors share the same inputs, but for each selector the input-switch routing is different. For example, corresponding bits for selectors could include: $P_{11}$: $C_i[1] \Rightarrow R[1]$, $C_i[65] \Rightarrow R[65]$, $C_i[129] \Rightarrow R[129]$, $C_i[193] \Rightarrow R[193]$; $P_{12}$: $C_i[1] \Rightarrow R[65]$, $C_i[65] \Rightarrow R[129]$, $C_i[129] \Rightarrow R[193]$, $C_i[193] \Rightarrow R[1]$; $P_{13}$: $C_i[1] \Rightarrow R[129]$, $C_i[65] \Rightarrow R[193]$, $C_i[193] \Rightarrow R[1]$, $C_i[193] \Rightarrow R[65]$; and $P_{14}$: $C_i[1] \Rightarrow R[256]$, $C_i[65] \Rightarrow R[192]$, $C_i[129] \Rightarrow R[128]$, $C_i[193] \Rightarrow R[64]$.

Figure 37A:
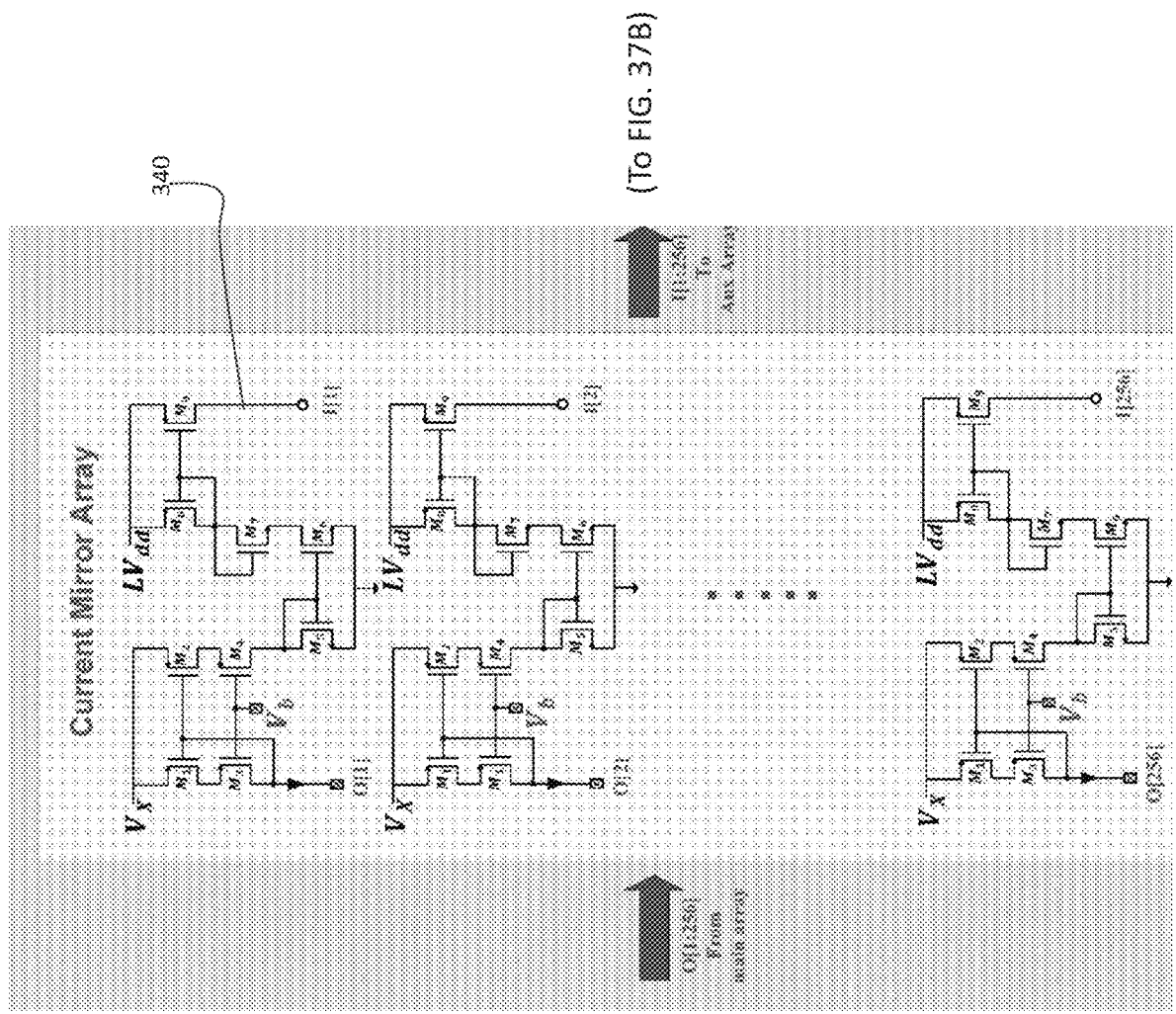
FIGS. 37A-37D show components of an example peripheral circuit design for an integrated circuit architecture.
Figure 37B:
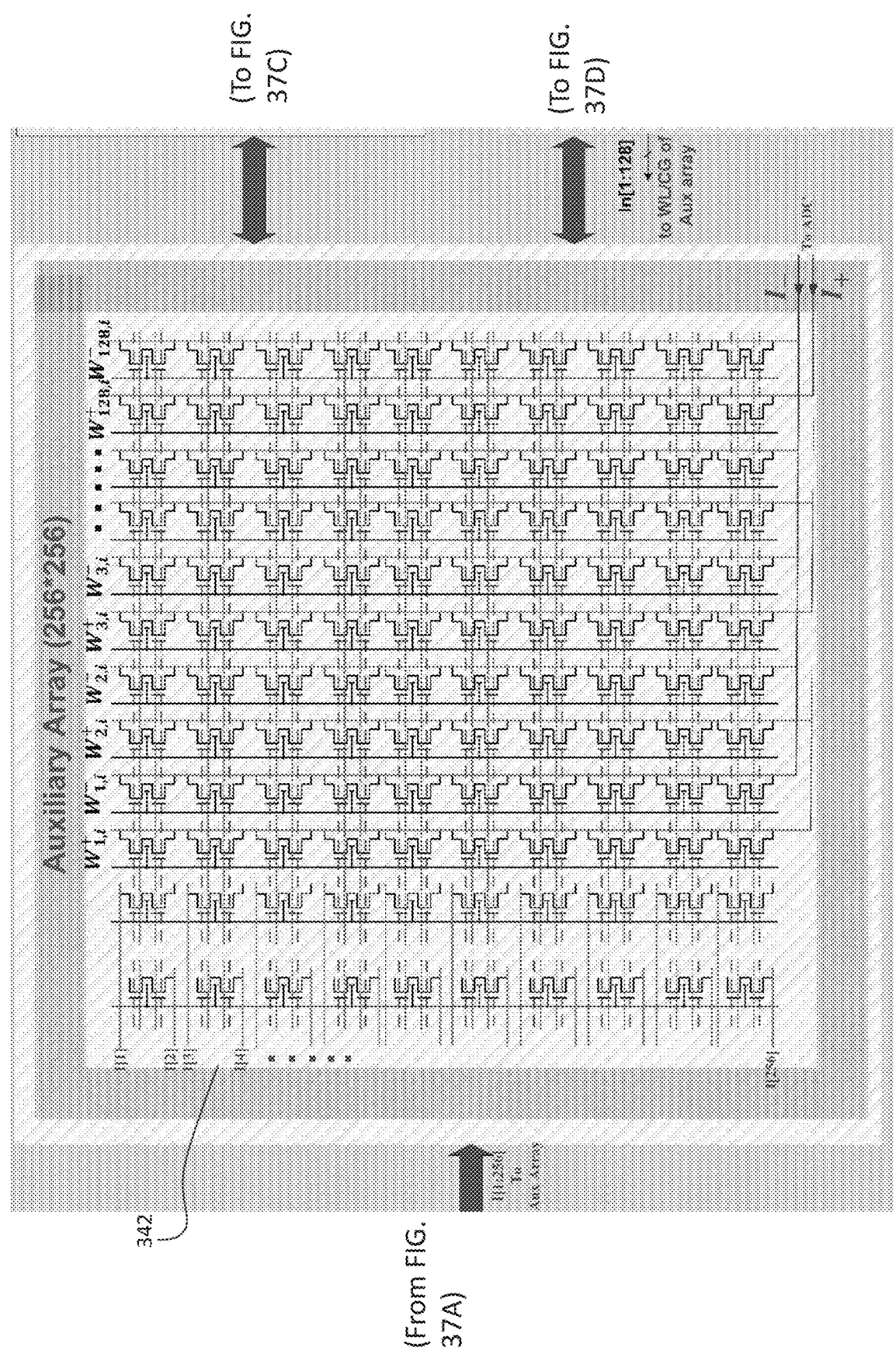
Figure 37C:
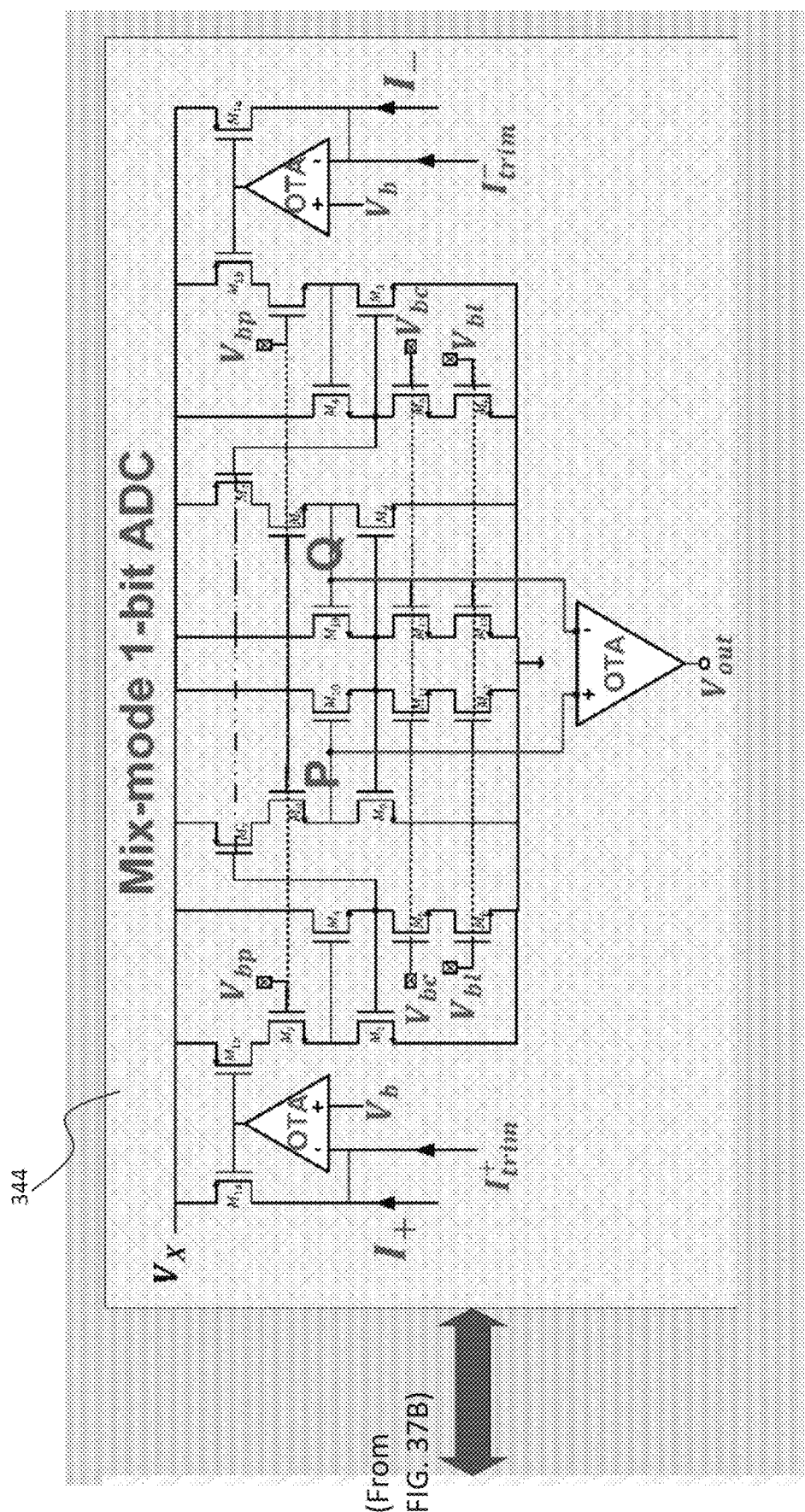
Figure 37D:
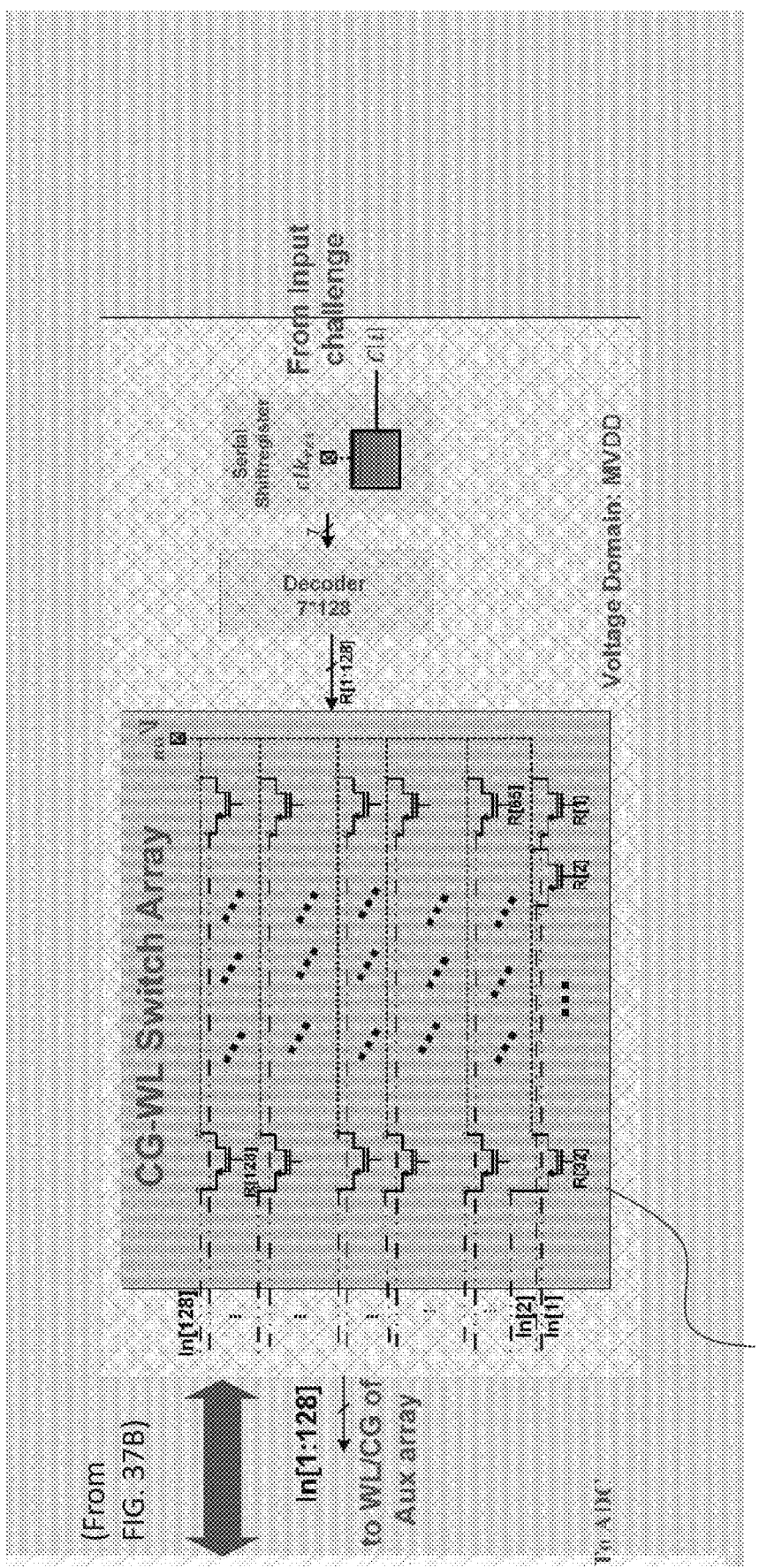

FIGS. 37A-37D show an example peripheral circuit design. The example peripheral circuitry includes an array of simple p-type metal oxide semiconductor (PMOS) current mirrors 340 (FIG. 37A) connected, which receives currents from output enabled ones (OEs) of Row P/E circuitry and sources them to an auxiliary array 342 (FIG. 37B). The example auxiliary array 342 in FIG. 37B, which can include a two-dimensional array of floating gate NOR flash memory cells as disclosed herein, can generate an unpredictable, nonlinear combination of input currents. FIGS. 37C-37D show example current sensing circuitry 344 and switching circuitry 346. Further, the auxiliary array 342 increases the dimensions of the example system to improve resiliency toward, for instance, machine learning attacks. The example auxiliary array includes 256×256 NOR flash memory cells.

Figure 38:
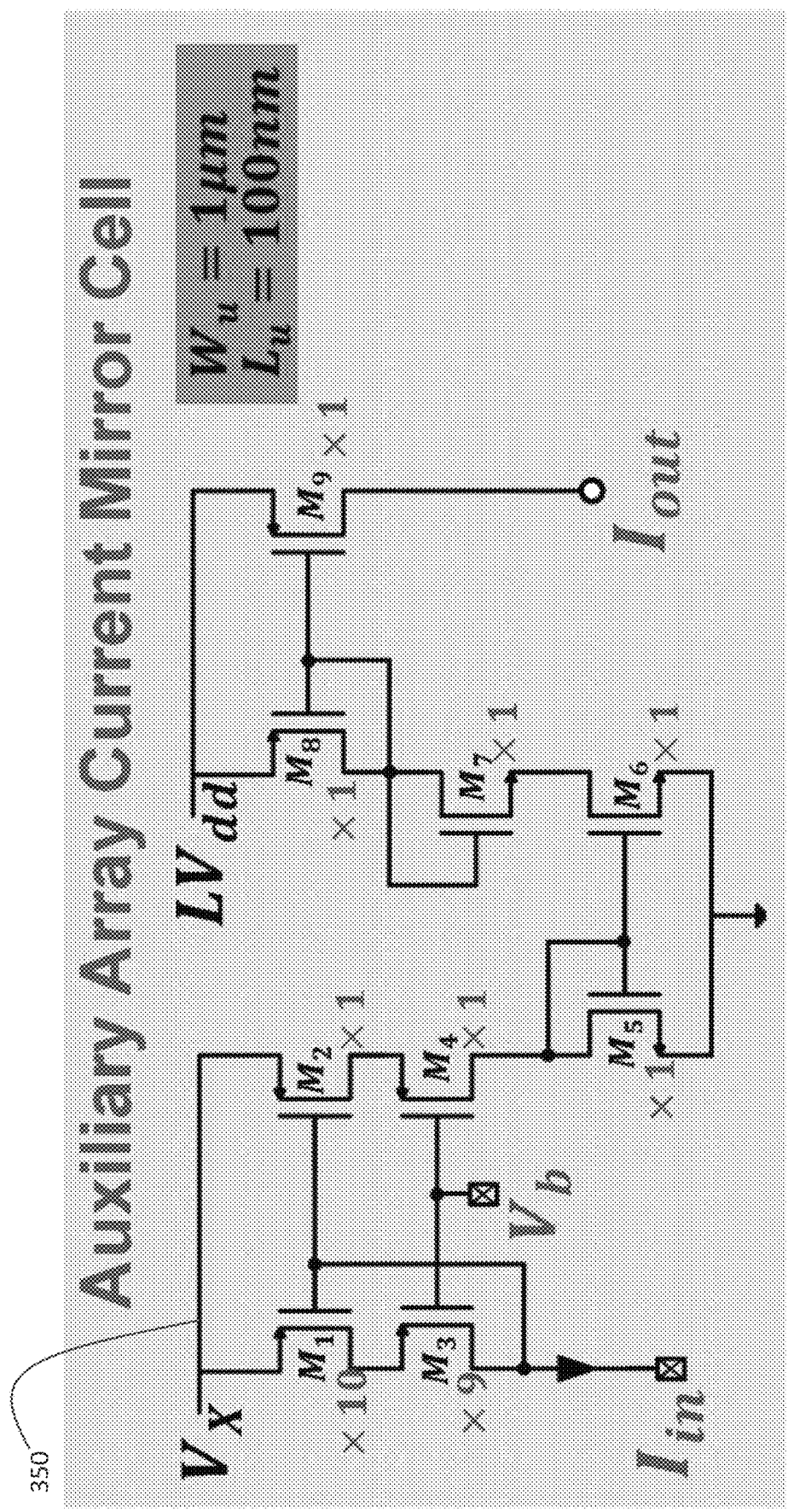
FIG. 38 shows an example current mirror cell for the auxiliary array of FIGS. 37A-37D.
Figure 39:
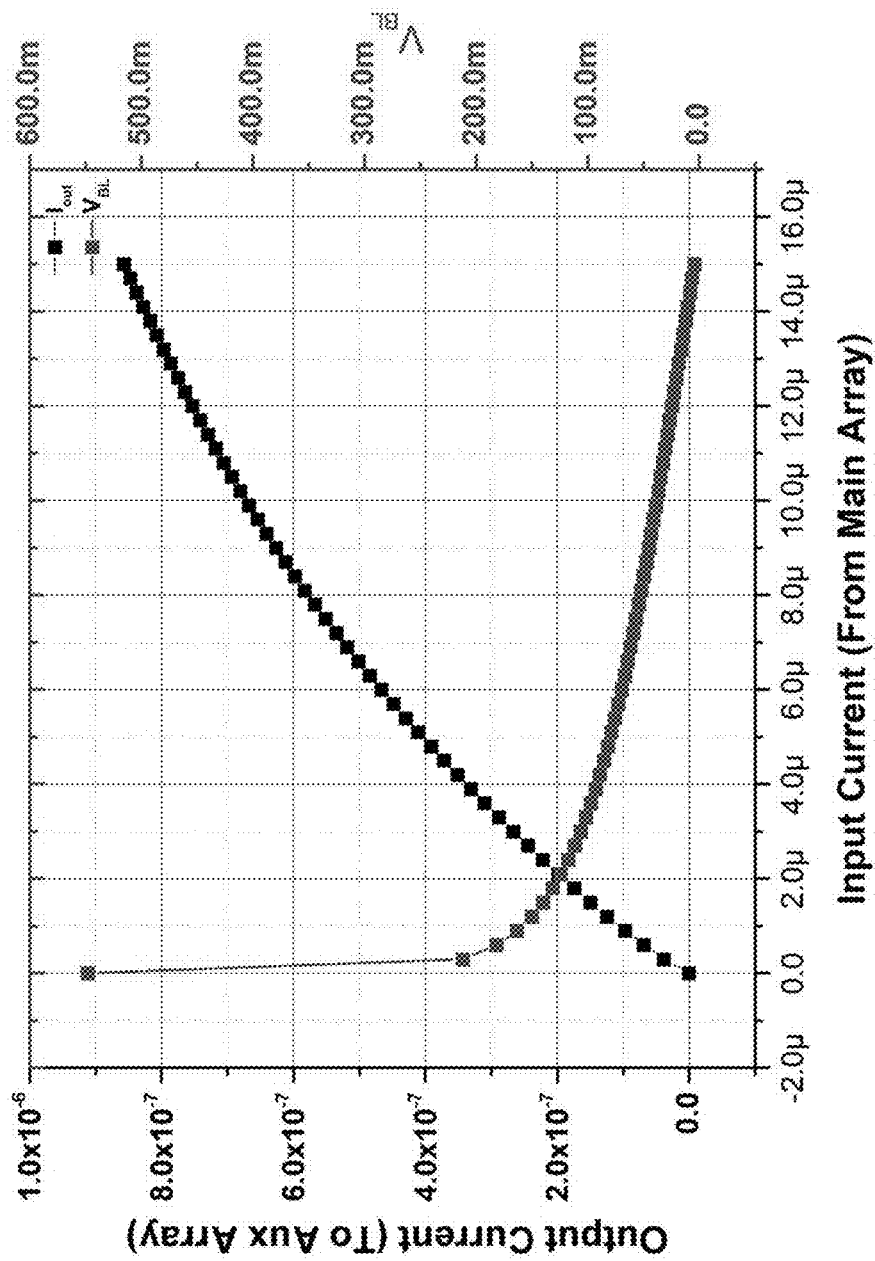
FIG. 39 illustrates a relationship between an input current from an example main array and an output current to the example auxiliary array.

FIG. 38 shows an example current mirror cell 350 for the auxiliary array 342 of FIGS. 37A-37D. In this example design, a low voltage simple current mirror is provided to minimize the parasitic capacitance of the bitline (BL) and in consideration that nonlinearity is not an issue. To push limits on BL voltage (and increasing nonlinearity) and scale the current to decrease the power consumption, the example current mirror is configured in a multi-vdd (voltage drain drain) fashion, with a gain of 1/10. Since a main contributor of noise in the example design is low frequency (LF), it is possible to trade bandwidth for noise in lower technology nodes with more random telegraph noise (RTN) vulnerability, using a MOS at the gate of $M_1$ in FIG. 38. Sizing of $M_1$ is based on maximum current in each row ($I_{max, SL}$). The gain of the example current mirror is selected to be 1/10 primarily in order to reduce the power consumption. $V_x$ preferably is provided by an on-chip regulator to avoid fault injection attacks and noise immunity. For unselected rows, leakage can be reduced by, for example, inserting a switch between M6 and M7 in FIG. 38. Guard rings may be used to avoid latch-up due to the example multi-$v_{dd}$ design. FIG. 39 illustrates a relationship between an input current from an example main array and an output current to the example auxiliary array.

All devices in an example auxiliary array share a bit line (BL), but only one column is selected per each input ($a_j$), for instance using a 7-bit word line-coupled decoder (part of the input challenge bits). The leakage is nearly zero, since no depletion exists under unselected cells. Thus, in the simplest linearized form, it is possible to define currents $I_+$ and $I_-$ as:

$$I_+ = \Sigma\Sigma a_j W_{j,i}^+ I_{j,i}$$

$$I_- = \Sigma\Sigma a_j W_{j,i}^- I_{j,i},$$

i∈ selected rows and j∈ selected columns

Positive and negative currents are selected from two consecutive rows, where weights are imported in such a way that $W_{i,j}^+ = W_B + \Delta W_{i,j}^+$ and $W_{i,j}^- = W_B - \Delta W_{i,j}^-$, which effectively yields to $W_{i,j} = \Delta W_{i,j}^+ - \Delta W_{i,j}^-$. Furthermore, $W_{i,j}$ is a strong function of the current itself, since the example devices operate at very low BL voltages.

Example peripheral circuitry can be made to be efficient. For example, peripheral circuitry may not require additional power budget either from the auxiliary array nor from the current mirror once unselected columns/rows are turned off. Further, a high-gain 1-bit ADC is provided in the example peripheral circuitry with compensated offset using a tunable floating gate transistor. The BL voltage of the example auxiliary array is determined by the bias applied using a regulated cascode structure.

Figure 40:
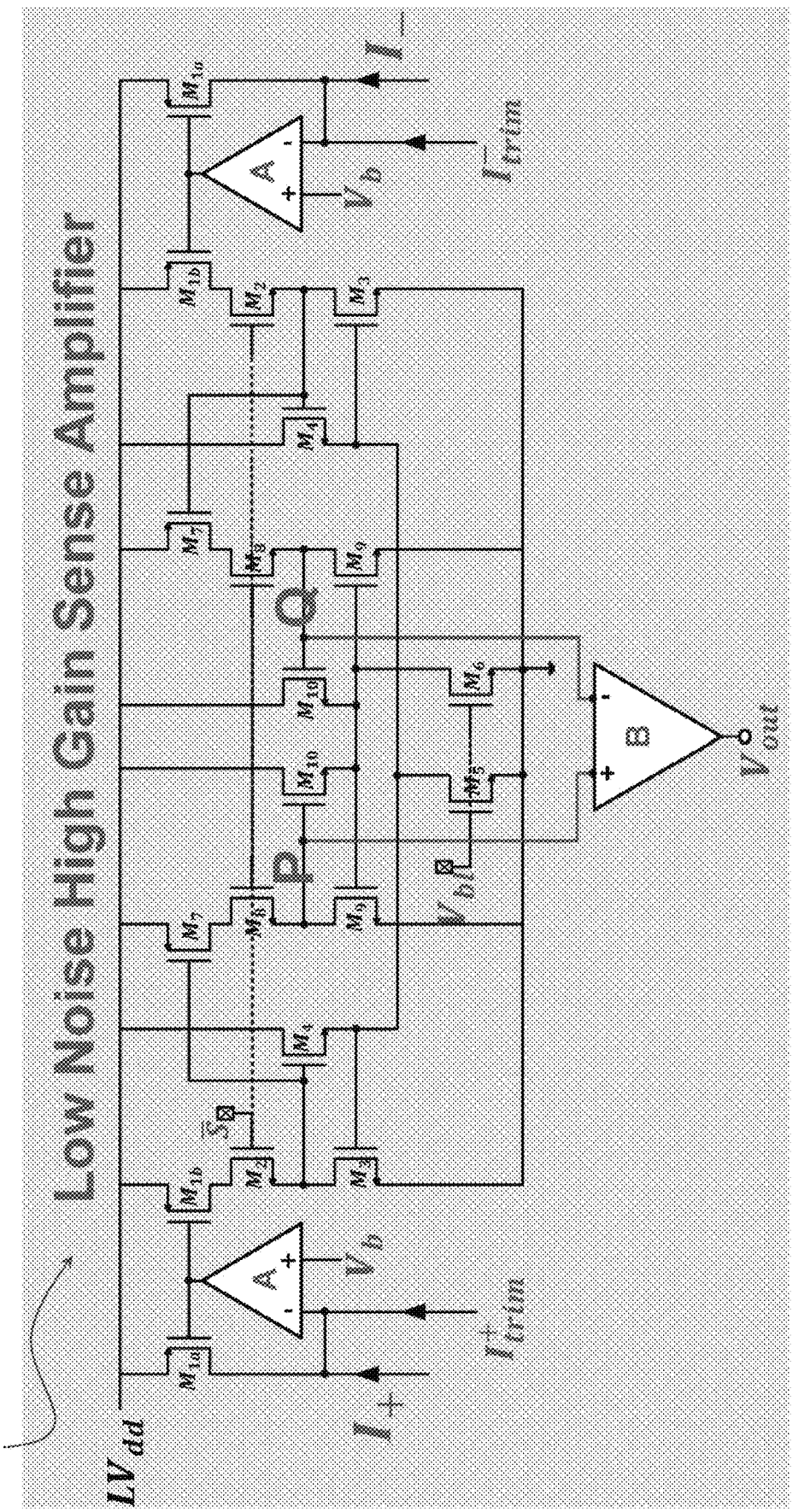
FIG. 40 shows an example compensated dynamic current comparator for example peripheral circuitry.
Figure 41A:
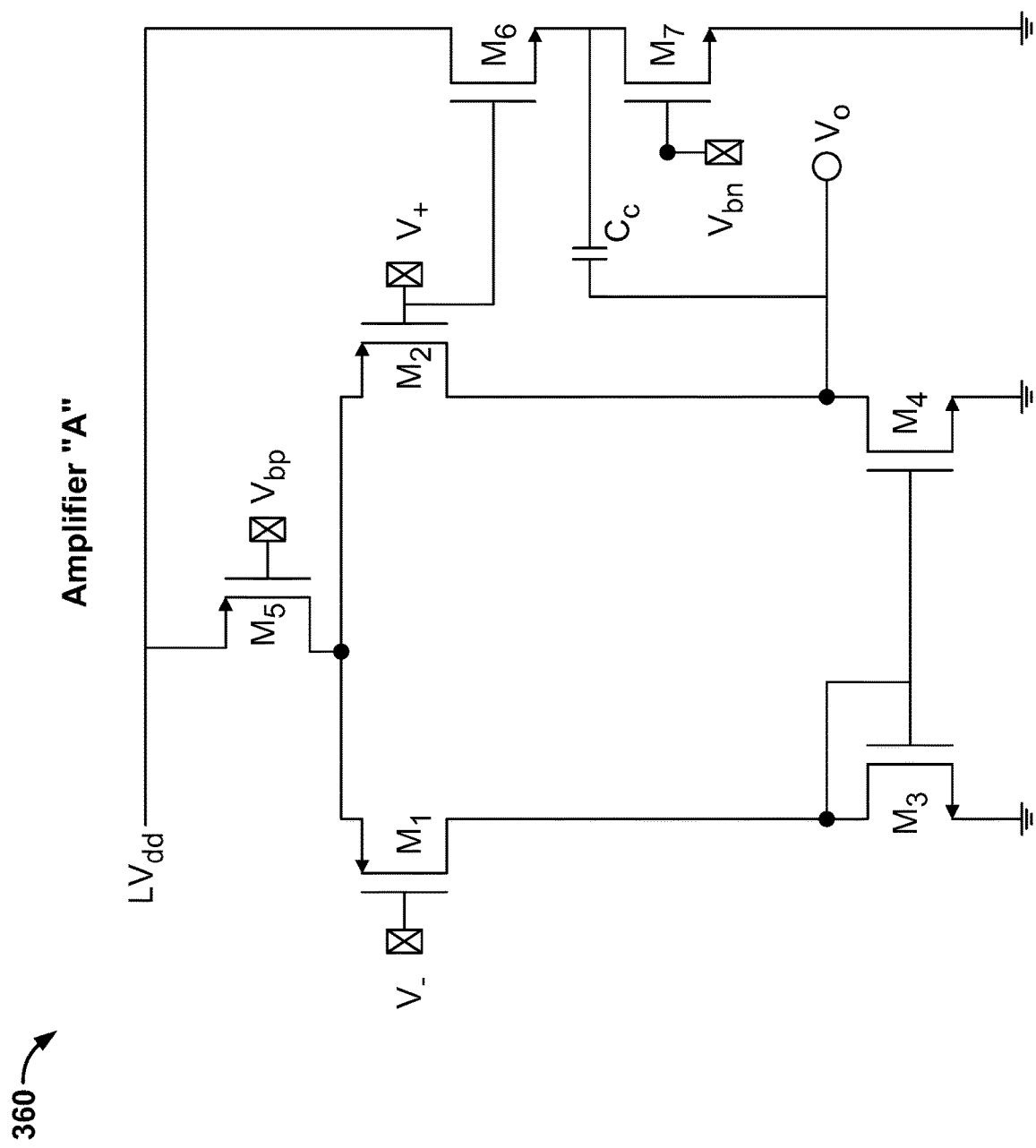
FIG. 41A shows an amplifier for the example comparator of FIG. 40.
Figure 41B:
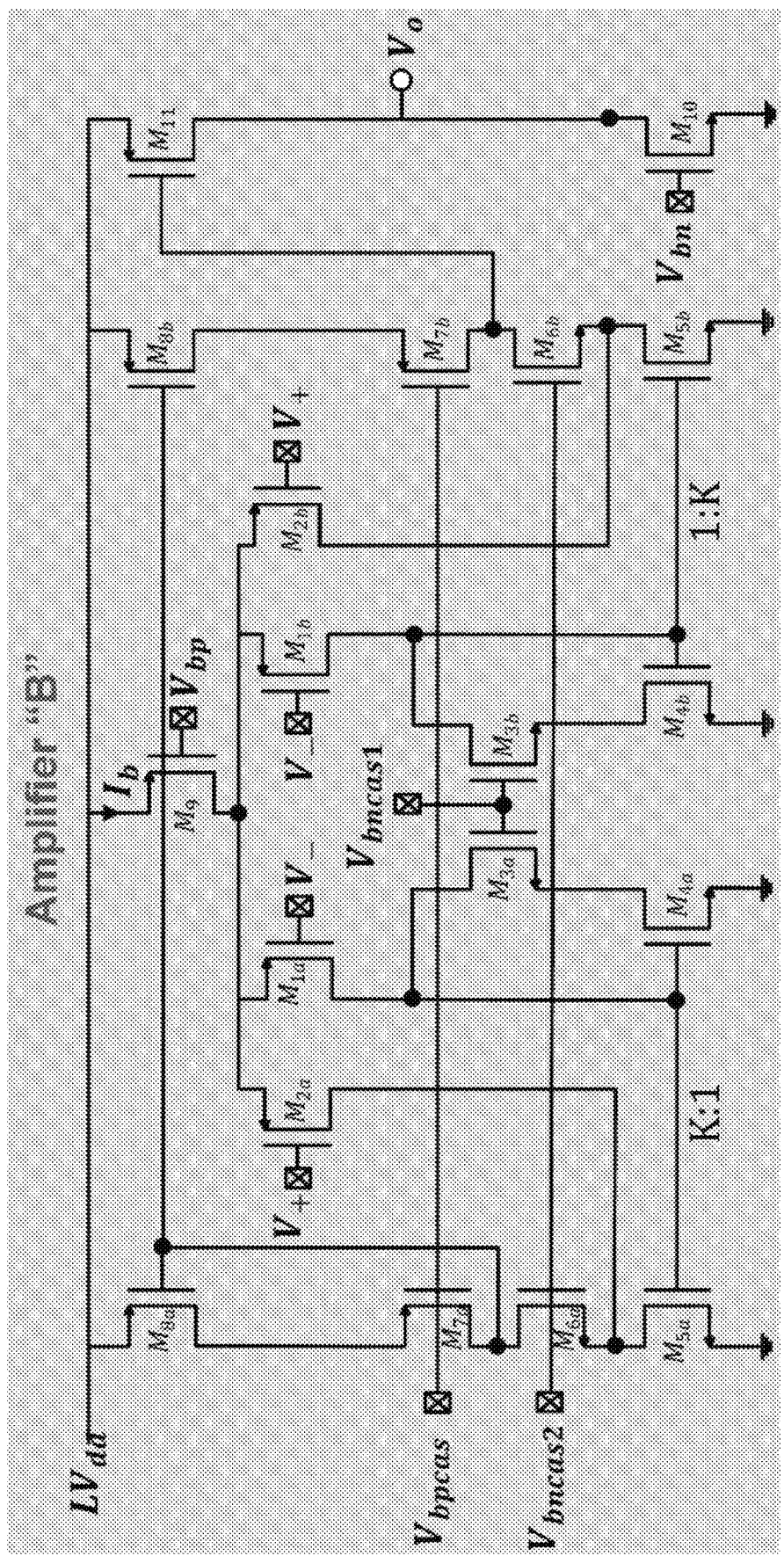
FIG. 41B shows another amplifier for the example comparator of FIG. 40.

An operational transconductance amplifier (OTA) 360 used for an example sense amplifier is shown in FIGS. 40, 41A and 41B. The example amplifier is a simple 5T differential amp in parallel with a common drain buffer for frequency compensation. In a particular embodiment regulated cascode, consuming 10.2 μA at 1.2 $V_{dd}$, the unity gain frequency is 85 MHz with 60° of phase margin and 23 dB gain margin. Both positive and negative currents are copied into a double-stage cascode current-mode comparator, which results in a differential voltage $V_{PQ}$. To improve the gain, a voltage-mode comparator is used at the final stage. The example voltage-mode comparator is embodied in a high-gain differential-to-single ended amplifier, which can be realized using, for instance, a cascode compensated two-stage recycling folded cascode amplifier.

The output voltage is connected to hidden registers, which are clocked by $clk_{par}$. The example circuit can digitize differential currents as low as 20 pA assuming perfect compensation (effectively 220 dB gain). The total power consumption of the example primitive block is dominated by the static power flowing through the peripheral circuitry. However, a power profile jammer can be used to counteract power analysis-based attacks.

The example compensated dynamic current comparator is configured for very low static power dissipation and high sensitivity (based on Strong Arm Topology). A large input common mode range is provided, with effectively zero input impedance using a regulated cascode structure. To provide mismatch cancellation, the example current comparator is preferably trimmed with $I_{trime}^+$ and $I_{trime}^-$ coming from unused flash cells in the example auxiliary array. The example current comparator can be synchronized with clock $par_{clk}$ for power saving during sleep mode.

Figure 42:
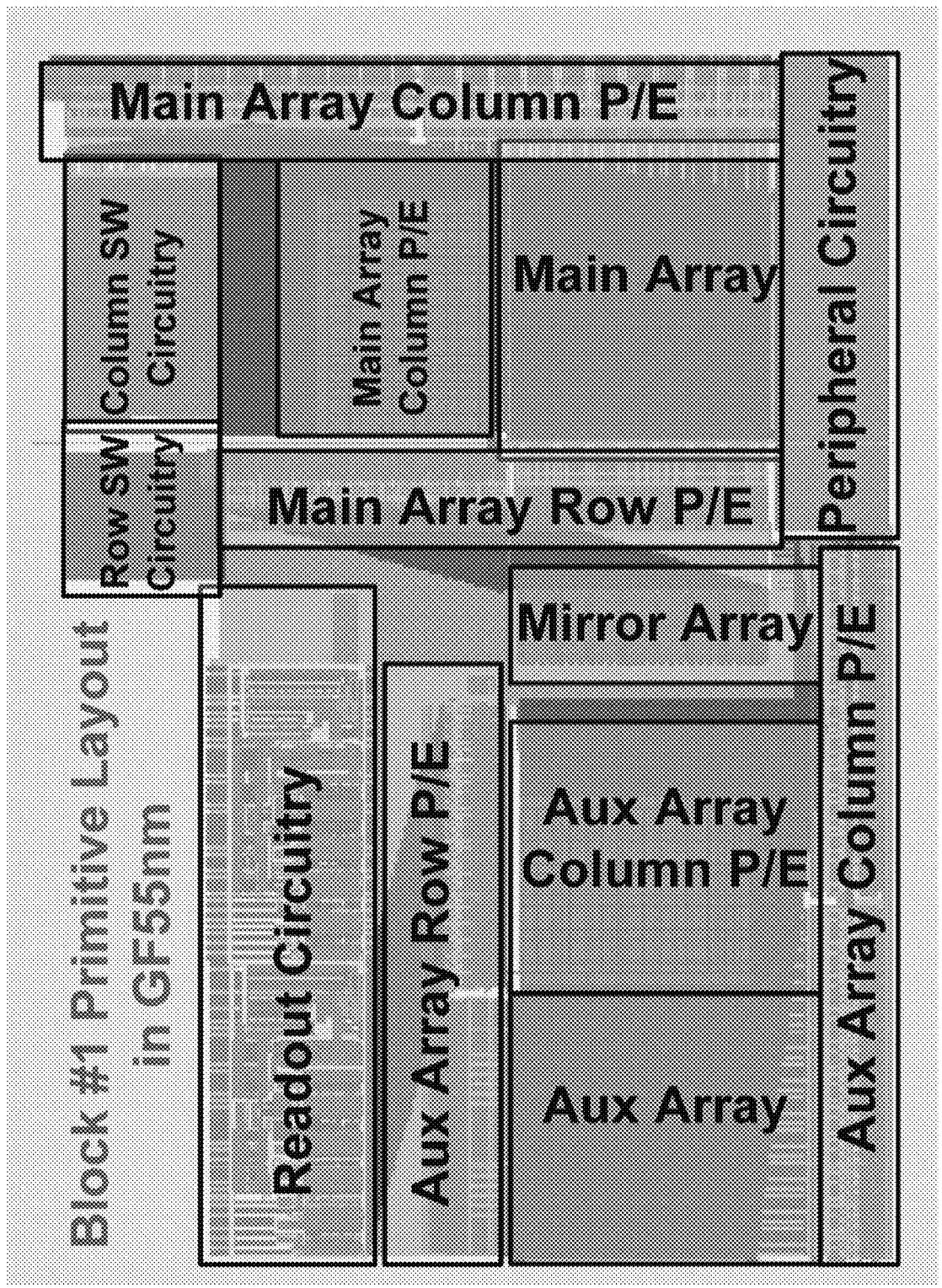
FIG. 42 shows an example RAF-PUF (primitive block) layout in GF55 nm.
Figure 43:
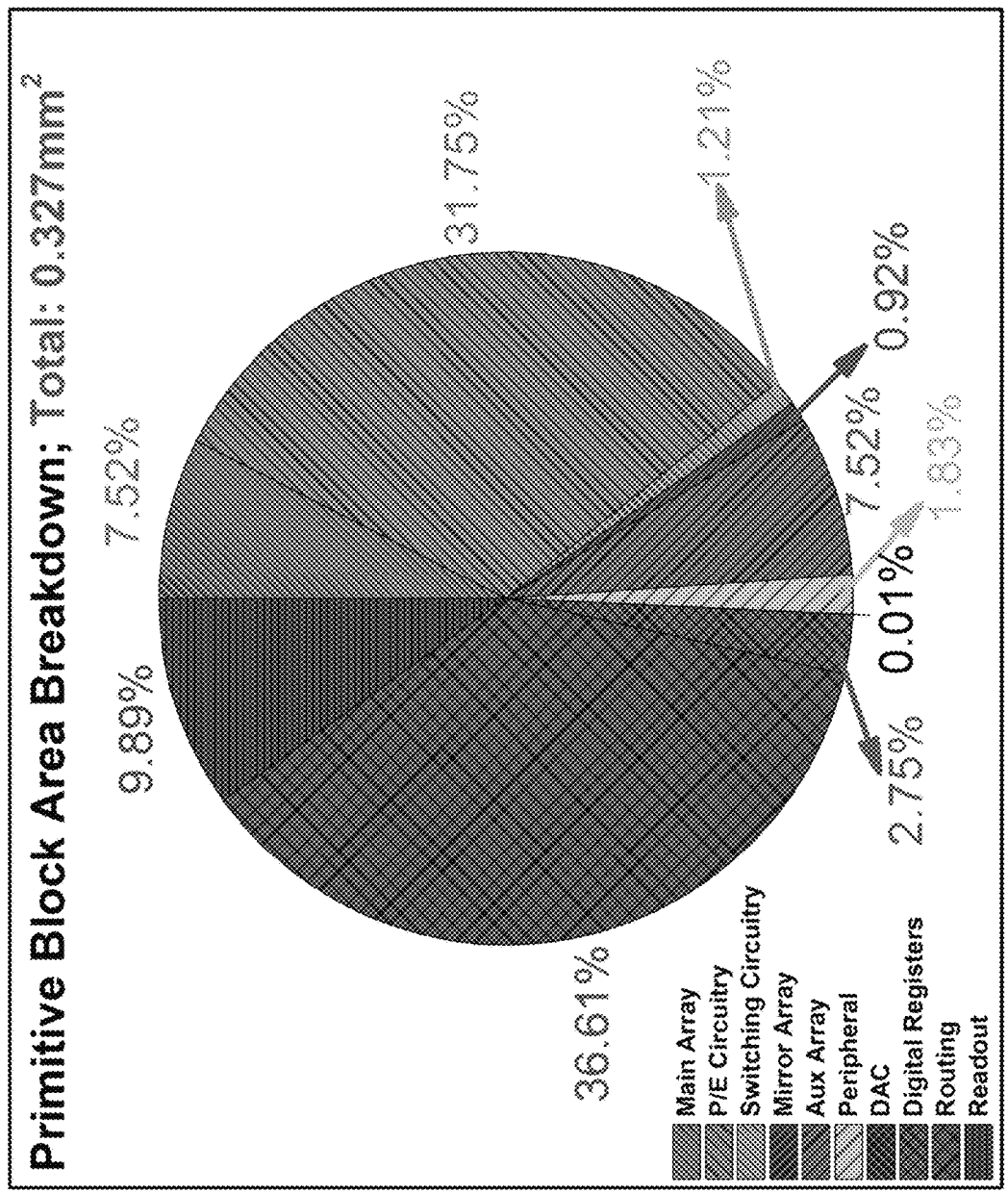
FIG. 43 shows an example area distribution of primitive block components.
Figure 45C:
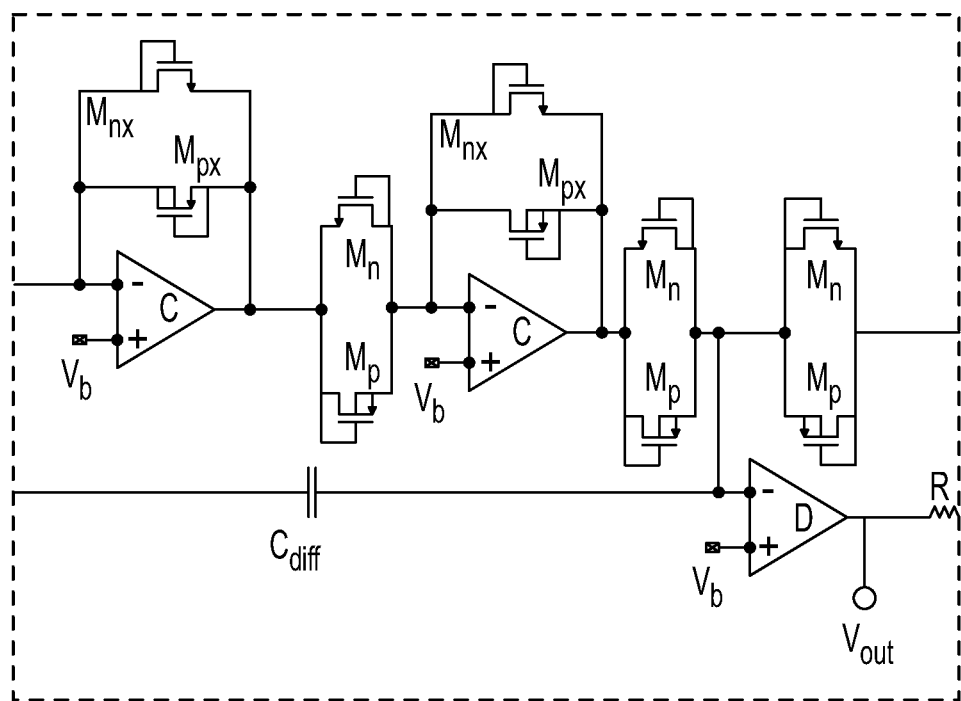
Figure 45D:
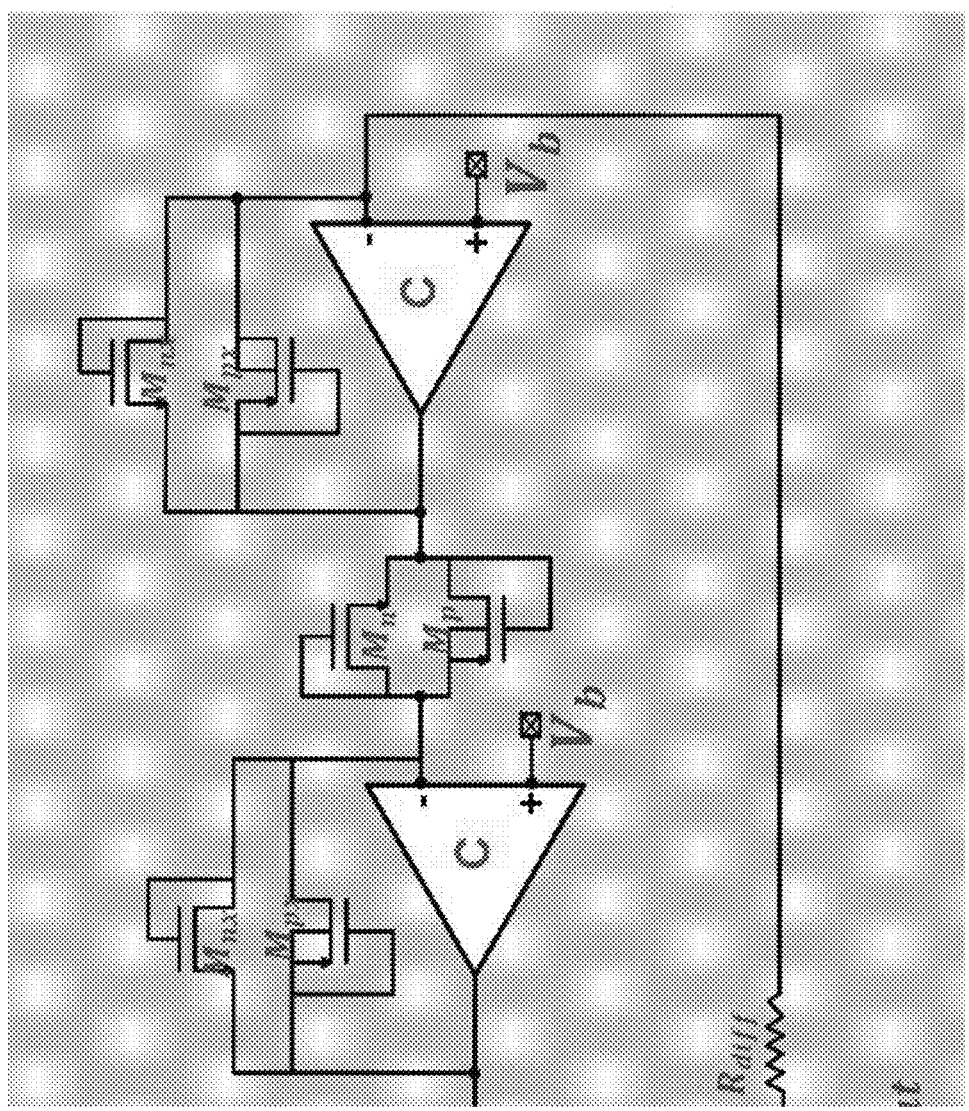
Figure 46B:
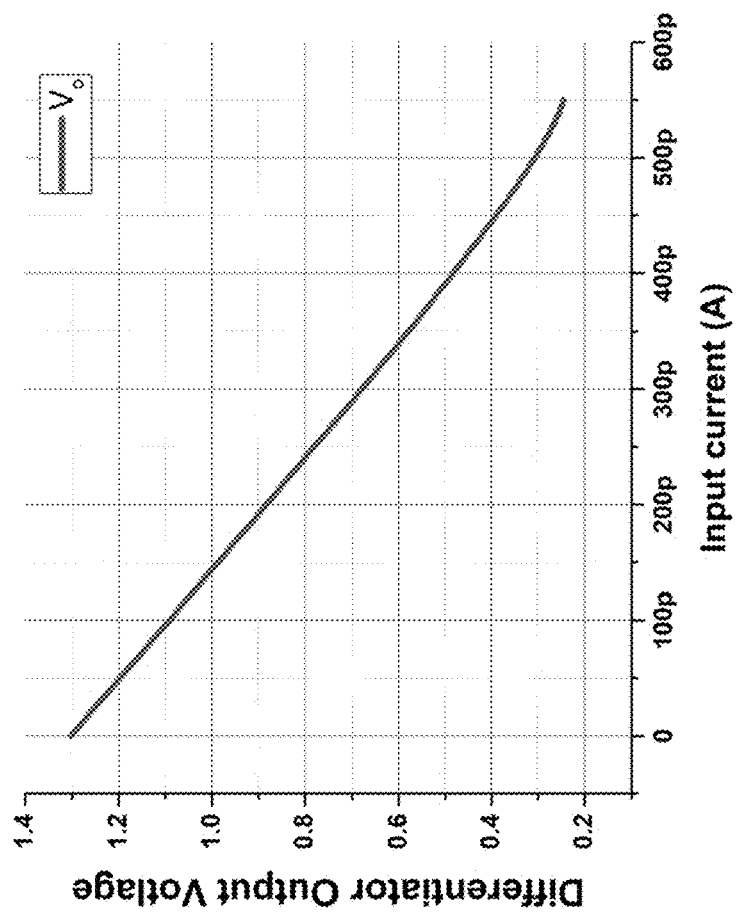
FIGS. 46A-46D show results (DC test for different gain selectors) of low noise current readout circuitry simulations.
Figure 46A:
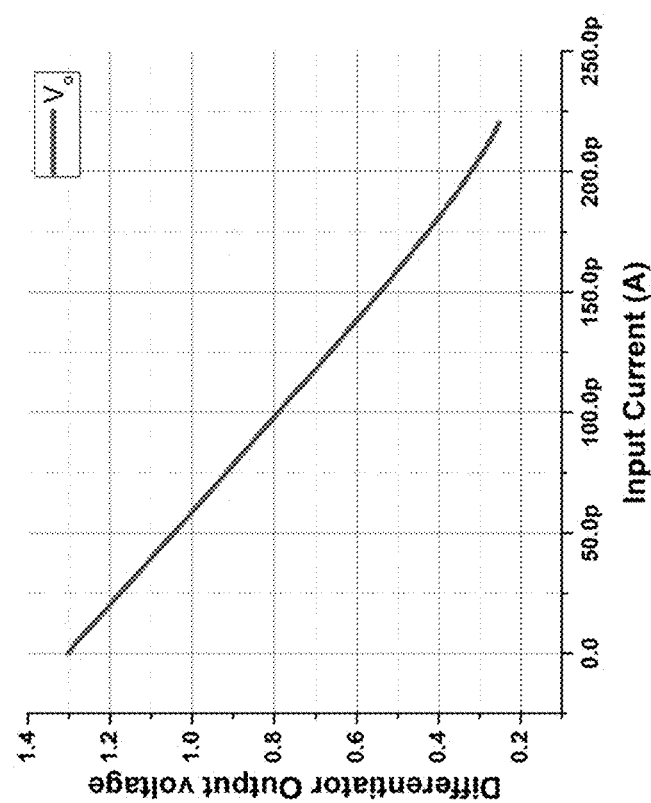
Figure 46D:
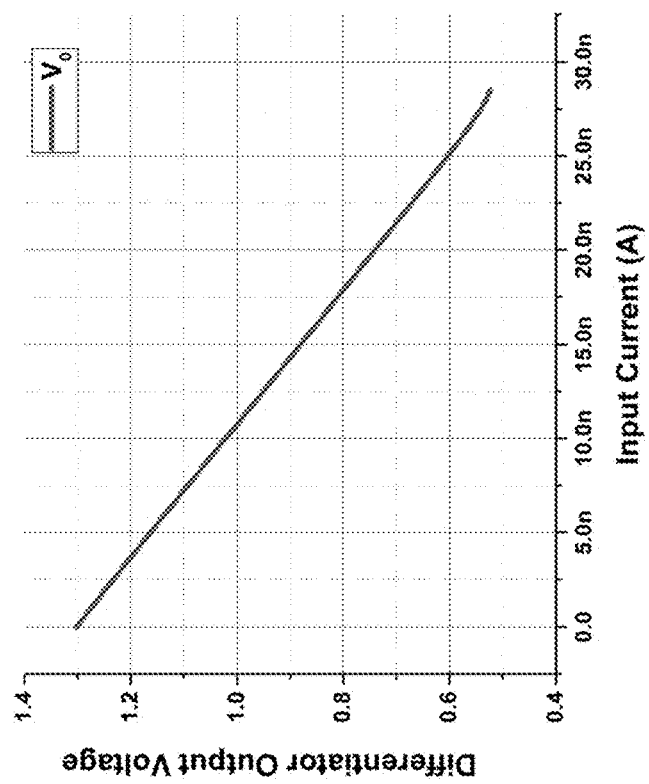
Figure 46C:
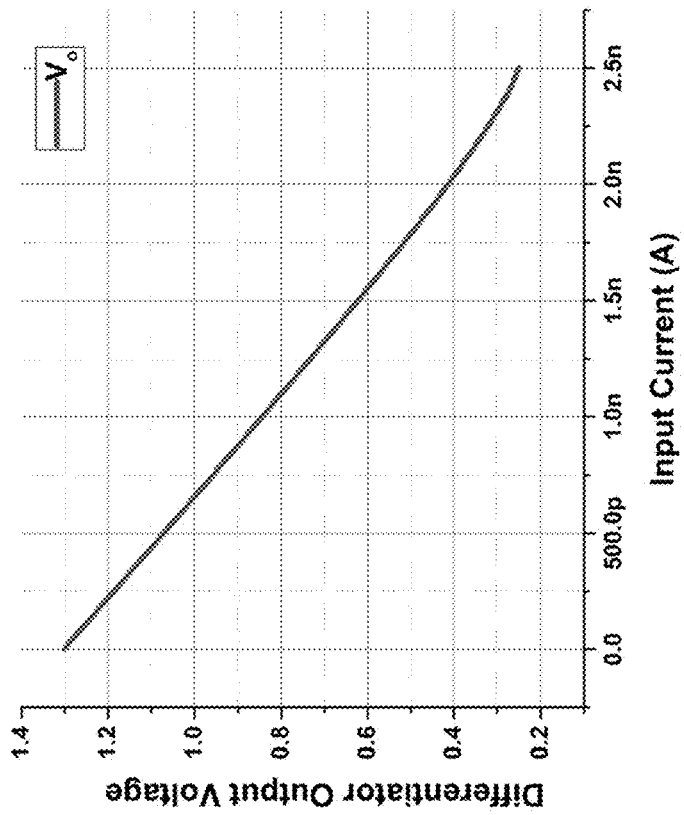

FIG. 42 shows a particular example RAF-PUF (primitive block) layout in GF55 nm, including main array circuitry, row and column switching circuitry, and peripheral circuitry, auxiliary circuitry, row and column switching circuitry, and peripheral circuitry, and mirror array circuitry. An example primitive block area using this layout is 0.327 mm², a breakdown of which is shown in FIG. 43.

Figure 47:
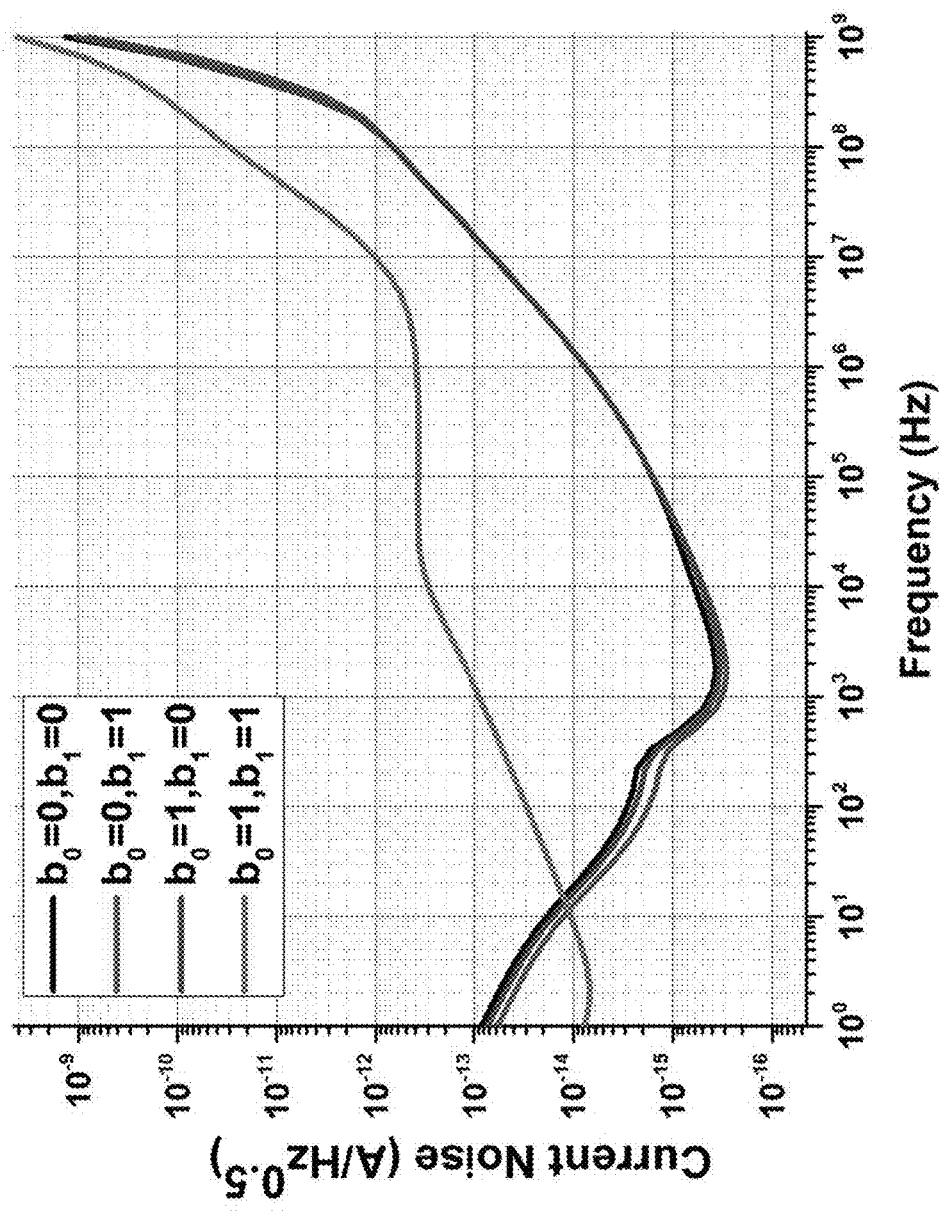
FIG. 47 shows results of example noise simulation for different gain selections.

FIG. 44 shows example programming parameters for the primitive blocks, and FIGS. 45A-45D show example low noise configurable readout circuitry. Parallel programming, for example 5 cells per block, may be employed. The example readout circuitry provides efficient and fast programming by, among other features, having an excellent noise figure for measuring a desired current range (e.g., 1 pA-30 nA), and an adaptive structure. A low area overhead can be provided. FIGS. 46A-46D show results (DC test for different gain selectors) of low noise current readout circuitry simulations, and FIG. 47 shows results of example noise simulation for different gain selections.

Figure 48:
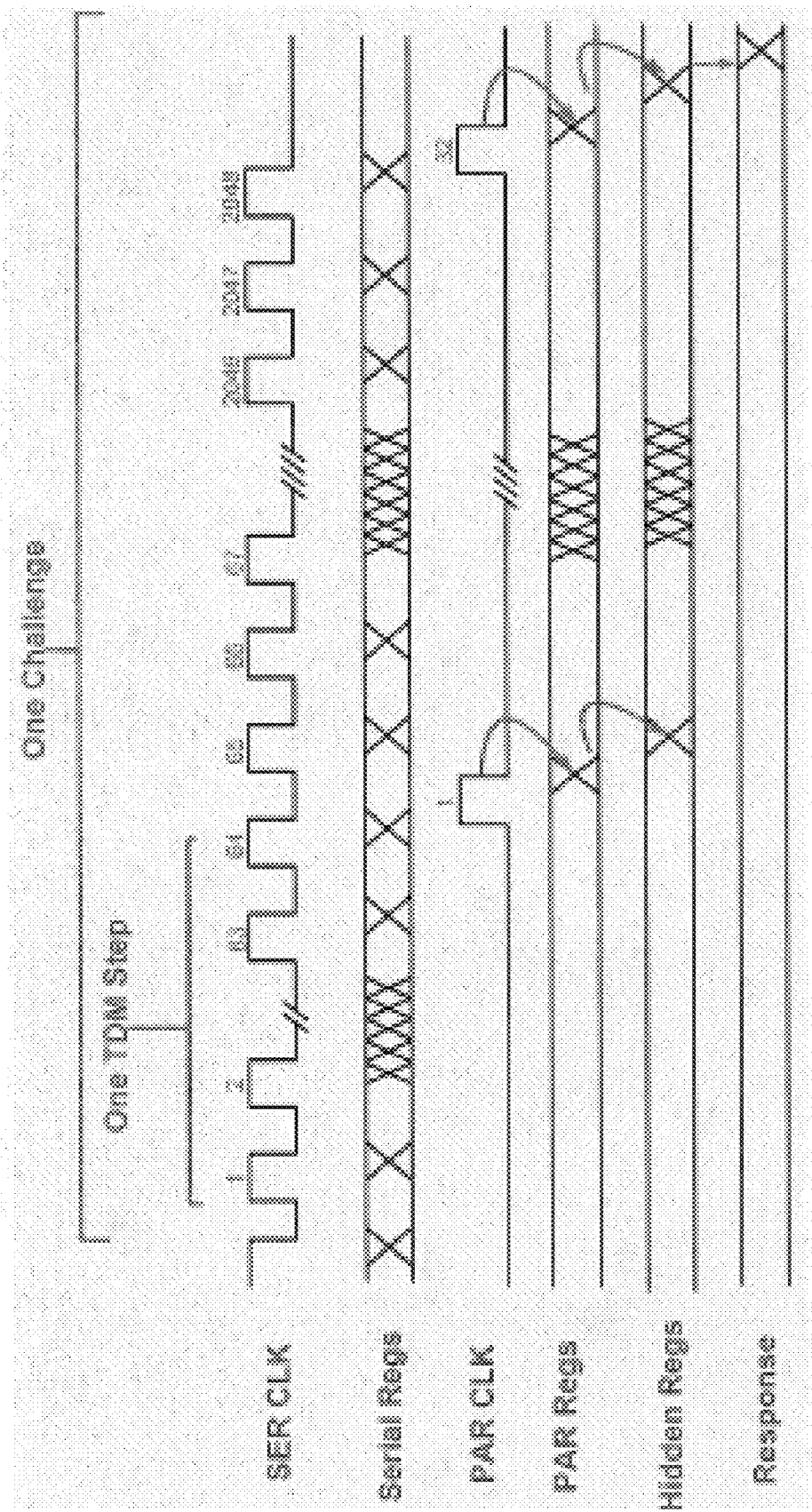
FIG. 48 shows an example timing diagram of an example system during operation.
Figure 49:
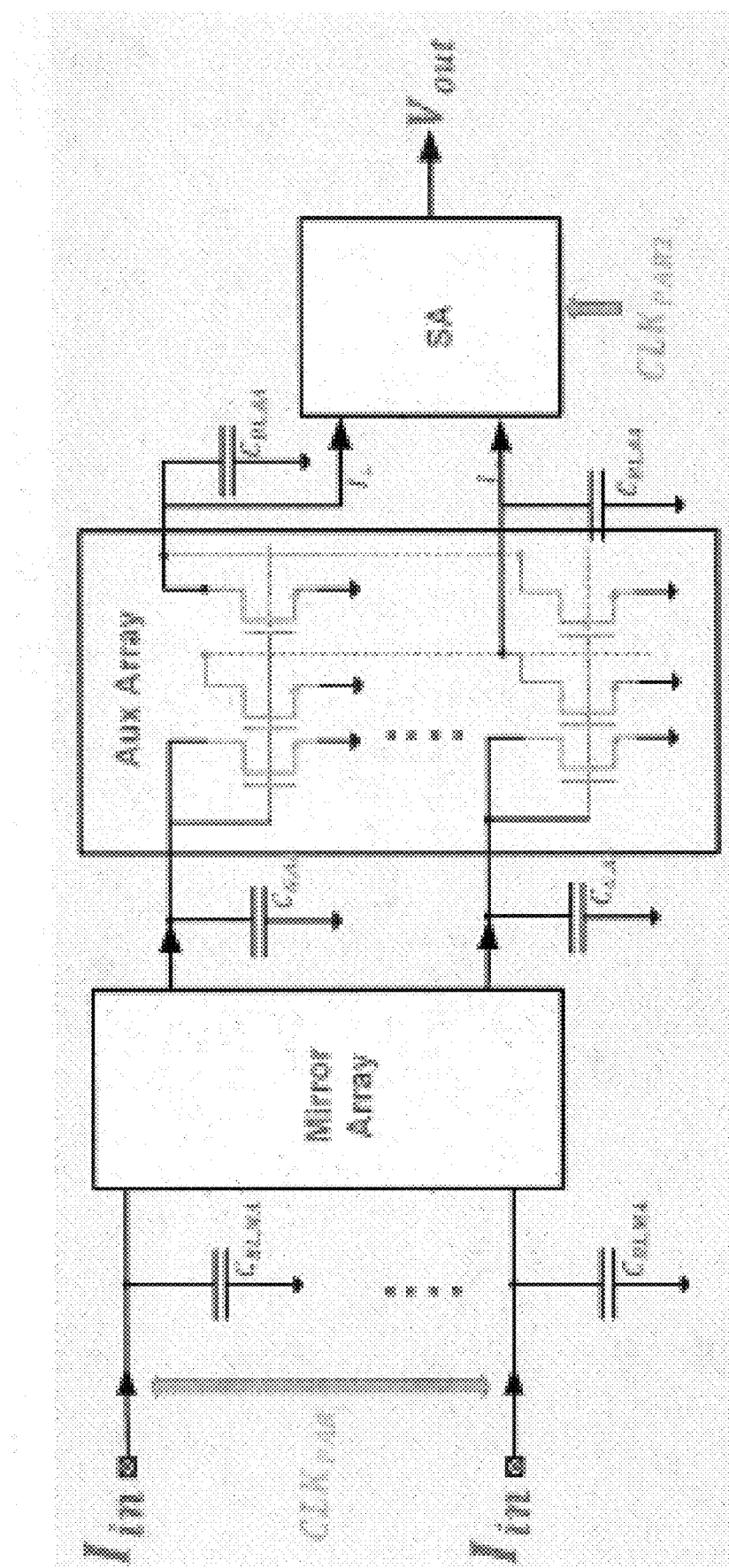
FIG. 49 shows example delay modeling circuitry.

FIG. 48 shows an example timing diagram of an example system during operation. FIG. 49 shows example delay modeling circuitry. FIG. 50 shows example delay parameters. An example maximum frequency of the digital PADs (Arragio GF55 nm) is 500 MHz. Since there is a digital input, the delay of the example main array is negligible. Delay 1 determines the difference between the rising edges of the parallel clk and parallel clk2. Delay 2 determines the setup time of the hidden registers (output registers) with respect to the parallel clk.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

The invention claimed is:

1. A security primitive for an integrated circuit, comprising:
an array of floating-gate transistors monolithically integrated into the integrated circuit and coupled to one another in a crossbar configuration, wherein the respective floating-gate transistors have instance-specific process-induced variations in analog behavior to provide one or more reconfigurable physically unclonable functions (PUFs); and peripheral circuitry coupled to the array of floating-gate transistors, the peripheral circuitry being configured to apply a voltage to selected ones of the floating-gate transistors for generating an unpredictable nonlinear combination of input currents through the selected floating-gate transistors.

2. The security primitive of claim 1, wherein the variations in analog behavior comprise variations in nonlinear conductances of the floating-gate transistors.

3. The security primitive of claim 1, wherein the variations in analog behavior comprise one or more of leakage current variations, subthreshold I-V slope variations, non-deterministic tuning error, or sneak path current variations.

4. The security primitive of claim 1, wherein each of the floating-gate transistors comprises a split-gate NOR flash memory cell.

5. The security primitive of claim 1,
wherein the array of floating-gate transistors comprises an n×(m−n) array, where m represents one of a row or column, and (m−n) represents the other of the row or column;
wherein the crossbar configuration comprises:
    n source lines, each source line connecting (m−n) floating-gate transistors;
    n pairs of word lines opposing one another with respect to the source line and connecting the (m−n) floating-gate transistors;
wherein the crossbar configuration further comprises:
    (m−n) bit lines, each bit line connecting n floating-gate transistors.

6. The security primitive of claim 5,
wherein each of the floating-gate transistors comprises:
    a source coupled to one of the n source lines;
    first and second control gates disposed between the pair of word lines and opposing one another with respect to the source; and
    first and second floating gates disposed between the pair of word lines and respectively associated with the first and second control gates.

7. The security primitive of claim 6, wherein the crossbar configuration further comprises n erase-gate lines, each of the n erase-gate lines connecting (m−n) floating gate transistors.

8. The security primitive of claim 6, wherein the peripheral circuitry comprises:
    a row switching block coupled to the array of floating-gate transistors and configured to selectively switch rows of the array of floating-gate transistors in response to a first set of bits of an input challenge;
    a column switching block coupled to the array of floating-gate transistors and configured to selectively switch rows of the array of floating-gate transistors in response to a second set of bits of the input challenge;
    biasing circuitry configured to apply the voltage to selected rows and/or columns of the array of floating-gate transistors; and
    output circuitry configured to selectively receive input currents from rows or columns of the array of floating-gate transistors and generate an output bit based on the received input currents.

9. The security primitive of claim 8, wherein the output circuitry receives input currents from selected source lines.

10. The security primitive of claim 8, wherein the output circuitry receives input currents selected in response to a third set of bits of the input challenge.

11. An integrated circuit, comprising:
    at least one security primitive configured to receive an input challenge and generate at least one output bit, each security primitive comprising:
        an array of floating-gate transistors monolithically integrated into the integrated circuit and coupled to one another in a crossbar configuration, wherein the respective floating-gate transistors have instance-specific process-induced variations in analog behavior to provide one or more reconfigurable physically unclonable functions (PUFs);
        a row switching block coupled to the array of floating-gate transistors and configured to selectively switch rows of the array of floating-gate transistors in response to a first set of bits of the input challenge;
        a column switching block coupled to the array of floating-gate transistors and configured to selectively switch rows of the array of floating-gate transistors in response to a second set of bits of the input challenge;
        biasing circuitry configured to apply a voltage to selected rows and/or columns of the array of floating-gate transistors; and
        output circuitry configured to selectively receive input currents from rows or columns of the array of floating-gate transistors and generate the at least one output bit based on the received input currents.

12. The integrated circuit of claim 11, further comprising:
    a clock signal generator for generating at least a first clock signal for receiving bits of the input challenge and a second clock signal for generating the at least one output bit.

13. The integrated circuit of claim 11, wherein the integrated circuit comprises a plurality of the security primitives arranged in at least one layer.

14. The integrated circuit of claim 13, wherein the plurality of security primitives are arranged in a plurality of layers.

15. The integrated circuit of claim 14, further comprising:
    a clock signal generator for generating at least a first clock signal for receiving bits of the input challenge and a second clock signal for generating the at least one output bit to provide time-domain multiplexing.

16. The integrated circuit of claim 15, wherein the plurality of layers comprise first and second layers of security primitives, and wherein the integrated circuit further comprises:
    a bit processor for receiving output bits from the first layer of security primitives, processing the received output bits, and inputting the processed bits to the second layer of security primitives.

17. The integrated circuit of claim 16, wherein the bit processor comprises one or more of a shift register, a bit concatenator, or an XOR bit combiner.

18. The integrated circuit of claim 17, further comprising:
    one or more additional bit processors configured to receive bits of the input challenge, processes the received bits, and distribute the processed bits among at least the row switching blocks and the column switching blocks of the security primitives in the first layer.

19. A method for generating one or more output bits from an input challenge applied to an integrated circuit, the integrated circuit comprising an array of floating-gate transistors monolithically integrated into the integrated circuit and coupled to one another in a crossbar configuration, wherein the respective floating-gate transistors have instance-specific process-induced variations in analog behavior to provide one or more reconfigurable physically unclonable functions (PUFs), the integrated circuit further comprising peripheral circuitry coupled to the array of floating-gate transistors, the peripheral circuitry being configured to apply a voltage to selected ones of the floating-gate transistors for generating an unpredictable nonlinear combination of input currents through the selected floating-gate transistors, wherein the method comprises:

tuning voltage thresholds of the array of floating-gate transistors;

inputting bits of the input challenge to the integrated circuit including the tuned floating-gate transistors;

selecting one or more rows and/or columns of the array of floating-gate transistors in response to the input bits to select one or more of the floating-gate transistors;

sensing currents of selected rows and/or columns of the array in response to said selecting;

comparing the sensed currents; and generating the one or more output bits based on said comparing.

20. The method of claim 19, further comprising:

biasing the selected one or more rows and columns before said sensing currents.

\* \* \* \* \*